US012499827B2

(12) United States Patent
Morita

(10) Patent No.: US 12,499,827 B2
(45) Date of Patent: Dec. 16, 2025

(54) ELECTROLUMINESCENT DISPLAY DEVICE AND DRIVING METHOD THEREOF

(71) Applicant: Japan Display Inc., Tokyo (JP)

(72) Inventor: Tetsuo Morita, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/524,291

(22) Filed: Nov. 30, 2023

(65) Prior Publication Data

US 2024/0194140 A1 Jun. 13, 2024

(30) Foreign Application Priority Data

Dec. 12, 2022 (JP) ................................ 2022-198098

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0861* (2013.01); *G09G 2330/021* (2013.01); *G09G 2330/045* (2013.01)

(58) Field of Classification Search
CPC .................................................. G09G 3/3233
See application file for complete search history.

(56) References Cited

U.S. PATENT DOCUMENTS

2016/0284276 A1 9/2016 Gupta et al.
2017/0061880 A1 3/2017 Choi et al.
2021/0343240 A1 11/2021 Woo et al.

FOREIGN PATENT DOCUMENTS

CN 106486054 A 3/2017
KR 1020210134163 A 11/2021

OTHER PUBLICATIONS

Office Action issued on Sep. 9, 2024, in corresponding Korean Application No. 10-2023-0177417, 12 pages.
English machine translation of Office Action dated Oct. 17, 2024, issued in TW Appl. No. 112145477, 4 pages.

*Primary Examiner* — Gustavo Polo
(74) *Attorney, Agent, or Firm* — Maier & Maier, PLLC

(57) ABSTRACT

A display device includes a first transistor controlled using a second control signal obtained by shifting a first control signal and electrically connected a first node, a second transistor electrically connected between the first node and a second node, a third transistor controlled using the first control signal to which a third control signal has been shifted, and electrically connected between the second node and a gate electrode of the second transistor, and a fourth transistor electrically connected to the second node is controlled to supply a reset voltage to the second node and the gate electrode of the second transistor using the third control signal.

17 Claims, 44 Drawing Sheets

180

ELECTROLUMINESCENT DISPLAY DEVICE AND DRIVING METHOD THEREOF

CROSS-REFERENCE TO RELATED APPLICATIONS

This application claims the benefit of priority to Japanese Patent Application No. 2022-198098 filed on Dec. 12, 2022, the entire contents of which are incorporated herein by reference.

FIELD

An embodiment of the present invention relates to a display device and a method for driving the display device.

BACKGROUND

In recent years, self-luminous display devices have been mounted on televisions, smart phones, digital signages (electronic signboards, electronic advertising boards, and the like), and the like and are becoming popular. The self-luminous display device includes, for example, a plurality of pixels and a driver for driving the plurality of pixels. Each of the plurality of pixels includes, for example, a plurality of transistors, a capacitive element, and a light emitting element. The light emitting element is, for example, a light emitting diode (Light Emitting Diode: LED), a micro light emitting diode (micro LED), or an organic electroluminescent (Electro Luminescence: EL) element. In the self-luminous display device, the driver supplies a voltage to each of the plurality of pixels, so that a current corresponding to the supplied voltage value flows to the light emitting element included in each of the plurality of pixels. Each of the light emitting elements emits light with a luminance corresponding to the current flowing through the light emitting element, and the pixel including the light emitting element can display an image with a gradation corresponding to the luminance. On the other hand, there is an increasing demand for reducing power consumption of the self-luminous display device.

For example, U.S. Patent Application Publication No. 2016/0284276 discloses a pixel including six transistors, one capacitive element, and one light emitting element, and a self-luminous display device including the pixel. Power consumption of the self-luminous display device described in Patent Literature 1 can be reduced, for example, by adjusting a power supply voltage electrically connected to the light emitting element.

SUMMARY

A display device according to an embodiment of the present invention includes: a first transistor controlled using a second control signal in which a first control signal is shifted and electrically connected to a first node; a second transistor electrically connected between the first node and a second node; a third transistor controlled using the first control signal in which a third control signal is shifted and electrically connected between the second node and a gate electrode of the second transistor; and a fourth transistor controlled using the third control signal to supply a reset voltage to the second node and the gate electrode of the second transistor and electrically connected to the second node.

A method for driving a display device according to an embodiment of the present invention is a method for driving a self-luminous display device including a first transistor controlled using a second control signal obtained by shifting a first control signal and electrically connected to a first node, a second transistor electrically connected between the first node and a second node, and a third transistor controlled using the first control signal obtained by shifting a third control signal and electrically connected between the second node and a gate electrode of the second transistor, and a fourth transistor controlled using the third control signal and electrically connected to the second node, wherein the fourth transistor is turned on using the third control signal and the third transistor is turned on using the first control signal, a reset voltage is supplied to the second node and the gate electrode of the second transistor, and after the reset voltage is supplied, the fourth transistor is turned off using the third control signal, the first transistor is turned on using the second control signal, and a data voltage is supplied to the second node and the first node.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. Further, in order to make the description clearer, although the drawings may be schematically represented with respect to the width, thickness, shape, configuration, and the like of each part as compared with the actual embodiment, they are merely examples, and do not limit the interpretation of the present invention. It should be noted that the terms “first” and “second” for each element are convenient labels used to distinguish each element, and do not have any further meaning unless otherwise described.

Also, in the present specification, the expression “a includes A, B, or C,” “a includes any of A, B or C,” “a includes one selected from the group consisting of A, B and C,” and the like does not exclude cases where a includes a plurality of combinations of A to C unless otherwise specified. Furthermore, these expressions do not exclude the case where a includes other elements.

In a self-luminous display device described in U.S. Patent Application Publication No. 2016/0284276, in the case where power consumption is reduced by adjusting a power supply voltage electrically connected to a light emitting element, the luminance of the light emitting element (self-luminous display device) may decrease.

In view of such problems, an object of an embodiment of the present invention is to provide a display device capable of reducing power consumption while suppressing a decrease in luminance of a light emitting element (self-luminous display device) and a method for driving the display device.

A display device according to an embodiment of the present invention is, for example, a self-luminous display device, and is a light emitting device using an EL element as a light emitting element.

1. First Embodiment

[1-1. Overview of Self-Luminous Display Device 10]

Figure 1:
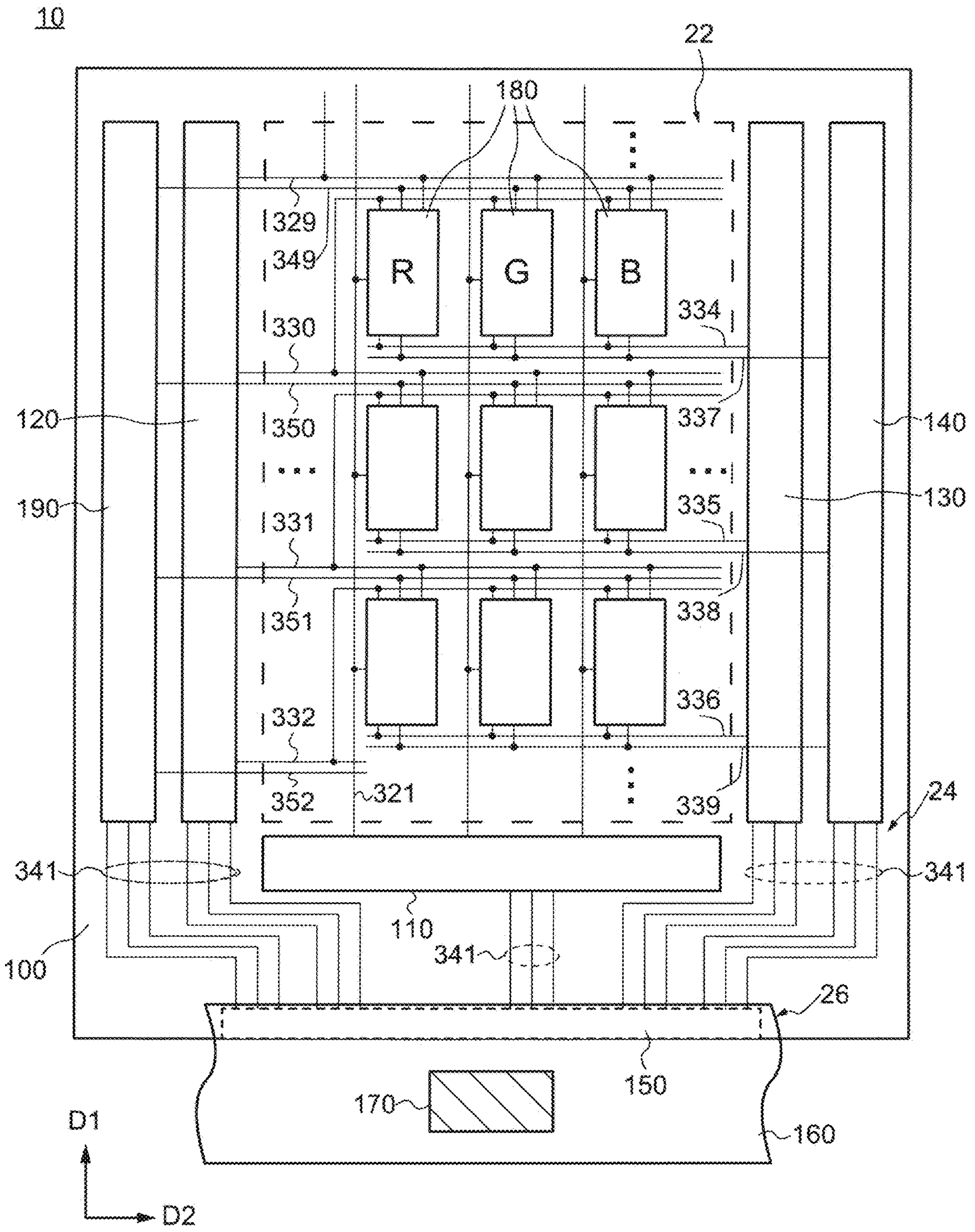
FIG. 1 is a schematic diagram showing a configuration of a self-luminous display device according to a first embodiment of the present invention.
Figure 2:
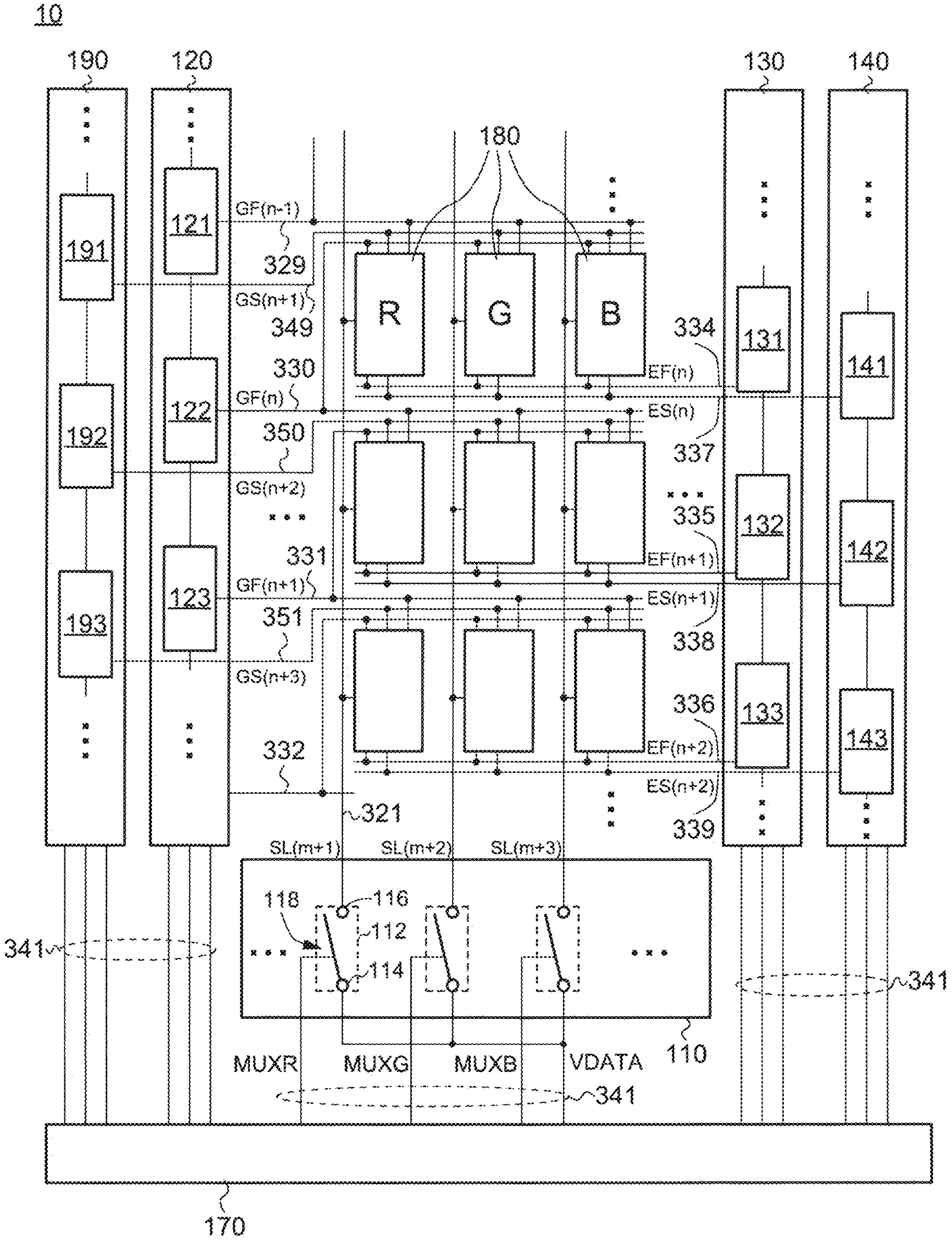
FIG. 2 is a schematic diagram showing the configuration of the self-luminous display device according to the first embodiment of the present invention.

An overview of a self-luminous display device 10 according to a first embodiment will be described with reference to FIG. 1 and FIG. 2. FIG. 1 and FIG. 2 are schematic diagrams showing a configuration of the self-luminous display device 10 according to the first embodiment. The configuration of the self-luminous display device 10 shown in FIG. 1 and FIG. 2 is an example, and the configuration of the self-luminous display device 10 is not limited to the configuration shown in FIG. 1 and FIG. 2.

As shown in FIG. 1 or FIG. 2, the self-luminous display device 10 includes an array substrate 100, a flexible printed circuit board 160 (FPC 160), and an IC chip 170. The self-luminous display device 10 includes a display region 22 arranged on the array substrate 100, a peripheral region 24 surrounding the display region 22, and a terminal region 26.

A plurality of pixels 180 in the display region 22 are arranged in a matrix. The pixel 180 is the smallest unit constituting a part of an image to be displayed in the display region 22. For example, each of the plurality of pixels 180 may correspond to a sub-pixel R, a sub-pixel G, and a sub-pixel B. One pixel may be formed by three sub-pixels. An array of the pixels 180 is not limited. For example, the array of the plurality of pixels 180 is a stripe array. The array of the self-luminous display device 10 may be a delta array, a pentyle array, or the like.

The sub-pixel R, the sub-pixel G, and the sub-pixel B are configured to display images of different colors. For example, each of the sub-pixel R, the sub-pixel G, and the sub-pixel B may include a light emitting element including a light emitting layer that emits three primary colors of red, green, and blue. An arbitrary voltage or current is supplied to each of the three sub-pixels, and the self-luminous display device 10 can display an image.

A source driver circuit 110, a first gate driver circuit 120, a first light emission control circuit 130, and a second light emission control circuit 140 are arranged in the peripheral region 24. Each of the source driver circuit 110, the first gate driver circuit 120, the first light emission control circuit 130, and the second light emission control circuit 140 is connected to a terminal portion 150 using a connection wiring 341. The peripheral region 24 may be referred to as a frame region. The connection wiring 341 may be referred to as the connection wiring 341 alone, and a bundle of a plurality of connection wirings 341 may be referred to as the connection wiring 341.

The terminal portion 150 and the FPC 160 electrically connected to the terminal portion 150 are arranged in the terminal region 26. The terminal region 26 is a region opposed to a first direction D1 with respect to a region in which the display region 22 is arranged with respect to the peripheral region 24.

The FPC 160 is connected to an external device (not shown) on an outer side of the self-luminous device 10. The self-luminous display device 10 is connected to the external device via the FPC 160 and the terminal portion 150 connected to the FPC. A control signal and a voltage are transmitted from the external device to the self-luminous display device 10 via the FPC 160 and the terminal portion 150 connected to the FPC. The self-luminous display device 10 drives each of the pixels 180 arranged in the self-luminous display device 10 by using the received control signal and voltage from the external device. As a result, the self-luminous display device 10 can display an image in the display region 22.

For example, the IC chip 170 is arranged on the FPC 160. The IC chip 170 supplies signals, voltages, and the like for driving each of the pixels 180 to the source driver circuit 110, the first gate driver circuit 120, the first light emission control circuit 130, the second light emission control circuit 140, and a pixel circuit via the FPC 160, the terminal portion 150, and the connecting wiring 341.

In the first embodiment, each of the source driver circuit 110, the first gate driver circuit 120, the first light emission control circuit 130, the second light emission control circuit 140, and the IC chip 170 may be referred to as a control circuit alone, and a circuit group including a part or all of the source driver circuit 110, the first gate driver circuit 120, the first light emission control circuit 130, the second light emission control circuit 140, and the IC chip 170 may be referred to as a control circuit.

[1-2. Configuration of Source Driver Circuit 110]

Referring to FIG. 1 and FIG. 2, an overview of the source driver circuit 110 will be described. As shown in FIG. 1 or FIG. 2, the source driver circuit 110 is arranged at a position adjoining the display region 22 in a first direction D1 (column direction). An image data signal line 321 extends from the source driver circuit 110 in the first direction D1 and is connected to the plurality of pixels 180 arranged in the first direction D1.

As shown in FIG. 2, for example, the source driver circuit 110 includes a plurality of selection circuits 112. Each of the plurality of selection circuits 112 is controlled based on, for example, an on signal and an off signal supplied to a selection signal MUXR, a selection signal MUXG, and a selection signal MUXB. The selection circuit 112 is selected by an on signal arranged to a selection signal (for example, the selection signal MUXR). The pixel 180 is electrically connected to the image data signal line 321, a first scanning signal line 330, and the like. In addition, the selection circuit 112 supplies the pixel 180 with the image data signal SL (m+1) including a data signal VDATA supplied to an input terminal 114. The data signal VDATA includes, for example, a voltage RDATA (n), a voltage GDATA (n), or a voltage BDATA (n).

For example, the selection circuit 112 is a switch 118 including the input terminal 114 and an output terminal 116. For example, the input terminal 114 and the output terminal 116 are conductive (connected) by an on signal supplied from the IC chip 170 to the selection signal MUXR, and the input terminal 114 and the output terminal 116 are cut off (disconnected) by an off signal supplied from the IC chip 170 to the selection signal MUXR. The on signal is a signal including a voltage that conducts between the input terminal 114 and the output terminal 116, and the off signal is a signal including a voltage that blocks the input terminal 114 and the output terminal 116.

In the present invention, the on signal may be high level (High, HI), the off signal may be low level (Low, LO), the on signal may be low level (Low, LO), and the off signal may be high level (High, HI).

[1-3. Configurations of First Gate Driver Circuit 120 and Second Gate Driver Circuit 190]

An overview of the first gate driver circuit 120 will be described with reference to FIG. 1 and FIG. 2. As shown in FIG. 1 or FIG. 2, the first gate driver circuit 120 is arranged at a position adjoining the display region 22 in a second direction D2 (row direction). First scanning signal lines 329, 330, 331, 332, and 333 extend from the first gate driver circuit 120 in the second direction D2 and are connected to the plurality of pixels 180 arranged in the second direction D2.

As shown in FIG. 2, the first gate driver circuit 120 includes a plurality of shift registers (for example, shift registers 121, 122, and 123). For example, the shift registers 121, 122, and 123 sequentially supply different scanning signals of timing (for example, a scanning signal GF (n−1), a scanning signal GF (n), and a scanning signal GF (n+1)) respectively to the first scanning signal lines 329, 330, and 331 based on control signals such as a clock signal and a start pulse supplied from the IC chip 170, and have a role of driving the pixels 180 (pixel circuit) electrically connected to each of the first scanning signal lines.

For example, the shift register 121 is electrically connected to the shift register 122 and the shift register 122 is electrically connected to the shift register 123. For example, the shift register 121 is electrically connected to the first scanning signal line 329 and supplies the scanning signal GF (n−1) to the first scanning signal line 329. For example, similar to the shift register 121, the shift register 122 is electrically connected to the first scanning signal line 330 and supplies the scanning signal GF (n) to the first scanning signal line 330, and the shift register 123 is electrically connected to the first scanning signal line 331 and supplies the scanning signal GF (n+1) to the first scanning signal line 331. Although not shown, a shift register of a next stage electrically connected to the shift register 123 is electrically connected to the first scanning signal line 332. The scanning signal GF (n) includes a pulse-width equivalent to the scanning signal GF (n−1), and is a signal obtained by shifting the scanning signal GF (n−1). The scanning signal GF (n+1) includes a pulse-width equivalent to the scanning signal GF (n), and is a signal obtained by shifting the scanning signal GF (n). Similar to the scanning signal GF (n+1), the scanning signal GF (n+2) includes the same pulse-width as the scanning signal GF (n+1), and is a signal obtained by shifting the scanning signal GF (n+1).

An overview of a second gate driver circuit 190 will be described with reference to FIG. 1 and FIG. 2. The second gate driver circuit 190 in the embodiment shown in FIG. 1 or FIG. 2 is arranged at a position adjoining the first gate driver circuit 120 in the second direction D2 (row direction). The position of the second gate driver circuit 190 is not limited to the position shown in FIG. 1 or FIG. 2. The second gate driver circuit 190 may be arranged between the first gate driver circuit 120 and the display region 22. Second scanning signal lines 349, 350, 351, and 352 extend from the second gate driver circuit 190 in the second direction D2 and are connected to the plurality of pixels 180 arranged in the second direction D2.

As shown in FIG. 2, the second gate driver circuit 190 includes a plurality of shift registers (for example, shift registers 191, 192, and 193). The shift registers 191, 192, and 193 have the same configuration and function as the shift registers 121, 122, and 123. For example, the shift registers 191, 192, and 193 sequentially supply different scanning signals of timing (for example, a scanning signal GS (n+1), a scanning signal GS (n+2), and a scanning signal GS (n+3)) respectively to the second scanning signal lines 349, 350, 351, and 352 based on control signals such as a clock signal and a start pulse supplied from the IC chip 170. That is, the shift registers 191, 192, and 193 have a function of driving the pixels 180 (pixel circuits) electrically connected to each of the second scanning signal lines. Here, the control signals such as the clock signal and the start pulse supplied to the shift registers 191, 192, and 193 are synchronized with the control signals such as the clock signal and the start pulse supplied to the shift registers 121, 122, and 123. The control signals such as the clock signal and the start pulse supplied to shift registers 191, 192, and 193 may be the same as the control signals such as the clock signal and the start pulse supplied to shift registers 121, 122, and 123. That is, the second gate driver circuit 190 is synchronized with the first gate driver circuit 120.

For example, the shift register 191 is electrically connected to the shift register 192 and the shift register 192 is electrically connected to the shift register 193. For example, the shift register 191 is electrically connected to the second scanning signal line 349 and supplies the scanning signal GS (n+1) to the second scanning signal line 349. For example, similarly to the shift register 191, the shift register 192 is electrically connected to the second scanning signal line 350 and supplies the scanning signal GS (n+2) to the second scanning signal line 350, and the shift register 193 is electrically connected to the second scanning signal line 351 and supplies the scanning signal GS (n+3) to the second scanning signal line 351. The second scanning signal GS (n+2) includes a pulse-width equivalent to the scanning signal GS (n+1), and is a signal obtained by shifting the scanning signal GS (n+1). The scanning signal GS (n+3) includes a pulse-width equivalent to the scanning signal GS (n+2), and is a signal obtained by shifting the scanning signal GS(n+2).

As described above, the first gate driver circuit 120 and the second gate driver circuit 190 are synchronized. The pulse-width of each of the scanning signals supplied to each of the scanning signal lines by the first gate driver circuit 120 and the second gate driver circuit 190 are equal to each other. Further, since the first gate driver circuit 120 and the second gate driver circuit 190 are synchronized, the scanning signal GF (n) becomes the signal obtained by shifting the scanning signal GF (n−1), the scanning signal GS (n+1) becomes a signal corresponding to the signal obtained by shifting the scanning signal GF (n), the scanning signal GF (n+1) becomes a signal corresponding to the signal obtained by shifting the scanning signal GS (n+1), and GS (n+2) becomes a signal corresponding to the signal obtained by shifting the scanning signal GF (n+1). That is, the shift register 121, the shift register 122, the shift register 191, the shift register 123, the shift register 192, and a shift register included in the first gate driver circuit 120 and connected to the shift register 123, and the shift register 193 are sequentially output with the shifted scanning signals. Thereafter, the shift register included in the first gate driver circuit 120 and a shift register included in the second gate driver circuit 190 alternately output the sequentially shifted scanning signals. The scanning signal GF (n) may be referred to as a first control signal, the scanning signal GS (n+1) may be referred to as a second control signal, and the scanning signal GF (n−1) may be referred to as a third control signal.

[1-4. Configurations of First Light Emission Control Circuit 130 and Second Light Emission Control Circuit 140]

Referring to FIG. 1 and FIG. 2, overviews of the first light emission control circuit 130 and the second light emission control circuit 140 will be described. As shown in FIG. 1 or FIG. 2, the first light emission control circuit 130 is arranged adjacent to the display region 22 in the second direction D2 (row direction) and opposite to a position where the first gate driver circuit 120 is disposed with respect to the display region 22. First light emission control lines 334, 335, and 336 extend from the first light emission control circuit 130 in the second direction D2 and are connected to the plurality of pixels 180 (pixel circuits) arranged in the second direction D2.

As shown in FIG. 2, the first light emission control circuit 130 includes a plurality of shift registers (for example, shift registers 131, 132, and 133). The shift registers 131, 132, and 133 sequentially supply different first light emission control signals of timing (for example, a first light emission control signal EF (n), a first light emission control signal EF (n+1), and a first light emission control signal EF (n+2)) respectively to the first light emission control signal lines 334, 335, and 336 based on control signals such as a clock signal and a start pulse supplied from the IC chip 170. That is, the shift registers 131, 132, and 133 have a function of driving the pixels 180 (pixel circuits) electrically connected to the first light emission control signal lines.

For example, the shift register 131 is electrically connected to the shift register 132 and the shift register 132 is electrically connected to the shift register 133. For example, the shift register 131 is electrically connected to the first light emission control signal line 334 and supplies the first light emission control signal EF (n) to the first light emission control signal line 334. For example, similar to the shift register 131, the shift register 132 is electrically connected to the first light emission control signal line 335 and supplies the first light emission control signal EF (n+1) to the first light emission control signal line 335, and the shift register 133 is electrically connected to the first light emission control signal line 336 and supplies the first light emission control signal EF (n+2) to the first light emission control signal line 336. A pulse-width of the first light emission control signal EF (n+1) is the same as the first light emission control signal EF (n), and the first light emission control signal EF (n+1) is a signal obtained by shifting the first light emission control signal EF (n). Similarly, a pulse-width of the first light emission control signal EF (n+2) is the same as the first light emission control signal EF (n+1), and the first light emission control signal EF (n+2) is a signal obtained by shifting the first light emission control signal EF (n+1). The first light emission control signal EF may be referred to as a fourth control signal.

As shown in FIG. 2, the second light emission control circuit 140 is arranged adjacent to the first light emission control circuit 130 in the second direction D2 (row direction) and opposite to the position where the first gate driver circuit 120 is disposed with respect to the display region 22. The second light emission control lines 337, 338, and 339 extend from the second light emission control circuit 140 in the second direction D2 and are connected to the plurality of pixels 180 (pixel circuit) arranged in the second direction D2.

The second light emission control circuit 140 includes a plurality of shift registers (for example, shift registers 141, 142, and 143). For example, the shift registers 141, 142, and 143 sequentially supply different second light emission control signals of timing (for example, a second light emission control signal ES (n), a second light emission control signal ES (n+1), and a second light emission control signal ES (n+2)) respectively to the second light emission control signal lines 337, 338, and 339 based on the control signals such as a clock signal and a start pulse supplied from the IC chip 170. That is, the shift registers 141, 142, and 143 have a function of driving the pixels 180 (pixel circuit) electrically connected to the second light emission control signal lines. The second light emission control signal ES may be referred to as a fifth control signal.

For example, the shift register 141 is electrically connected to the shift register 142 and the shift register 142 is electrically connected to the shift register 143. For example, the shift register 141 is electrically connected to the second light emission control signal line 337 and supplies the second light emission control signal ES (n) to the second light emission control signal line 337. For example, similar to the shift register 141, the shift register 142 is electrically connected to the second light emission control signal line 338 and supplies the second light emission control signal ES (n+1) to the second light emission control signal line 338, and the shift register 143 is electrically connected to the second light emission control signal line 339 and supplies the second light emission control signal ES (n+2) to the second light emission control signal line 339. A pulse-width of the second light emission control signal ES (n+1) is the same as a pulse-width of the second light emission control signal ES (n), and the second light emission control signal ES (n+1) is a signal obtained by shifting the second light emission control signal ES (n). Similarly, a pulse-width of the second light emission control signal ES (n+2) is the same as a pulse-width of the second light emission control signal ES (n+1), and the second light emission control signal ES (n+2) is a signal obtained by shifting the second light emission control signal ES (n+1).

In addition, a position of the first light emission control circuit 130 and a position of the second light emission control circuit 140 may be interchanged with respect to the second direction D2 (row direction).

[1-5. Configuration of Pixel 180]

Figure 3:
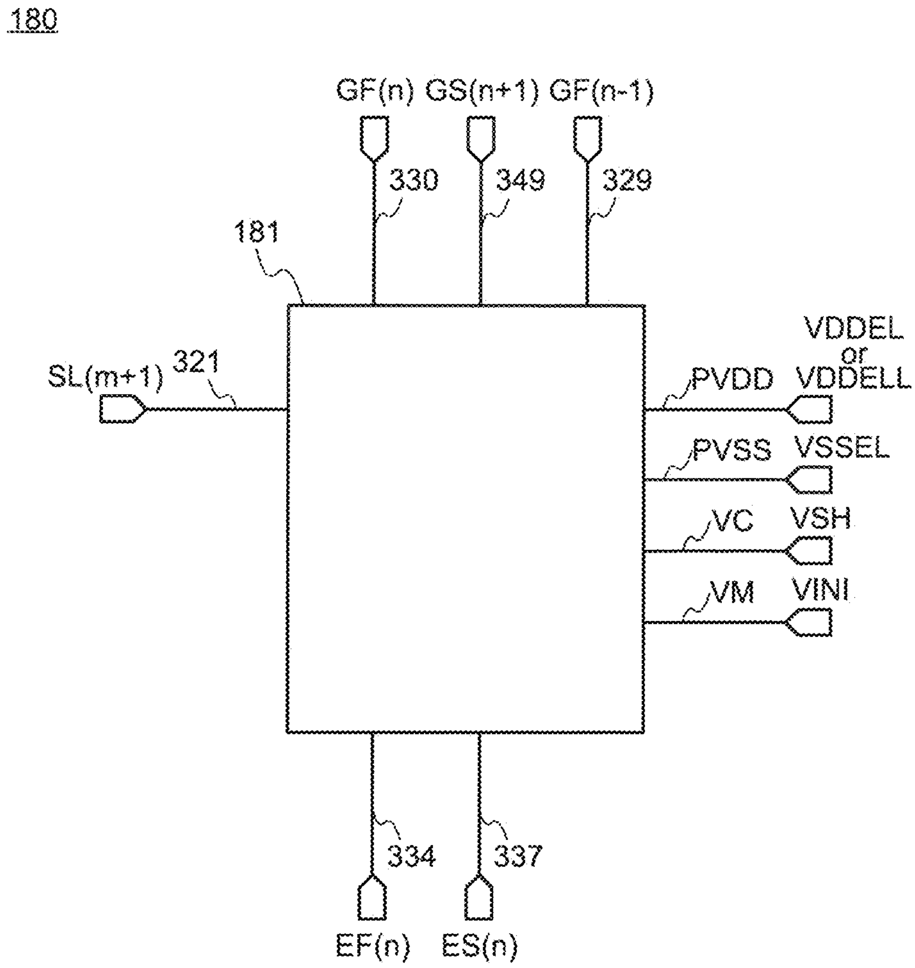
FIG. 3 is a schematic diagram showing an input signal to a pixel circuit according to the first embodiment of the present invention.
Figure 4:
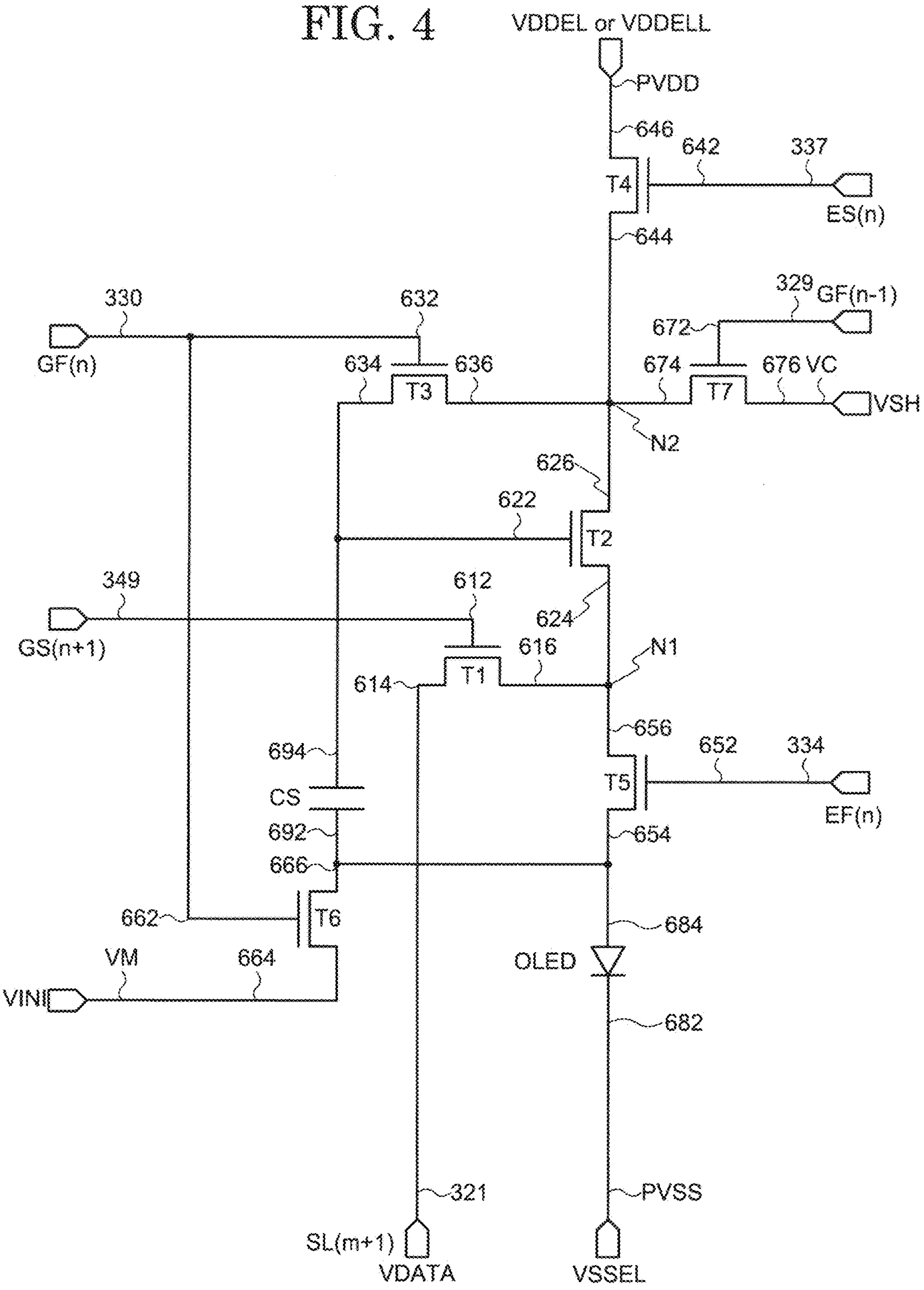
FIG. 4 is a circuit diagram showing a configuration of the pixel circuit according to the first embodiment of the present invention.

Referring to FIG. 3 and FIG. 4, an overview of the pixel 180 will be described. FIG. 3 is a schematic diagram showing an input signal to a pixel circuit 181 included in the pixel 180. FIG. 4 is a circuit diagram showing a configuration of the pixel circuit 181. For example, FIG. 3 and FIG. 4 show the configuration of the pixel circuit 181 of the pixel 180 shown in FIG. 1 and FIG. 2. Configurations of the pixel 180 and the pixel circuit 181 are not limited to the configurations shown in FIG. 3 and FIG. 4. The same or similar configurations as those in FIG. 1 and FIG. 2 will not be described here.

The pixel circuit 181 is a circuit for driving the pixel 180. Pixel circuits of the sub-pixel R, the sub-pixel G, and the sub-pixel B included in the pixel 180 are the same as the pixel circuit 181, and differ in colors emitted by light emitting elements OLED. A light emitting element OLED that emits red will be mainly described in the following explanation.

As shown in FIG. 3, the pixel circuit 181 is supplied with the scanning signal GF (n−1), the scanning signal GF (n), the scanning signal GS (n+1), the image data signal SL (m+1), the first light emission control signal EF (n), the second light emission control signal ES (n), a reset voltage VSH, and an initialization voltage VINI. Further, a driving voltage VDDEL or a driving voltage VDDELL and a reference voltage VSSEL are supplied to the pixel circuit 181 as a power source for driving the pixel 180.

The reset voltage VSH is supplied to a reset voltage line VC, the initialization voltage VINI is supplied to an initialization voltage line VM, the driving voltage VDDEL and the driving voltage VDDELL are supplied to a drive power supply line PVDD, and the reference voltage VSSEL is supplied to a reference voltage line PVSS. Each of the reset voltage line VC, the initialization voltage line VM, the drive power supply line PVDD, and the reference voltage line PVSS may be electrically connected to, for example, a different connection line 341 or may be a different connection line 341. The reset voltage VSH, the initialization voltage VINI, the driving voltage VDDEL, the driving voltage VDDELL, and the reference voltage VSSEL may be supplied from an external circuit to the plurality of pixels 180 (the pixel circuit 181) via the FPC 160, the terminal portion 150, the reset voltage line VC, the initialization voltage line VM, the drive power supply line PVDD, and the reference voltage line VSSEL. In addition, the reset voltage VSH, the initialization voltage VINI, the driving voltage VDDEL, the driving voltage VDDELL, and the reference voltage VSSEL may be supplied from the IC chip 170 to the plurality of pixels 180 (the pixel circuits 181) via the FPC 160, the terminal portion 150, the reset voltage line VC, the initialization voltage line VM, the drive power supply line PVDD, and the reference voltage line PVSS. The reset voltage VSH and the initialization voltage VINI are smaller than the driving voltage VDDEL and the driving voltage VDDELL. The driving voltage VDDELL is smaller than the driving voltage VDDEL. The reference voltage VSSEL is smaller than the driving voltage VDDELL. The reset voltage VSH is, for example, bigger than the voltage included in the data signal VDATA (for example, the voltage RDATA (n), the voltage GDATA (n) or the voltage BDATA (n)).

As shown in FIG. 4, the pixel circuit 181 includes a transistor T1, a transistor T2, a transistor T3, a transistor T4, a transistor T5, a transistor T6, a transistor T7, a capacitive element CS and a light emitting element OLED. Each of these transistors includes a gate electrode and a pair of electrodes including a first electrode and a second electrode (a source electrode and a drain electrode). Each of the capacitive element CS and the light emitting element OLED has a pair of electrodes including a first electrode and a second electrode.

For example, the transistor T1 is a selection transistor. The transistor T1 has a function of supplying an image data signal SL (m+1) to the transistor T2.

For example, the transistor T2 is a driving transistor. The transistor T2 has a function of causing the light emitting element OLED to emit light by supplying a current to the light emitting element OLED using the input image data signal SL (m+1).

The transistor T3 has a function of conducting a second node N2 and a gate electrode 622 of the transistor T2 (and a second electrode 694 of the capacitive element CS), supplying the reset voltage VSH to the gate electrode 622 of the transistor T2, and resetting the gate electrode 622 of the transistor T2. The transistor T3 has a function of accumulating a charge corresponding to a threshold voltage Vth of the transistor T2 in the gate electrode 622 of the transistor T2 and the second electrode 694 of the capacitive element CS.

The transistor T4 controls connection and disconnection between the drive power supply line PVDD and the transistor T2. That is, the transistor T4 has a function of supplying the driving voltage VDDEL to the transistor T2.

The transistor T5 controls connection and disconnection between the transistor T2 and the light emitting element OLED. In other words, the transistor T5 has a function of controlling connection and disconnection between the transistor T2 and the light emitting element OLED, and supplying a current to the light emitting element OLED to control light emission and non-light emission of the light emitting element OLED.

The transistor T6 has a function of initializing a first electrode 654 of the transistor T5, a second electrode 684 of the light emitting element OLED, and a first electrode 692 of the capacitive element CS by supplying the initialization voltage VINI to the first electrode 654 of the transistor T5, the second electrode 684 of the light emitting element OLED, and the first electrode 692 of the capacitive element CS.

The transistor T7 has a function of supplying the reset voltage VSH to a first electrode 644 of the transistor T4, a second electrode 626 of the transistor T2, a second electrode 636 of the transistor T3, and the like, and resetting the first electrode 644 of the transistor T4, the second electrode 626 of the transistor T2, and the second electrode 636 of the transistor T3.

For example, the capacitive element CS has a function of holding the charge (first charge) corresponding to the threshold voltage Vth of the transistor T2. The capacitive element CS has a function of holding a charge (second charge) corresponding to a data voltage (for example, RDATA (n) (see FIG. 6)) included in the image data signal SL (m+1) input to the gate electrode 622 of the transistor T2.

The light emitting element OLED has a diode characteristic and has a function of emitting light based on a current flowing through the light emitting element OLED (that is, a drain current of the transistor T2).

The transistor T1 includes a gate electrode 612, a first electrode 614, and a second electrode 616. The gate electrode 612 is electrically connected to the second scanning signal line 349. The first electrode 614 is electrically connected to the image data signal line 321. The second electrode 616 is electrically connected to a first node N1, a first electrode 624 of the transistor T2, and a second electrode 656 of the transistor T5. The scanning signal GS (n+1) is supplied to the second scanning signal line 349. A conduction state (on state) and a non-conduction state (off state) are controlled by the scanning signal GS (n+1) in the transistor T1. The first transistor T1 becomes non-conductive in the case where the signal supplied to the scanning signal GS (n+1) is low level (LO). The first transistor T1 becomes conductive in the case where the signal supplied to the scanning signal GS (n+1) is high level (HI).

The transistor T2 includes the gate electrode 622, the first electrode 624, and the second electrode 626. The gate electrode 622 is electrically connected to a first electrode 634 of the transistor T3 and the second electrode 694 of the capacitive element CS. The second electrode 626 is electrically connected to the second node N2, the second electrode 636 of the transistor T3, a first electrode 674 of the transistor T7, and the first electrode 644 of the transistor T4.

The transistor T3 includes a gate electrode 632, the first electrode 634, and the second electrode 636. The gate electrode 632 is electrically connected to the first scanning signal line 330. The scanning signal GF (n) is supplied to the first scanning signal line 330. The conduction state (on state) and the non-conduction state (off state) are controlled by the scanning signal GF (n) in the transistor T3. The transistor T3 becomes non-conductive in the case where the signal supplied to the scanning signal GF(n) is low level (LO). The transistor T3 becomes conductive in the case where the signal supplied to the scanning signal GF(n) is high level (HI).

The transistor T4 includes a gate electrode 642, the first electrode 644, and a second electrode 646. The gate electrode 642 is electrically connected to the second light emission control signal line 337. The second electrode 646 is electrically connected to the drive power supply line PVDD. The drive power supply line PVDD is supplied with the driving voltage VDDEL. The second light emission control signal ES (n) is supplied to the second light emission control signal line 337. The conduction state (on state) and the non-conduction state (off state) are controlled by the second light emission control signal ES (n) in the transistor T4. The transistor T4 becomes non-conductive in the case where the signal supplied to the second light emission control signal ES (n) is low level (LO). The transistor T4 becomes conductive in the case where the signal supplied to the second light emission control signal ES (n) is high level (HI).

The transistor T5 includes a gate electrode 652, the first electrode 654, and the second electrode 656. The gate electrode 652 is electrically connected to the first light emission control signal line 334. The first electrode 654 is electrically connected to a second electrode 666 of the transistor T6, the first electrode 692 of the capacitive element CS, and the second electrode 684 of the light emitting element OLED. The first light emission control signal EF (n) is supplied to the first light emission control signal line 334. The conductive state (on state) and the non-conductive state (off state) are controlled by the first light emission control signal EF (n) in the transistor T5. The transistor T5 becomes non-conductive in the case where the signal supplied to the first light emission control signal EF (n) is low level (LO). The transistor T5 becomes conductive in the case where the signal supplied to the first light emission control signal EF (n) is high level (HI).

The transistor T6 includes a gate electrode 662, a first electrode 664, and the second electrode 666. The gate electrode 662 is electrically connected to the first scanning signal line 330. The first electrode 664 is electrically connected to the initialization voltage line VM. As described above, the scanning signal GF (n) is supplied to the first scanning signal line 330, and the initialization voltage VINI is supplied to the initialization voltage line VM. Similar to the transistor T3, the conductive state (on state) and the non-conductive state (off state) are controlled by the scanning signal GF (n) in the transistor T6. The transistor T6 becomes non-conductive in the case where the signal supplied to the scanning signal GF (n) is low level (LO). The transistor T6 becomes conductive in the case where the signal supplied to the scanning signal GF (n) is high level (HI).

The transistor T7 includes a gate electrode 672, the first electrode 674, and a second electrode 676. The gate electrode 672 is electrically connected to the first scanning signal line 329. The scanning signal GF (n−1) is supplied to the first scanning signal line 329. The second electrode 676 is electrically connected to the reset voltage line VC. As described above, the reset voltage line VC is supplied with the reset voltage VSH. The conductive state (on state) or the non-conductive state (off state) are controlled by the scanning signal GF (n−1) in the transistor T7. The transistor T7 becomes non-conductive in the case where the signal supplied to the scanning signal GF (n−1) is low level (LO). The transistor T7 becomes conductive in the case where the signal supplied to the scanning signal GF (n−1) is high level (HI).

A first electrode 682 of the light emitting element OLED is electrically connected to the reference voltage line PVSS. As described above, the reference voltage line PVSS is supplied with the reference voltage VSSEL. For example, the first electrode 682 of the light emitting element OLED is a cathode electrode, and the second electrode 684 of the light emitting element OLED is an anode electrode.

For example, a conduction state of a transistor in the self-luminous display device 10 is assumed to indicate a state in which a source electrode and a drain electrode of the transistor are in conduction and the transistor is in an on (ON) state, and the non-conduction state of the transistor in the self-luminous display device 10 is assumed to indicate a state in which the source electrode and the drain electrode of the transistor are in non-conduction and the transistor is in an off (OFF) state. In addition, the source electrode and the drain electrode may be interchanged depending on a voltage or a potential supplied to each electrode in each transistor. In addition, it can be easily understood by a person skilled in the art that a slight current flows, such as a leakage current, even when the transistor is in an off state.

Each transistor shown in FIG. 4 may have a Group 14 element, such as silicon or germanium, or an oxide exhibiting semiconductor characteristics in a channel region. For example, the channel region of each of the transistors has low-temperature polysilicon (LTPS). The transistors in the self-luminous display device 10 are formed using thin film transistors (TFT) and include n-channel field effect transistors. Each of the transistors In the self-luminous display device 10 may have either an n-channel field effect transistor or a p-channel field effect transistor. A configuration of the transistor, a connection of the storage capacitor, a power supply voltage, and the like may be appropriately adapted according to the application and specifications in the self-luminous display device 10.

[1-6. Method for Driving Self-Luminous Display Device 10]

Figure 12:
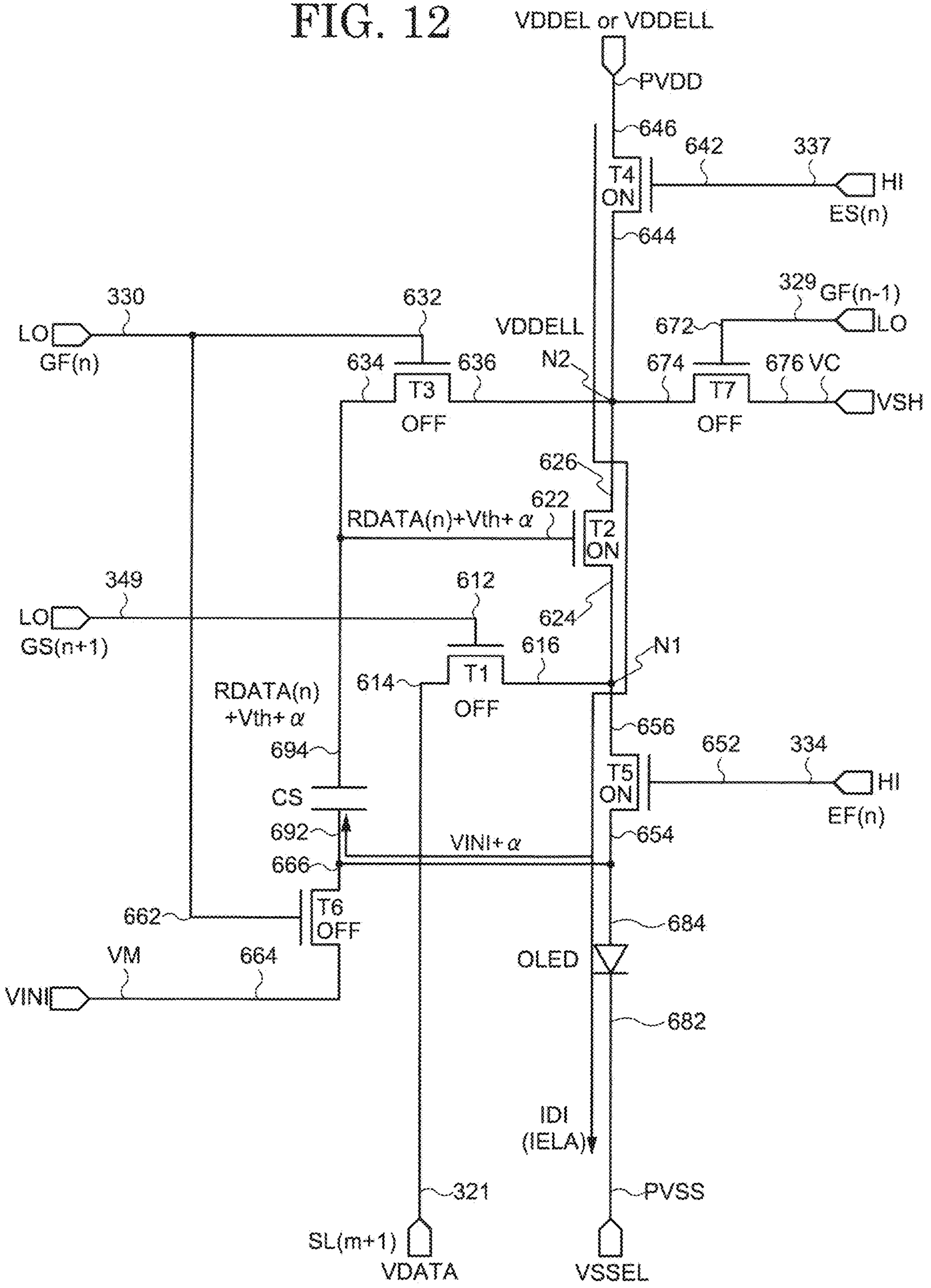
FIG. 12 is a schematic diagram showing an operation state of the pixel at the timing shown in FIG. 6.
Figure 13:
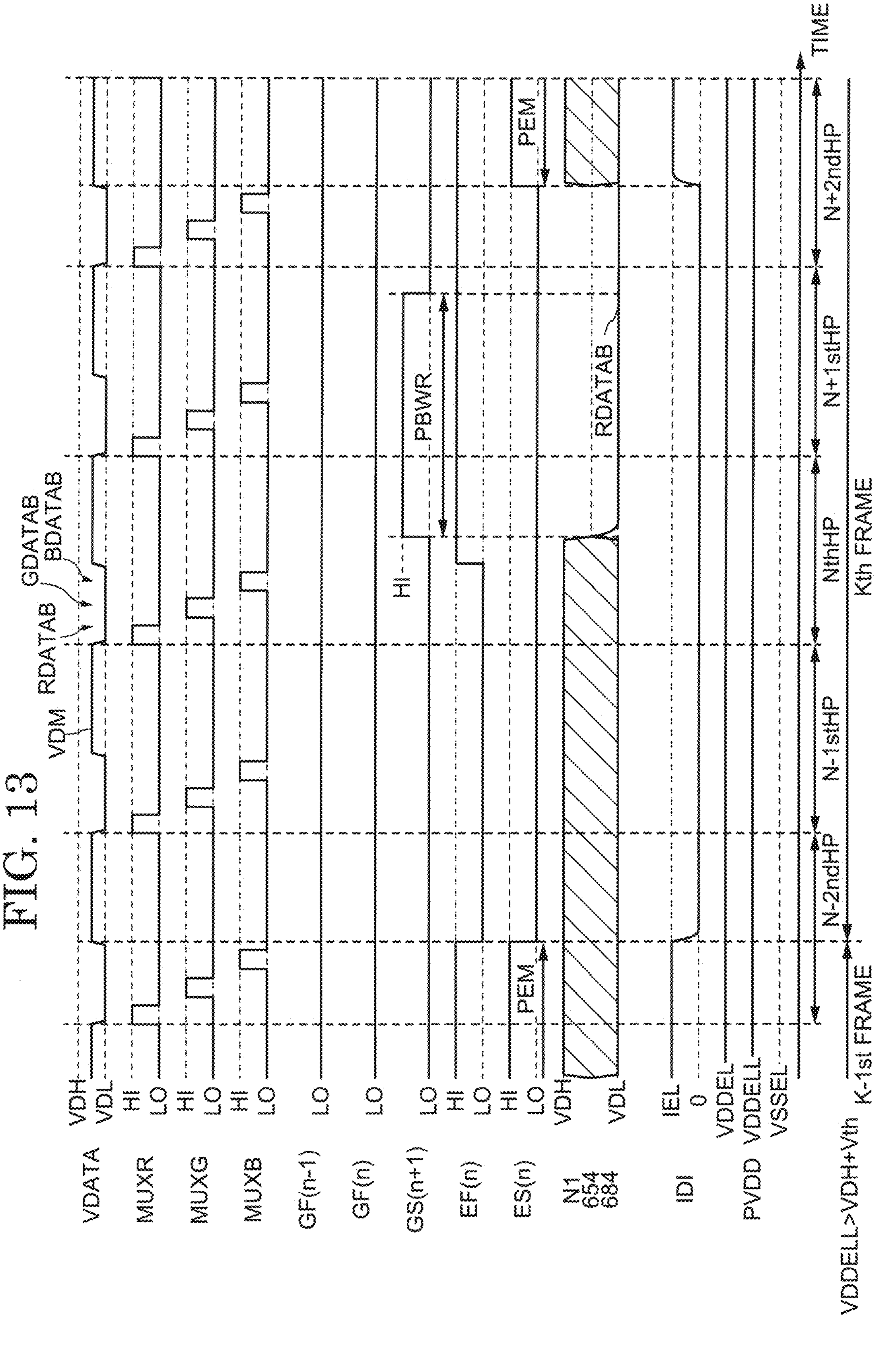
FIG. 13 is a schematic diagram showing a timing chart of the self-luminous display device according to the first embodiment of the present invention.
Figure 14:
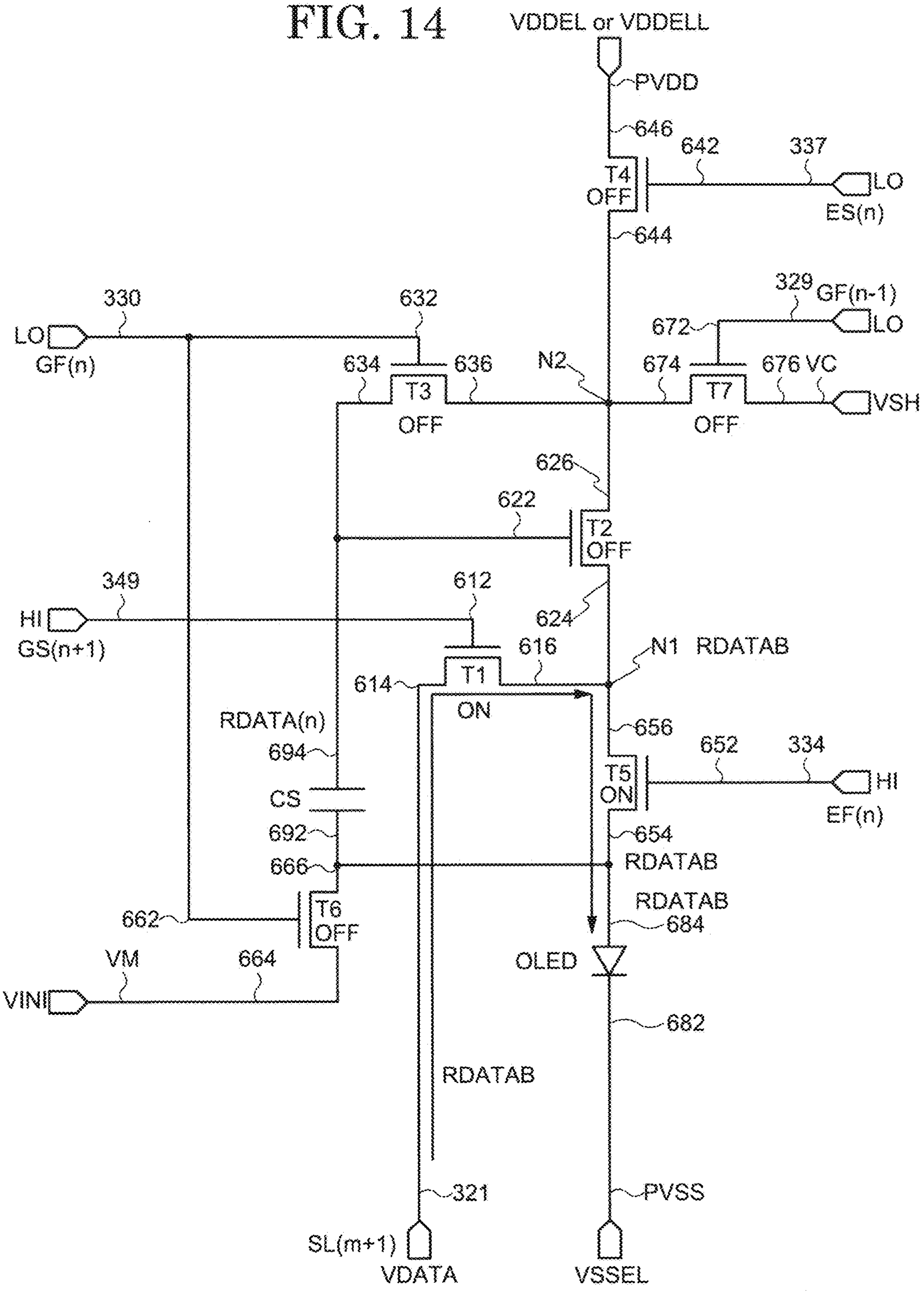
FIG. 14 is a schematic diagram showing an operation state of a pixel at the timing shown in FIG. 13.

Referring to FIG. 5A to FIG. 14, methods for driving the self-luminous displays 10 will be described. FIG. 5A, FIG. 5B, FIG. 6 and FIG. 13 are schematic diagrams showing timing charts of the self-luminous display device 10. FIG. 7 to FIG. 12 are schematic diagrams showing operation states of the pixel 180 (the pixel circuit 181) at the timing shown in FIG. 6. FIG. 14 is a schematic diagram showing an operation state of the pixel 180 (the pixel circuit 181) at the timing shown in FIG. 13. The method for driving the self-luminous display device 10 is not limited to the driving methods shown in FIG. 5A to FIG. 14. Descriptions of the same or similar configurations as those in FIG. 1 to FIG. 4 will be omitted. The horizontal axis of the timing charts indicates times (TIME).

Figure 5A:
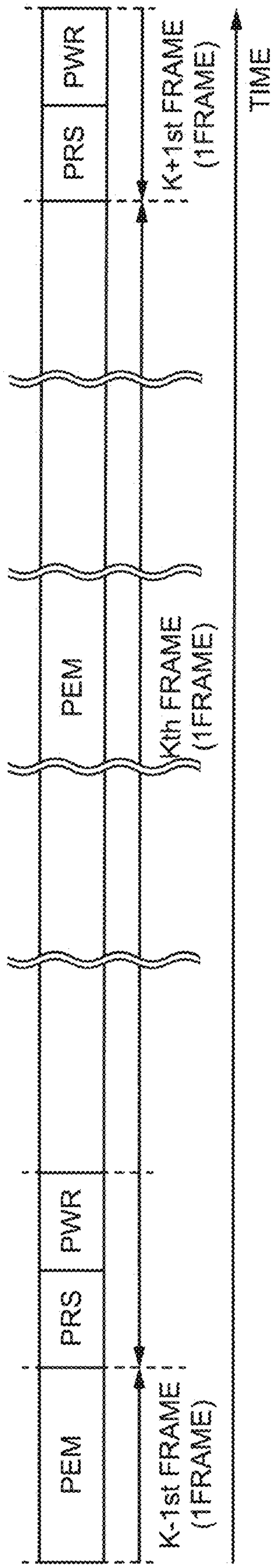
FIG. 5A is a diagram showing the configuration of the self-luminous display device according to the first embodiment of the present invention.

FIG. 5A is a diagram showing a timing chart of the method for driving the self-luminous display device 10 in the case where the self-luminous display device 10 is driven at a higher frequency. For example, the higher frequency is 60 Hz and is the frequency at which one frame (1 FRAME) is driven by 60 Hz. For example, a part of the current frame (Kth FRAME), a part of a previous frame of the current frame (K−1st FRAME), and a part of a subsequent frame of the current frame (K+1st FRAME) are shown in FIG. 5A. The driving method shown in FIG. 5A is referred to as high-frequency driving.

As shown in FIG. 5A, the method for driving the self-luminous display device 10 includes at least a reset period PRS, a sampling period PWR, and a light emission period PEM in one frame. The sampling period PWR is executed after the reset period PRS, and the emission period PEM is executed after the sampling period PWR in the pixel 180 (the pixel circuit 181) included in the self-luminous display device 10. Further, after a light emission period PEM of the previous frame of the current frame, a reset period PRS of the current frame is executed, and after a light emission period PEM of the current frame, a reset period PRS and a sampling period PWR of the subsequent frame of the current frame are executed.

Figure 5B:
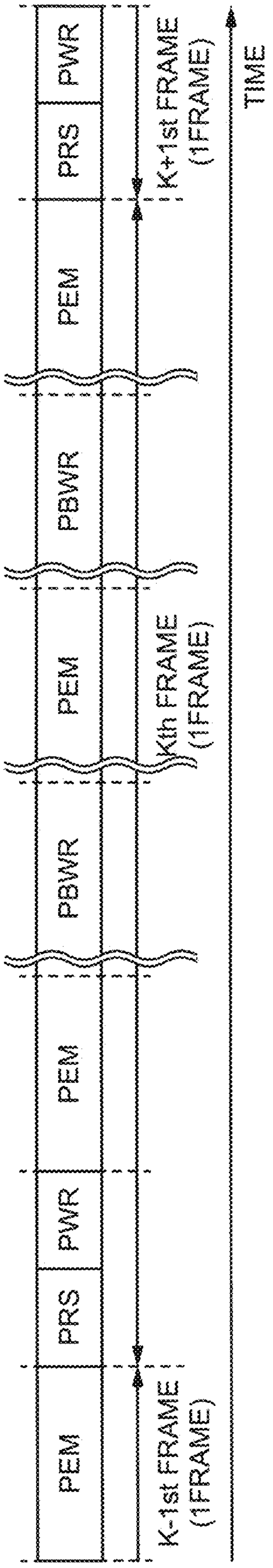
FIG. 5B is a diagram showing the configuration of the self-luminous display device according to the first embodiment of the present invention.

FIG. 5B shows a timing chart of the method for driving a self-luminous display device 10 in the case where the self-luminous display device 10 is driven at a lower frequency. For example, the lower frequency is 1 Hz and is a frequency at which one frame (1 FRAME) is driven by 1 Hz. The driving methods shown in FIG. 5B are referred to as low-frequency driving. The low-frequency driving is a driving method in which a period (black period PBWR) for displaying black is executed a plurality of times in the light emission period PEM as compared with the high-frequency driving. The driving other than the black period PBWR in the low-frequency driving is the same as the high-frequency driving.

Figure 6:
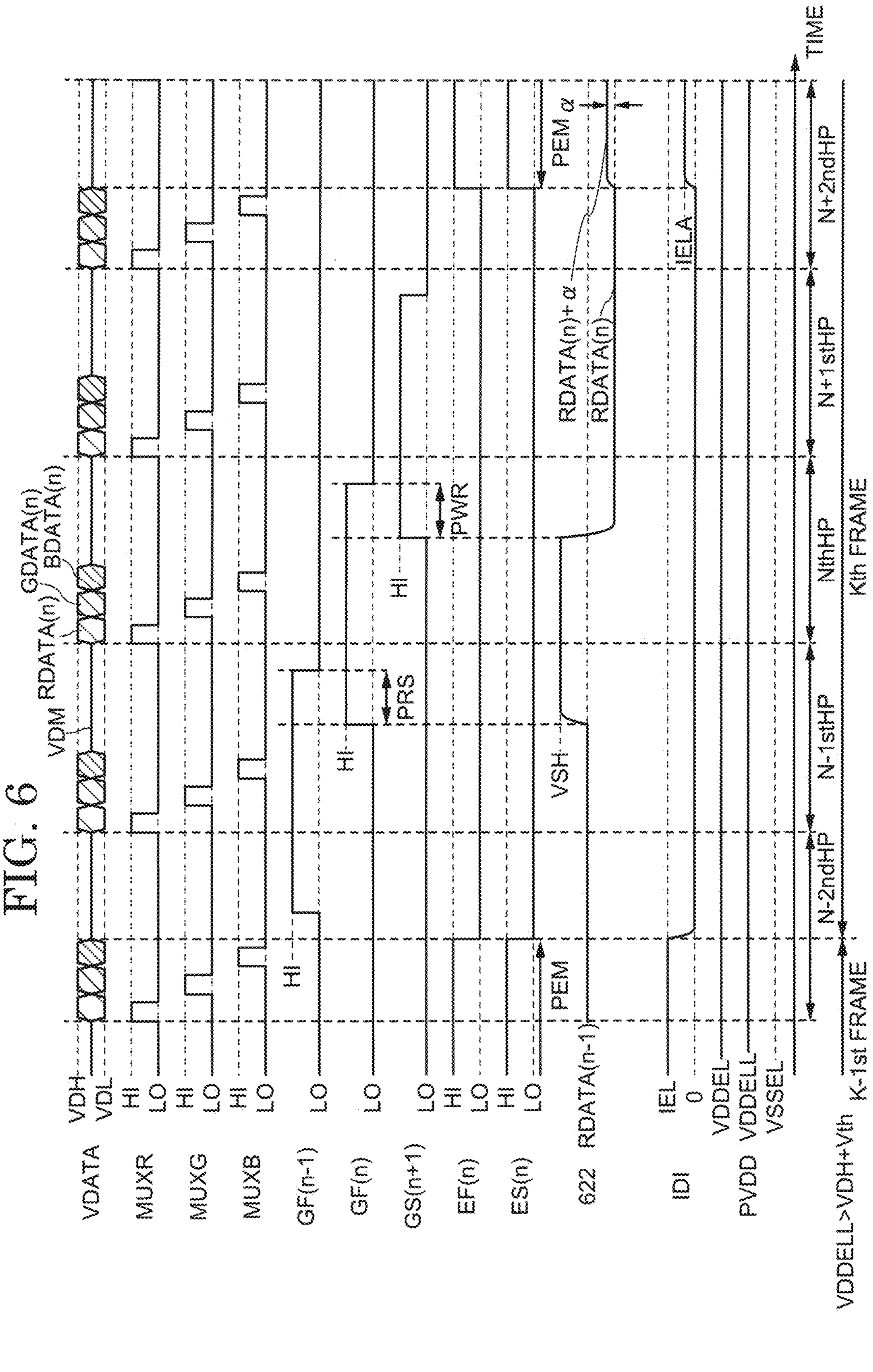
FIG. 6 is a schematic diagram showing a timing chart of the self-luminous display device according to the first embodiment of the present invention.

FIG. 6 is a diagram for describing a reset period PRS, a sampling period PWR, and an emission period PEM of a method for driving the pixels 180 (the pixel circuits 181) of the self-luminous display device 10. FIG. 6 shows the light emission period PEM of the previous frame of the current frame (K−1st FRAME), the reset period PRS, a sampling period PWR, and a light emission period PEM of the current frame (Kth FRAME). Further, FIG. 6 shows a plurality of one horizontal periods (horizontal period N−2nd HP, horizontal period N−1st HP, horizontal period Nth HP, horizontal period N+1st HP, horizontal period N+2nd HP). For example, one horizontal period is a period in which the image data signal SL (m+1) including the data signal VDATA is input to a pixel (pixel circuit) electrically connected to one second scanning signal line, the image data signal SL (m+1) including the data signal VDATA is input to a pixel (pixel circuit) electrically connected to all the second scanning signal lines, and an image of the current frame corresponding to 1 FRAME is displayed.

Referring to FIG. 6 to FIG. 12, an example of a driving method for the pixel 180 (pixel circuit 181) to display an image based on the voltage RDATA (n) included in the data signal VDATA input to the one horizontal period Nth HP will be described. In addition, the driving voltage VDDEL or the driving voltage VDDELL is supplied to the drive power line PVDD, and the reference voltage VSSEL is supplied to the reference voltage line PVSS as an example in the description of the driving method according to the first embodiment.

First, the data signal VDATA, the selection signal MUXR, the selection signal MUXG, and the selection signal MUXB will be described. The image data signal SL (m+1) including the data signal VDATA is input to each pixel 180 (pixel circuit 181) in accordance with each horizontal period. The data signal VDATA is, for example, analog data including a voltage between a voltage VDH and a voltage VDL that is lower than the voltage VDH. A voltage VDM is a voltage between the voltage VDH and the voltage VDL that is lower than the voltage VDH. For example in each of the horizontal periods, the voltage RDATA is selected using the selection signal MUXR and supplied to an image data signal line, the voltage GDATA is selected using the selection signal MUXG and supplied to the image data signal line, and the voltage BDATA is selected using the selection signal MUXB and supplied to the image data signal line. For example, the data signal VDATA is kept at the voltage VDM during a time period in which data is not selected using the selection signal MUXG.

Figure 7:
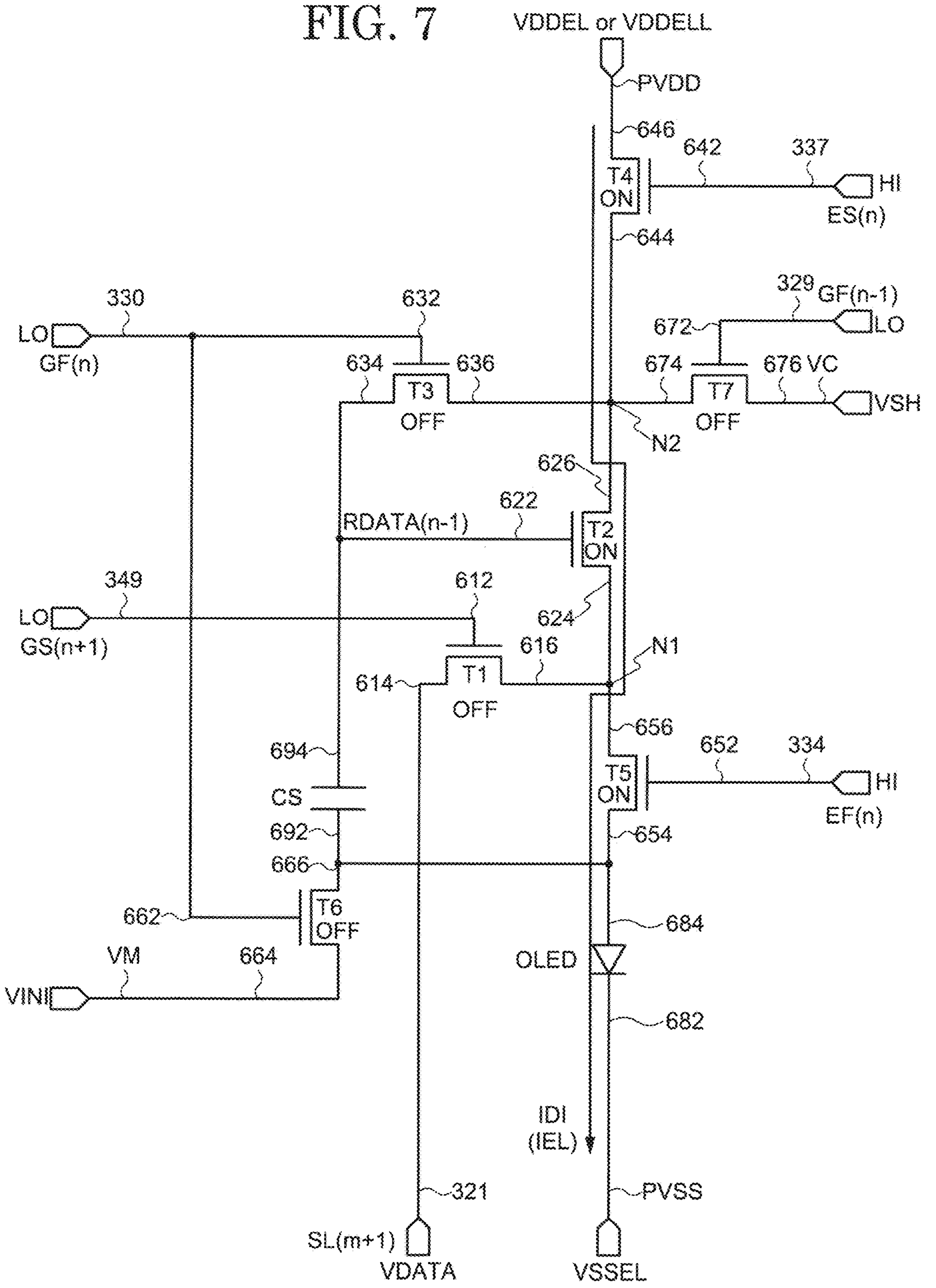
FIG. 7 is a schematic diagram showing an operation state of a pixel at the timing shown in FIG. 6.

Next, referring to FIG. 6 and FIG. 7, a method for driving the pixel 180 (the pixel circuit 181) in the light emission period PEM of the previous frame of the current frame (K−1st FRAME) will be described. The light emission period PEM of the previous frame of the current frame (K−1st FRAME) is a period in which the pixel 180 (pixel circuit 181) emits light in accordance with a voltage RDATA (n−1).

The gate electrode 622 of the transistor T2 is supplied with the voltage RDATA (n−1). The scanning signal GF (n−1), the scanning signal GF (n) and the scanning signal GS (n+1) are supplied with a low level (LO) and the transistor T1, transistor T3, transistor T6 and transistor T7 are in an off state. Further, the second light emission control signal ES (n) supplies a high level (HI) to the transistor T4, the first light emission control signal EF (n) supplies a high level (HI) to the transistor T5, and the transistor T4 and the transistor T5 are in an on state.

The transistor T2 is in an on state based on the voltage RDATA (n−1). Consequently, the transistor T2 can supply a current IEL based on a gate/source voltage Vgs and a source/drain voltage Vds according to the voltage RDATA (n−1).

The transistor T4, the transistor T2, and the transistor T5 are in an on state, and the current IEL flows from the drive power supply line PVDD to the reference voltage line PVSS. Consequently, the current IEL flows to the light emitting element OLED, and the light emitting element OLED emits light.

Next, referring to FIG. 6, a method for driving the pixel 180 (pixel circuit 181) in a period between the light emission period PEM of the previous frame of the current frame (K−1st FRAME) and the reset period PRS of the current frame will be described. The period between the emission period PEM of the previous frame of the current frame (K−1st FRAME) and the reset period PRS of the current frame is a period overlapping a part of the single horizontal period N−2nd HP and a part of the single horizontal period N−1st HP. In this period, the second light emission control signal ES (n) and the first light emission control signal EF (n) are supplied from a high level (HI) to a low level (LO), and the transistor T5 and the transistor T4 are in an off state. The scanning signal GF (n−1) is supplied from a low level (LO) to a high level (HI), and the transistor T7 is in an on state. The transistor T1, the transistor T3, and the transistor T6 remain in an off state. The transistor T4 and the transistor T5 are in an off state, no current flows from the drive power supply line PVDD to the reference voltage line PVSS, and the light emitting element OLED becomes non-light emitting (does not emit light).

Figure 8:
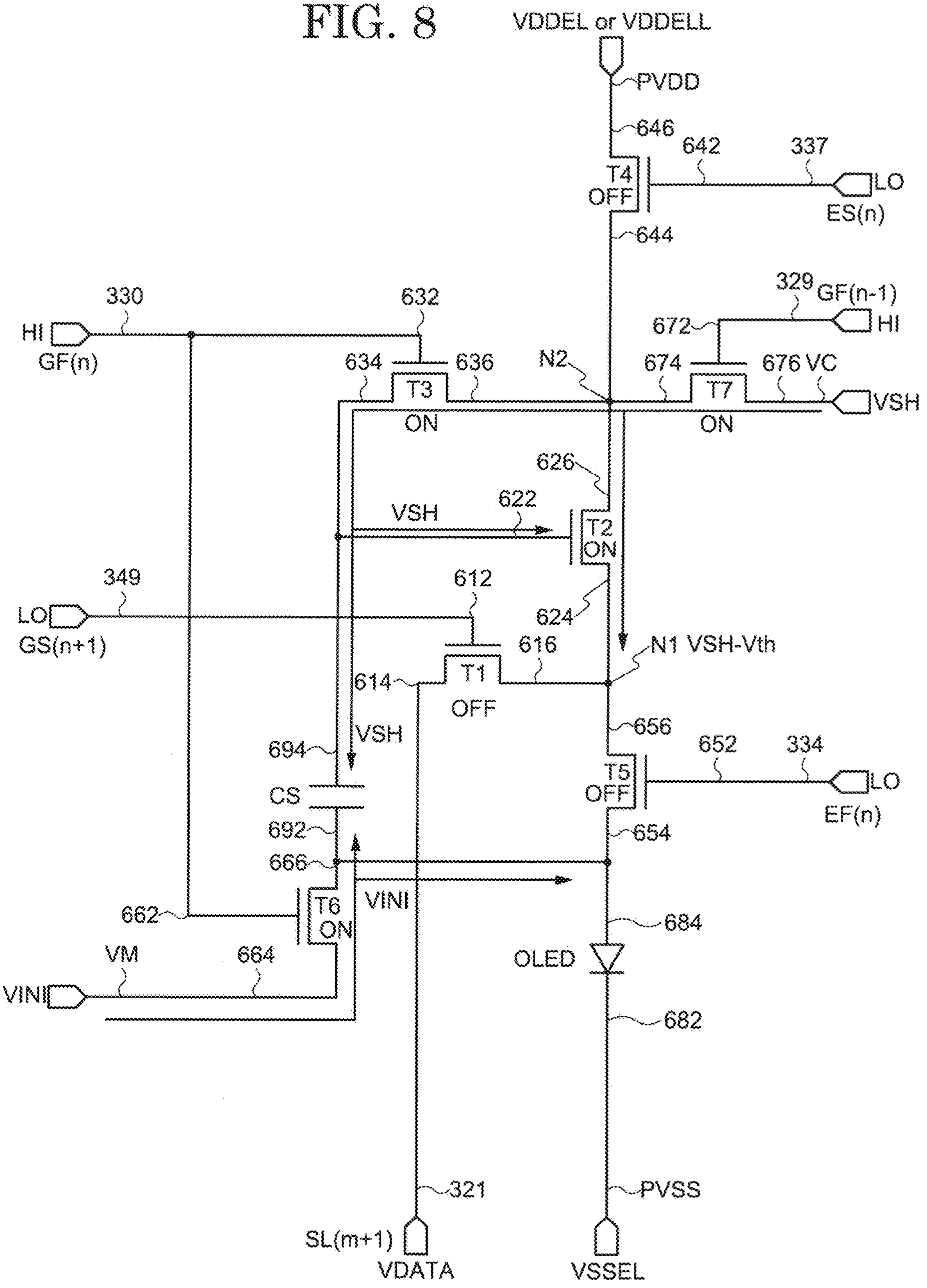
FIG. 8 is a schematic diagram showing an operation state of the pixel at the timing shown in FIG. 6.

Next, referring to FIG. 6 and FIG. 8, a method for driving the pixel 180 (pixel circuit 181) in the reset period PRS of the current frame will be described. The reset period PRS is a period in which the reset voltage VSH and the initialization voltage VINI are written to the pixel 180 (the pixel circuit 181) and is a period initializing the pixel 180 (the pixel circuit 181). The reset period PRS of the current frame is a period overlapping a part of the one horizontal period N−1st HP.

In the reset period PRS, the scanning signal GF (n) is supplied from a low level (LO) to a high level (HI), and the transistor T3 and the transistor T6 are in an on state. Further, the transistor T7 remains in an on state, and the transistor T1, the transistor T4, and the transistor T5 remain in an off state.

The reset voltage VSH is supplied to the first node N1, the second node N2, each electrode electrically connected to the first node N1, each electrode electrically connected to the second node N2, the gate electrode 622 of the transistor T2, and the second electrode 694 of the capacitive element CS, based on the transistor T7 and the transistor T3 being in an on state. In addition, the initialization voltage VINI is supplied to the first electrode 692 of the capacitive element CS, each electrode electrically connected to the first electrode 692, and the second electrode 684 of the light emitting element OLED based on the transistor T6 being in an on state. Consequently, the first node N1, the second node N2, each electrode electrically connected to the first node N1, each electrode electrically connected to the second node N2, the gate electrode 622 of the transistor T2, and the second electrode 694 of the capacitive element CS are reset, and the first electrode 692 of the capacitive element CS, each electrode electrically connected to the first electrode 692, and the second electrode 684 of the light emitting element OLED are initialized. Further, since the transistor T4 and the transistor T5 remain in an off state, no current flows from the drive power supply line PVDD to the reference voltage line PVSS, and the light emitting element OLED is non-light emitting (does not emit light).

Figure 9:
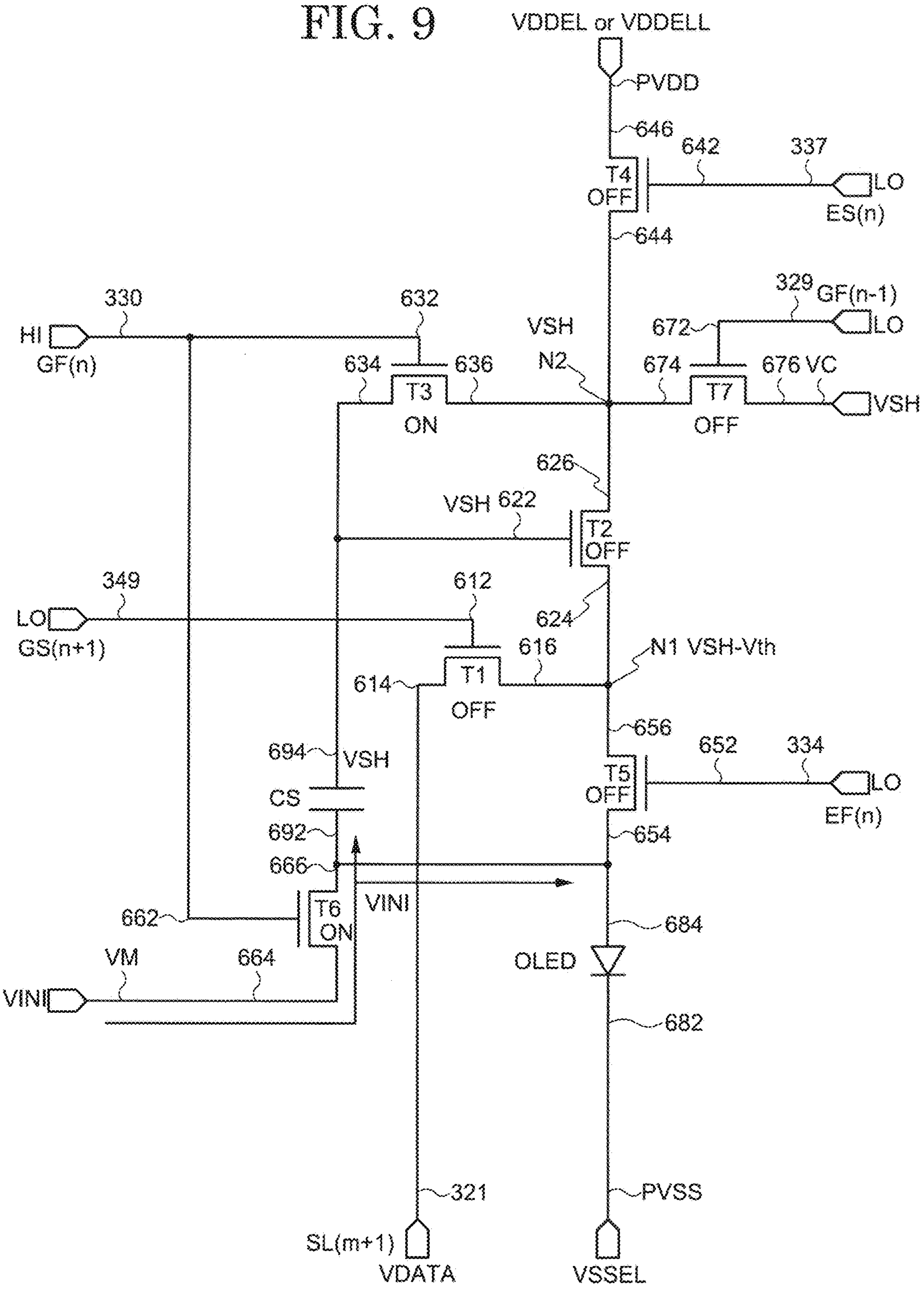
FIG. 9 is a schematic diagram showing an operation state of the pixel at the timing shown in FIG. 6.

Next, referring to FIG. 6 and FIG. 9, a method for driving the pixel 180 (pixel circuit 181) in a period between the reset period PRS and the sampling period PWR of the current frame will be described. The period between the reset period PRS and the sampling period PWR of the current frame is a period that overlaps a part of the one horizontal period N−1st HP and a part of the one horizontal period Nth HP.

The scanning signal GF (n−1) is supplied from a high level (HI) to a low level (LO), and the transistor T7 is in an off state in the period between the reset period PRS and the sampling period PWR of the current frame. Also, the transistor T3 and transistor T6 remain in an on state, and the transistor T1, transistor T2, transistor T4, and transistor T5 remain in an off state.

Further, the reset voltage VSH is held in the second node N2, each electrode electrically connected to the second node N2, the gate electrode 622 of the transistor T2, and the second electrode 694 of the capacitive element CS in the period between the reset period PRS and the sampling period PWR of the current frame. Further, since the transistor T6 remains in an on state, the initialization voltage VINI is supplied to the first electrode 692 of the capacitive element CS, each electrode electrically connected to the first electrode 692, and the second electrode 684 of the light emitting element OLED. Further, since the transistor T4 and the transistor T5 remain in an off state, no current flows from the drive power supply line PVDD to the reference voltage line PVSS, and the light emitting element OLED is non-light emitting (does not emit light).

The voltage RDATA (n) is selected based on an on signal being supplied to the selection signal MUXR in the period between the reset period PRS and the sampling period PWR of the current frame. Therefore, the image data signal SL (m+1) includes the voltage RDATA (n). Further, the image data signal SL (m+1) including the voltage RDATA (n) is supplied to the image data signal line 321. The image data signal line 321 holds the voltage RDATA (n) based on the off signal being supplied to the selection signal MUXR.

Figure 10:
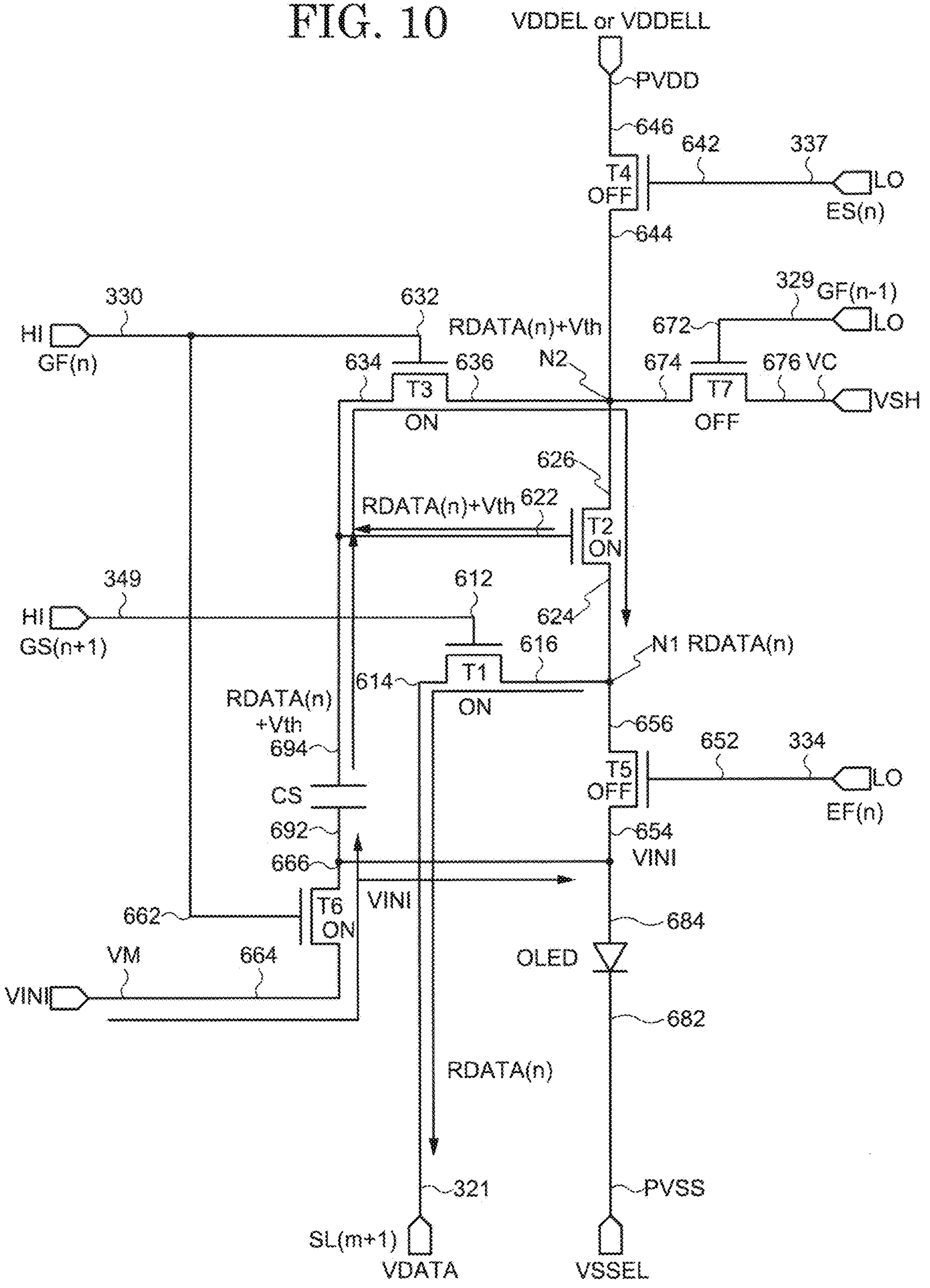
FIG. 10 is a schematic diagram showing an operation state of the pixel at the timing shown in FIG. 6.

Next, referring to FIG. 6 and FIG. 10, a method for driving the pixel 180 (pixel circuit 181) in the sampling period PWR of the current frame will be described. The sampling period PWR is a period in which the pixel 180 (the pixel circuit 181) writes a voltage corresponding to the image data to the pixel 180 (the pixel circuit 181). The sampling period PWR of the current frame is a period overlapping a part of the one horizontal period Nth HP.

The scanning signal GS (n+1) is supplied from a low level (LO) to a high level (HI), and the transistor T1 is in an on state in the sampling period PWR of the current frame. Further, the transistor T3 and the transistor T6 remain in an on state, and the transistor T4, the transistor T5, and the transistor T7 remain in an off state.

The voltage RDATA (n) is supplied to the first node N1 and each electrode electrically connected to the first node N1 based on the transistor T1 being in an on state. Further, if the voltage RDATA (n) is supplied to the first node N1, the voltage between the gate and the source of the transistor T2 also changes, and the transistor T2 is in an on state. Consequently, voltages of the second node N2, each electrode electrically connected to the second node N2, the gate electrode 622 of the transistor T2, and the second electrode 694 of the capacitive element CS drop from the voltage VSH, and become the voltage RDATA (n)+a threshold voltage Vth (RDATA (n)+Vth). In this way, a potential difference between the gate electrode 622 and the first electrode 624 of the transistor T2 becomes the same as the threshold voltage Vth of the transistor T2, the dop in voltage of the second node N2 or the like are finished, and the transistor T2 is in an off state. Further, since the transistor T6 remains in an on state, the initialization voltage VINI is supplied to each electrode electrically connected to the first electrode 692 of the capacitive element CS and the second electrode 684 of the light emitting element OLED. Further, since the transistor T4 and the transistor T5 remain in an off state, no current flows from the drive power supply line PVDD to the reference voltage line PVSS, and the light emitting element OLED is non-light emitting (does not emit light).

Although a detailed illustration is omitted, since the transistor T1 remains in an on state in this case, the voltages of the first node N1 and each electrode electrically connected to the first node N1 are fixed to the voltage RDATA (n). The charge corresponding to the threshold voltage Vth is held between the gate electrode 622 and the first electrode 624 of the transistor T2. Therefore, the sampling period PWR of the current frame is a period in which the voltage corresponding to the image data displayed by the pixel 180 (the pixel circuit 181) is written to the pixel 180 (the pixel circuit 181), and is also a period (threshold correction period) in which the charge corresponding to the threshold voltage Vth is held between the gate electrode 622 and the first electrode 624 of the transistor T2 and a period in which the threshold value of the transistor T2 is corrected.

Next, referring to FIG. 6 and FIG. 11, a method for driving the pixel 180 (pixel circuit 181) after the sampling period PWR of the current frame will be described. A period after the sampling period PWR of the current frame is a period overlapping a part of the one horizontal period Nth HP and the one horizontal period N+1st HP.

The scanning signal GF (n) is supplied from a high level (HI) to a low level (LO), and the transistor T3 is in an off state in the period after the sampling period PWR of the current frame. The transistor T1 remains in an on state, and the transistor T2, transistor T4, transistor T5, transistor T6 and transistor T7 remain in an off state. A high level (HI) is supplied to the scanning signal GS (n+1), and the transistor T1 is in an on state. Therefore, since a potential difference between a voltage of the first electrode 614 and a voltage of the second electrode 616 of the transistor T1 is 0, no current flows through the transistor T1.

Since the transistor T2, transistor T3, transistor T6 and transistor T7 are in an off state, the voltage RDATA (n)+the threshold voltage Vth (RDATA (n)+Vth) is held in the second node N2, each electrode electrically connected to the second node N2, the gate electrode 622 of the transistor T2 and the second electrode 694 of the capacitive element CS, and the initialization voltage VINI is held in the first electrode 692 of the capacitive element CS, each electrode electrically connected to the first electrode 692, and the second electrode 684 of the luminescent element OLED. Further, since the transistor T4 and the transistor T5 are in an off state, no current flows from the drive power supply line PVDD to the reference voltage line PVSS, and the light emitting element OLED is non-light emitting (does not emit light).

As shown in FIG. 6, the scanning signal GF (n) is supplied from a high level (HI) to a low level (LO), the transistor T3 is in an off state, the scanning signal GS (n+1) is supplied from a high level (HI) to a low level (LO), and the transistor T1 is in an off state.

Since the transistor T1 is in an off state in this case, the voltage RDATA (n) is held in each electrode electrically connected to the first node N1 and the first node N1. Further, since the transistor T2, the transistor T3, the transistor T6 and the transistor T7 are in an off state, the voltage RDATA (n)+threshold voltage Vth (RDATA (n)+Vth) is held the second node N2, each electrode electrically connected to the second node N2, the gate electrode 622 of the transistor T2, and the second electrode 694 of the capacitive element CS, and the initialization voltage VINI is held the first electrode 692 of the capacitive element CS, each electrode electrically connected to the first electrode 692, and the second electrode 684 of the light emitting element OLED. Further, since the transistor T4 and the transistor T5 are in an off state, no current flows from the drive power supply line PVDD to the reference voltage line PVSS, and the light emitting element OLED is non-light emitting (not emitting light).

Next, referring to FIG. 6, FIG. 11, and FIG. 12, a method for driving the pixel 180 (pixel circuit 181) in the light emission period PEM of the current frame will be described. The light emission period PEM of the current frame is a period in which the pixel 180 (the pixel circuit 181) emits light in accordance with the voltage RDATA (n). The emission period PEM of the current frame is a period overlapping the one horizontal period N+2nd HP.

As shown in FIG. 6 and FIG. 12, the scanning signal GF (n−1), the scanning signal G (n) and the scanning signal GS (n+1) are supplied with a low lever (LO), and the transistor T1, transistor T2, transistor T3, transistor T6 and transistor T7 are in an off state. Further, the transistor T4 is supplied with a high level (HI) from the second light emission control signal ES (n), the transistor T5 is supplied with a high level (HI) from the first light emission control signal EF (n), and the transistor T4 and the transistor T5 are in an on state.

Figure 11:
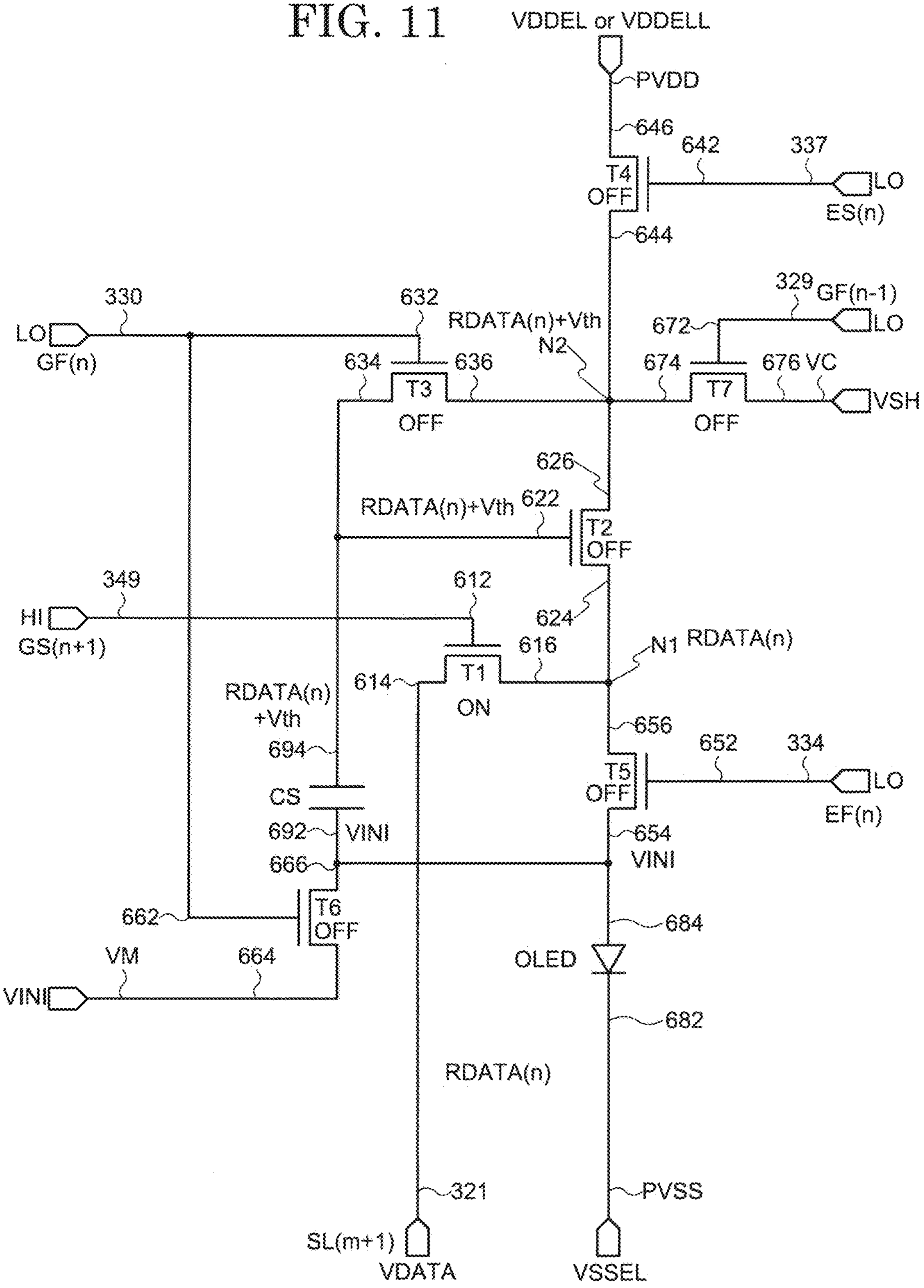
FIG. 11 is a schematic diagram showing an operation state of the pixel at the timing shown in FIG. 6.

As shown in FIG. 11, a voltage held by the second electrode 656 of the transistor T5 is RDATA (n), and a voltage held by the first electrode 654 of the transistor T5 is the initialization voltage VINI.

In the case where the transistor T5 shown in FIG. 6 and FIG. 12 is in an on state from a state in which a voltage of the second electrode 656 and the voltage of the first electrode 654 of the transistor T5 are the voltage RDATA (n) and the initialization voltage VINI, a current flows from the second electrode 656 to the first electrode 654 of the transistor T5, a redistribution of charges occurs, and the voltage of the second electrode 656 and the voltage of the first electrode 654 become the initialization voltage VINI In this case, the gate electrode 622 of the transistor T2 and the second electrode 694 of the capacitive element CS become the voltage RDATA (n)+the threshold voltage Vth−the initialization voltage VINI (RDATA (n)+Vth−VINI). Depending on a value of the voltage RDATA (n), the transistor T2 may be in an on state or an off state.

Further, for example, as shown in FIG. 6 and FIG. 12, a current flows from the second electrode 656 to the first electrode 654 of the transistor T5 based on the transistor T5 being in an on state, and if the voltages of the second electrode 656 and each of the electrodes electrically connected to the second electrode (the second electrode 684 of the light emitting element OLED, the second electrode 666 of the transistor T6, and the first electrode 692 of the capacitive element CS) increase from the voltage VINI to a voltage VINI+α, a voltage held by the first node N1 (the second electrode 656 of the transistor T5 and the first electrode 624 of the transistor T2) decreases from RDATA (n). As the first electrode 692 of the capacitive element CS increases to the voltage VINI+α, a voltage of the gate electrode 622 of the transistor T2 and a voltage of the second electrode 694 of the capacitive element CS increase from the voltage RDATA (n)+the threshold voltage Vth (RDATA (n)+Vth) to the voltage RDATA (n)+the threshold voltage Vth+a voltage α (RDATA (n)+Vth+α). Consequently, since a gate/source voltage between the gate electrode 622 and the first electrode 624 of the transistor T2 is higher than the threshold voltage Vth of the transistor T2, the transistor T2 is in an on state.

The transistor T4, the transistor T2, and the transistor T5 are in an on state, and a current IELA flows from the drive power supply line PVDD to the reference voltage line PVSS. Consequently, the current IELA flows to the light emitting element OLED, and the light emitting element OLED emits light. The current IELA is, for example, a current based on the voltage RDATA (n)+the threshold voltage Vth+the voltage α (RDATA (n)+Vth+α) written in the transistor T2. Here, for example, the voltage α is a positive value, and is a voltage value that changes in accordance with the voltage RDATA (n). For example, if the voltage RDATA (n) increases, the voltage α increases, and if the voltage RDATA (n) decreases, the voltage α decreases. For example, the voltage α is determined such that a current value that the transistor T2 supplies in accordance with the gate electrode 622, the first electrode 624, and the second electrode 626 is the same as a current value that the light emitting element OLED supplies.

The self-luminous display device 10 is driven as described above, and image data corresponding to each pixel 180 (the pixel circuit 181) is supplied to each pixel 180 (the pixel circuit 181), a current corresponding to the image data is supplied to the light emitting element OLED included in each pixel 180 (the pixel circuit 181), and each light emitting element OLED emits light with a brightness corresponding to the image data. As a result, the self-luminous display device 10 can display a desired image.

For example, in the conventional methods for driving the self-luminous display device, the driving voltage VDDEL is used as a reset voltage during a reset period. In other words, in the conventional driving methods, the driving voltage VDDEL is supplied from the driving power supply line PVDD to the second node N2 and the gate electrode 622 of the pixel 180. For example, power consumption of the self-luminous display device is reduced in the case where a low-gradation image is displayed. For example, the power supply voltage VDDEL is reduced to the driving voltage VDDELL lower than the driving voltage VDDEL in this case. However, in the conventional driving methods, if the driving voltage VDDEL is reduced to the driving voltage VDDELL, the reset voltage is also lowered, so that a brightness of the self-luminous display device is lowered.

On the other hand, the self-luminous device 10 of the present invention includes the transistor T7. The self-luminous display device 10 of the present invention can use the transistor T7 to supply the reset voltage VSH independent of the driving voltage VDDEL to the second node N2 and the gate electrode 622 based on the fact that the self-luminous display device 10 includes the transistor T7. Further, the self-luminous display device 10 of the present invention is capable of supplying the driving voltage VDDEL to the driving power supply line PVDD independent of the reset voltage VSH. Consequently, as shown in FIG. 6, for example, the reset voltage VSH supplied to the gate electrode 622 (second node N2) does not decrease even if the driving voltage VDDELL lower than the driving voltage VDDEL is supplied to the drive power supply line PVDD.

Therefore, in the self-luminous display device 10 of the present invention, there is no decrease in brightness due to a decrease in the reset voltage VSH. In the case where a low-gradation image is displayed in the self-luminous display device 10, since the power supply voltage VDDELL lower than the power supply voltage VDDEL is supplied to the pixel 180 (the pixel circuit 181), the power consumption can be reduced without the decrease in brightness.

Next, referring to FIG. 5B, FIG. 13, and FIG. 14, an example of driving methods in which the pixel 180 (the pixel circuit 181) displays black will be described. The pixel 180 (the pixel circuit 181) in the example of the driving methods for displaying black displays black based on a voltage RDATAB included in the data signal VDATA that is input to the black one horizontal period Nth HP. As described above, driving other than the black period PBWR in the low-frequency driving is the same as the high-frequency driving. Thus, driving of the pixel 180 (the pixel circuit 181) in the black period PBWR will mainly be described here. The same or similar configurations as those in FIG. 1 to FIG. 5A and FIG. 6 to FIG. 12 will not be described here. The horizontal axis of the timing charts indicates times (TIME).

First, the data signal VDATA, the selection signal MUXR, the selection signal MUXG, and the selection signal MUXB will be described. The image data signal SL (m+1) including the data signal VDATA is input to each pixel 180 (pixel circuit 181) in accordance with each horizontal period. For example, the data signal VDATA is analog data including the voltage VDL for displaying black. The voltage VDM is the voltage between the voltage VDH and the voltage VDL that is lower than the voltage VDH. In each of the horizontally periods, for example, the voltage VDL is selected using the selection signal MUXR and is supplied to the image data signal line, the voltage VDL is selected using the selection signal MUXG and is supplied to the image data signal line, and the voltage VDL is selected using the selection signal MUXB and is supplied to the image data signal line. During periods in which no data is selected using the select signal MUXG, the data signal VDATA is kept, for example, at the voltage VDM.

A method for driving the pixel 180 (pixel circuit 181) in the emission period PEM of the previous frame of the current frame (K−1st FRAME) is the same as the driving method described with reference to FIG. 1 to FIG. 5A and FIG. 6 to FIG. 12. Therefore, a description thereof will be omitted. The voltages of the first node N1, the first electrode 654 of the transistor T5, and the second electrode 684 of the light emitting element OLED from the light emission period PEM to the black period PBWR of the previous frame of the current frame (K−1st FRAME) are voltages between the voltage VDL and the voltage VDH.

Next, a method for driving the pixel 180 (the pixel circuit 181) in a period between the emission period PEM and the black period PBWR of the previous frame of the current frame (K−1st FRAME) will be described. The period between the emission period PEM and the black period PBWR of the previous frame of the current frame (K−1st FRAME) is a period overlapping a part of the one horizontal period N−2nd HP, a part of the one horizontal period N−1st HP, and a part of the one horizontal period Nth HP.

The scanning signal GF (n−1), the scanning signal GF (n), the scanning signal GS (n+1), the first light emission control signal EF (n), and the second light emission control signal ES (n) are supplied with a low level (LO). Thus, all of the transistors (transistor T1, transistor T2, transistor T3, transistor T4, transistor T5, transistor T6 and transistor T7) in the pixel circuit 181 are in an off state. Therefore, no current flows from the drive power supply line PVDD to the reference voltage line PVSS, a current IDI flowing through the light emitting element OLED is approximately 0, and the light emitting element OLED is non-light emitting (does not emit light).

Next, referring to FIG. 13 and FIG. 14, a method for driving the pixel 180 (pixel circuit 181) in the black period PBWR of the current frame will be described. The black period PBWR of the current frame is a period overlapping a part of the one horizontal period Nth HP and a part of the one horizontal period N+1st HP.

The scanning signal GS (n+1) and the first light emission control signal EF (n) in the black period PBWR of the current frame are supplied from a low level (LO) to a high level (HI), and the transistor T1 and the transistor T5 are in an on state. In addition, the transistor T2, transistor T3, transistor T4, transistor T6 and transistor T7 remain in an off state.

The voltage RDATAB including the voltage VDL is supplied to the first node N1, each electrode electrically connected to the first node N1, the first electrode 654 of the transistor T5, the second electrode 684 of the light emitting element OLED, the second electrode 666 of the transistor T6, and the first electrode 692 of the capacitive element CS based on the transistor T1 being in an on state. Although not shown, the transistor T2, transistor T3, transistor T4, transistor T6 and transistor T7 remain in an off state. Therefore, a voltage held to the second node N2, each electrode electrically connected to the second node N2, the gate electrodes 622 of the transistor T2 and the second electrodes 694 of the capacitive device CS are the same as a voltage between the voltage VDL and the voltage VDH. The voltage between the voltage VDL and the voltage VDH is a voltage supplied at the emission period PEM of the previous frame (K−1st FRAME) of the current frame.

Further, since the transistor T4 remains in an off state, no current flows from the drive power supply line PVDD to the reference voltage line PVSS, and a current flows from the image data signal line 321 to the reference voltage line PVSS. The current IDI flowing through the light emitting element OLED is a current (approximately 0) corresponding to a voltage difference (the voltage RDATAB−the reference voltage VSSEL) between a voltage of the second electrode 684 and the voltage of the first electrode 682 of the light emitting element OLED, and the light emitting element OLED is non-light emitting (does not emit light). That is, the pixel 180 (the pixel circuit 181) displays black.

A method for driving the pixel 180 (pixel circuit 181) in the light emission period PEM of the current frame (Kth FRAME) is the same as the method for driving the pixel 180 (pixel circuit 181) in the light emission period PEM of the previous frame of the current frame (K−1st FRAME). Therefore, a description thereof will be omitted. A voltage supplied to the first node N1, the first electrode 654 of the transistor T5, and the second electrode 684 of the light emitting element OLED from the light emission period PEM to the black period PBWR of the current frame (Kth FRAME) is a voltage between the voltage VDL and the voltage VDH.

A flicker of the self-luminous display device 10 can be adjusted by executing the black period PBWR. As described above, a voltage supplied to the scanning signal GF (n−1) and the scanning signal GF (n) in the black period PBWR are low level, and only the scanning signal GS (n+1) is supplied with a high level. Since the self-luminous display device 10 includes the first gate driver circuits 120 (the shift registers 121 to 123) and the second gate driver circuits 190 (the shift registers 191 to 193), the voltage to be supplied to the scanning signal GF (n−1) and the scanning signal GF (n) and the voltage to be supplied to the scanning signal GS (n+1) can be independently controlled.

2. Second Embodiment

Referring to FIG. 15 to FIG. 26, a self-luminous display device 10A according to a second embodiment will be described. A configuration of the self-luminous display device 10A is similar to the configuration of the self-luminous display device 10 described in the first embodiment except that the light emission of pixels is controlled mainly by using one light emission control circuit (a light emission control circuit 130A), the transistor T4 and the transistor T5 are controlled by a common light emission control signal EM, and the transistor T6 is a p-channel field effect transistor. The self-luminous display device 10A shown in FIG. 15 to FIG. 27 is an example, and the self-luminous display device 10A is not limited to the example shown in FIG. 15 to FIG. 27. The same or similar configurations as those of the self-luminous display device 10 described in the first embodiment and the same or similar configurations as those of FIG. 1 to FIG. 14 will not be described here.

[2-1. Overview of Self-Luminous Display 10A]

Figure 15:
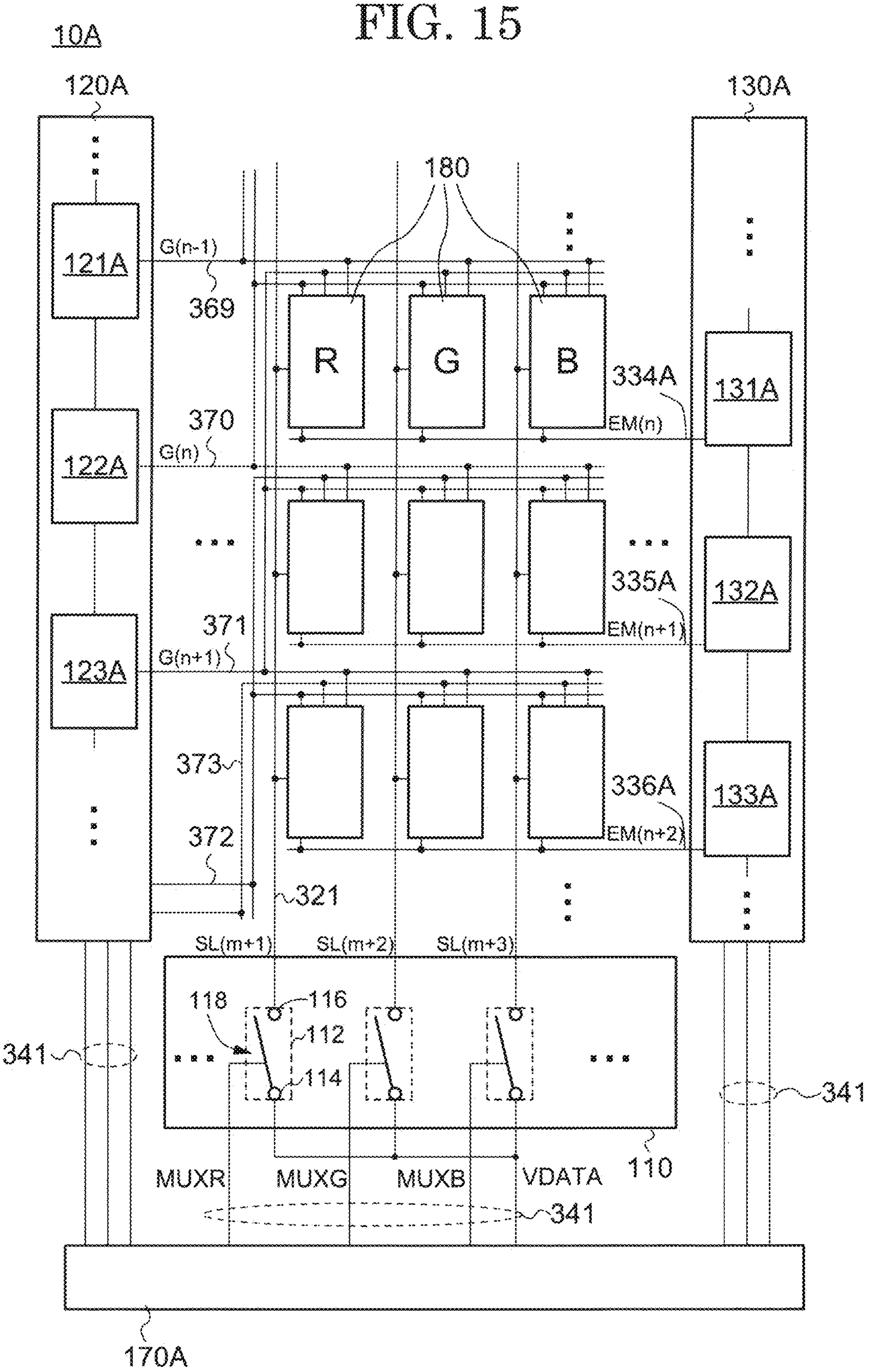
FIG. 15 is a schematic diagram showing a configuration of a self-luminous display device according to a second embodiment of the present invention.

An overview of the self-luminous-display device 10A will be described with reference to FIG. 15. FIG. 15 is a schematic plan view showing the configuration of the self-luminous display device 10A according to the second embodiment.

Figure 16:
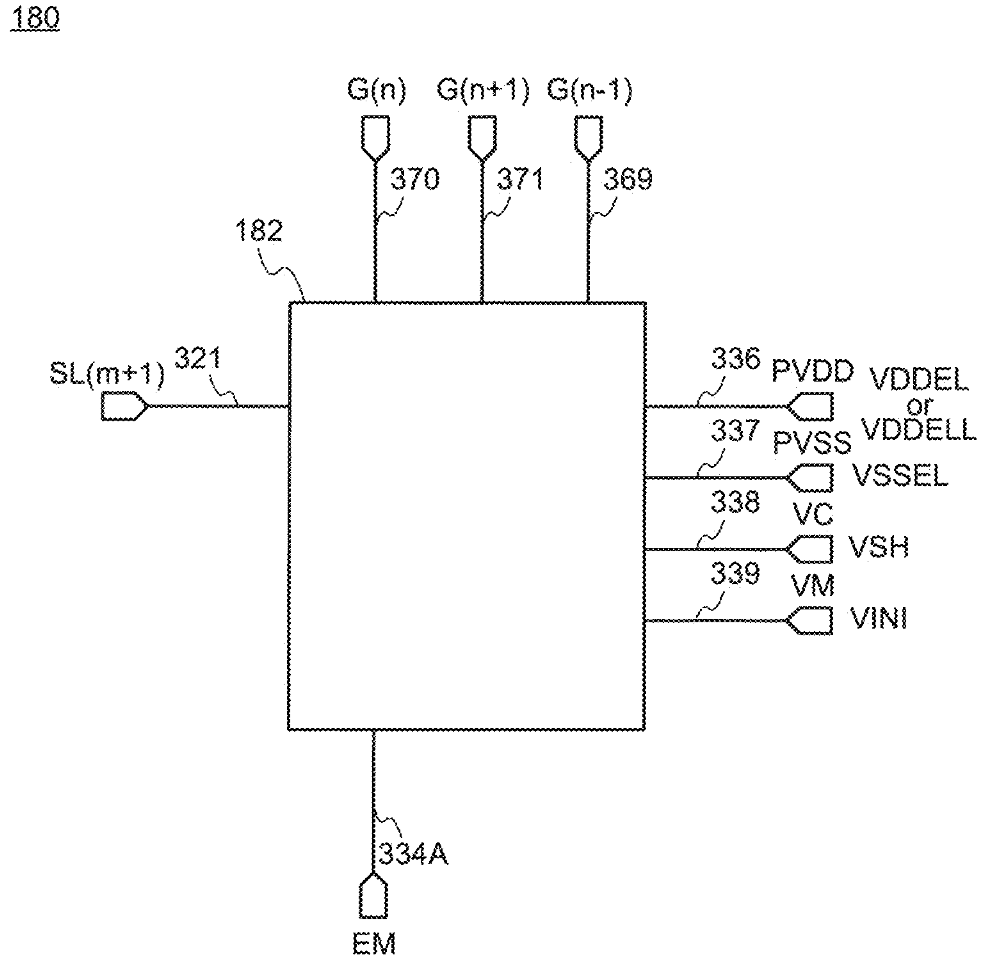
FIG. 16 is a schematic diagram showing an input signal to a pixel circuit according to the second embodiment of the present invention.

As shown in FIG. 15, the self-emissive display device 10A includes a source driver circuit 110 similar to the source driver circuit 110 shown in FIG. 1 and FIG. 2. In addition, the self-luminous display device 10A includes a configuration in which the IC chip 170 shown in FIG. 1 and FIG. 2 is replaced with an IC chip 170A, includes a configuration in which the first gate driver circuit 120 and the second gate driver circuit 190 shown in FIG. 1 and FIG. 2 are combined into a gate driver circuit 120A, and includes a configuration in which the first light emission control circuit 130 and the second light emission control circuit 140 shown in FIG. 1 and FIG. 2 are combined into the light emission control circuit 130A. Further, as shown in FIG. 15 or FIG. 16, the pixel 180 disposed in the display region 22 (FIG. 1) includes a pixel circuit 182 in the self-luminous display device 10A.

An image data signal line 321 extends from the source driver circuit 110 in the first direction D1 and is connected to a plurality of pixels 180 (pixel circuits 182) arranged in the first direction D1. Since a configuration of the source driver circuit 110 other than the above is the same as that of the first embodiment, a detailed description thereof will be omitted.

The IC chip 170A is electrically connected to the source driver circuit 110, the gate driver circuit 120A, and the light emission control circuit 130A using the connecting wire 341. Similar to the IC chip 170, the IC chip 170A supplies signals, voltages, and the like for driving each of the pixels 180 to the source driver circuit 110, the gate driver circuit 120A, the light emission control circuit 130A, and the pixel circuit 182.

Each of the source driver circuit 110, the gate driver circuit 120A, the light emission control circuit 130A and the IC chip 170A may be referred to as a control circuit alone, in the second embodiment similar to the first embodiment. In addition, a circuit group including a part or all of the source driver circuit 110, the gate driver circuit 120A, the light emission control circuit 130A, and the IC chip 170A may be referred to as a control circuit, in the second embodiment similar to the first embodiment.

The self-luminous display device 10A includes the gate driver circuit 120A and the light emission control circuit 130A. The gate driver circuit 120A includes a configuration in which the first gate driver circuit 120 and the second gate driver circuit 190 are combined. The light emission control circuit 130A includes a configuration in which the first light emission control circuit 130 and the second light emission control circuit 140 are combined. Consequently, a display device having a narrow frame region can be provided by using the self-luminous display device 10A. Further, the self-luminous display device 10A can simplify a circuit configuration of a pixel circuit and simplify a wiring configuration such as routing of wirings used for a gate electrode of transistors, rather than using the self-luminous display device 10A. Therefore, parasitic capacitance and resistance associated with the routing of the wirings in the self-luminous display device 10A can be reduced. Therefore, the parasitic capacitance and electric power associated with charges of the resistance can be reduced in the self-luminous display device 10A. Therefore, power consumption of a display device can be suppressed compared to a configuration that does not use the self-luminous display device 10A by using the self-luminous display device 10A.

[2-2. Configuration of Gate Driver Circuit 120A]

Referring to FIG. 15, an overview of the gate driver circuit 120A will be described. As shown in FIG. 15, the gate driver circuit 120A is arranged at a position adjoining the display region 22 in the second direction D2 (row direction). The gate driver circuit 120A has a configuration and a function in which the first gate driver circuit 120 and the second gate driver circuit 190 are combined. Scanning signal lines 369, 370, 371, 372, and 373 extend from the gate driver circuit 120A in the second direction D2 and are connected to the plurality of pixels 180 arranged in the second direction D2.

As shown in FIG. 15, the gate driver circuit 120A includes a plurality of shift registers (for example, shift registers 121A, 122A, and 123A). For example, the shift registers 121A, 122A, and 123A sequentially supply different scanning signals of timing (for example, a scanning signal G (n−1), the scanning signal G (n), a scanning signal G (n+1), and the like) respectively to the scanning signal lines 369, 370, and 371 based on control signals such as a clock signal and a start pulse supplied from the IC chip 170. That is, the shift registers 121A, 122A and 123A drive the pixels 180 (the pixel circuits 182) electrically connected to the scanning signal lines. The scanning signal G (n) may be referred to as a first control signal, the scanning signal G (n+1) may be referred to as a second control signal, and the scanning signal G (n−1) may be referred to as a third control signal.

For example, the shift register 121A is electrically connected to the shift register 122A, and the shift register 122A is electrically connected to the shift register 123A. For example, the shift register 121A is electrically connected to the scanning signal line 369 and supplies the scanning signal G (n−1) to the scanning signal line 369. For example, similar to the shift register 121A, the shift register 122A is electrically connected to the scanning signal line 370, and the scanning signal G (n) is supplied to the scanning signal line 370, the shift register 123A is electrically connected to the scanning signal line 371, and the scanning signal G (n+1) is supplied to the scanning signal line 371. Although not shown, a shift register of a next stage electrically connected to the shift register 123A is electrically connected to the scanning signal line 372, and a shift register of a next stage electrically connected to the shift register of the next stage is electrically connected to the scanning signal line 373.

The scanning signal G (n) includes a pulse-width equivalent to the scanning signal G (n−1), and is a signal obtained by shifting the scanning signal G (n−1). The scanning signal G (n+1) includes a pulse-width equivalent to the scanning signal G (n), and is a signal obtained by shifting the scanning signal G (n). Similar to the scanning signal G (n+1), the scanning signal G (n+2) includes a pulse-width equivalent to the scanning signal G (n+1), and is a signal obtained by shifting the scanning signal G (n+1). Further, the scanning signal G (n−1) is a signal output at the same timing as the scanning signal GF (n−1) supplied from the shift register 121 of the first gate driver circuit 120 according to the first embodiment, the scanning signal G (n) is a signal output at the same timing as the scanning signal GF (n) supplied from the shift register 122 of the first gate driver circuit 120 according to the first embodiment, and the scanning signal G (n+1) is a signal output at the same timing as the scanning signal GS (n+1) supplied from the shift register 191 of the second gate driver circuit 190 according to the first embodiment.

[2-3. Configuration of Light Emitting Control Circuit 130A]

Referring to FIG. 15, an overview of the light emission control circuit 130A will be described. The light emission control circuit 130A is arranged adjacent to the display region 22 (FIG. 1) in which the plurality of pixels 180 are arranged in the second direction D2 (row direction) and opposite to the position where the first gate driver circuit 120 is arranged with respect to the display region 22. The light emission control circuit 130A has a configuration and a function in which the first light emission control circuit 130 and the second light emission control circuit 140 are combined. Light emission control signal lines 334A, 335A and 336A extend from the light emission control circuit 130A in the second direction D2 and are connected to the plurality of pixels 180 (the pixel circuit 182) arranged in the second direction D2.

The light emission control circuit 130A includes a plurality of shift registers (for example, shift registers 131A, 132A and 133A). For example, similar to the shift registers 131, 132, and 133, the shift registers 131A, 132A and 133A sequentially supply different light emission control signals of timing (for example, light emission control signal EM (n), a light emission control signal EM (n+1), and a light emission control signal EM (n+2)) respectively to the light emission control signal lines 334A, 335A and 336A based on control signals such as a start pulse and a clock signal supplied from the IC chip 170A. That is, the shift registers 131A, 132A and 133A drive the pixels 180 (the pixel circuits 182) electrically connected to each light emission control line.

For example, the shift register 131A is electrically connected to the shift register 132A, and the shift register 132A is electrically connected to the shift register 133A. For example, the shift register 131A is electrically connected to the light emission control signal line 334A, and supplies the light emission control signal EM (n) to the light emission control signal line 334A. For example, similar to the shift register 131A, the shift register 132A is electrically connected to the light emission control signal line 335A and supplies the light emission control signal EM (n+1) to the light emission control signal line 335A, and the shift register 133A is electrically connected to the light emission control signal line 336A and supplies the light emission control signal EM (n+2) to the light emission control signal line 336A. The light emission control signal EM (n+1) has a pulse-width equivalent to the light emission control signal EM (n), and the light emission control signal EM (n+1) is a signal obtained by shifting the light emission control signal EM (n). Similarly, the light emission control signal EM (n+2) has a pulse-width equivalent to the light emission control signal EM (n+1), and the light emission control signal EM (n+2) is a signal obtained by shifting the light emission control signal EM (n+1).

[2-4. Configuration of Pixel 180]

Figure 17:
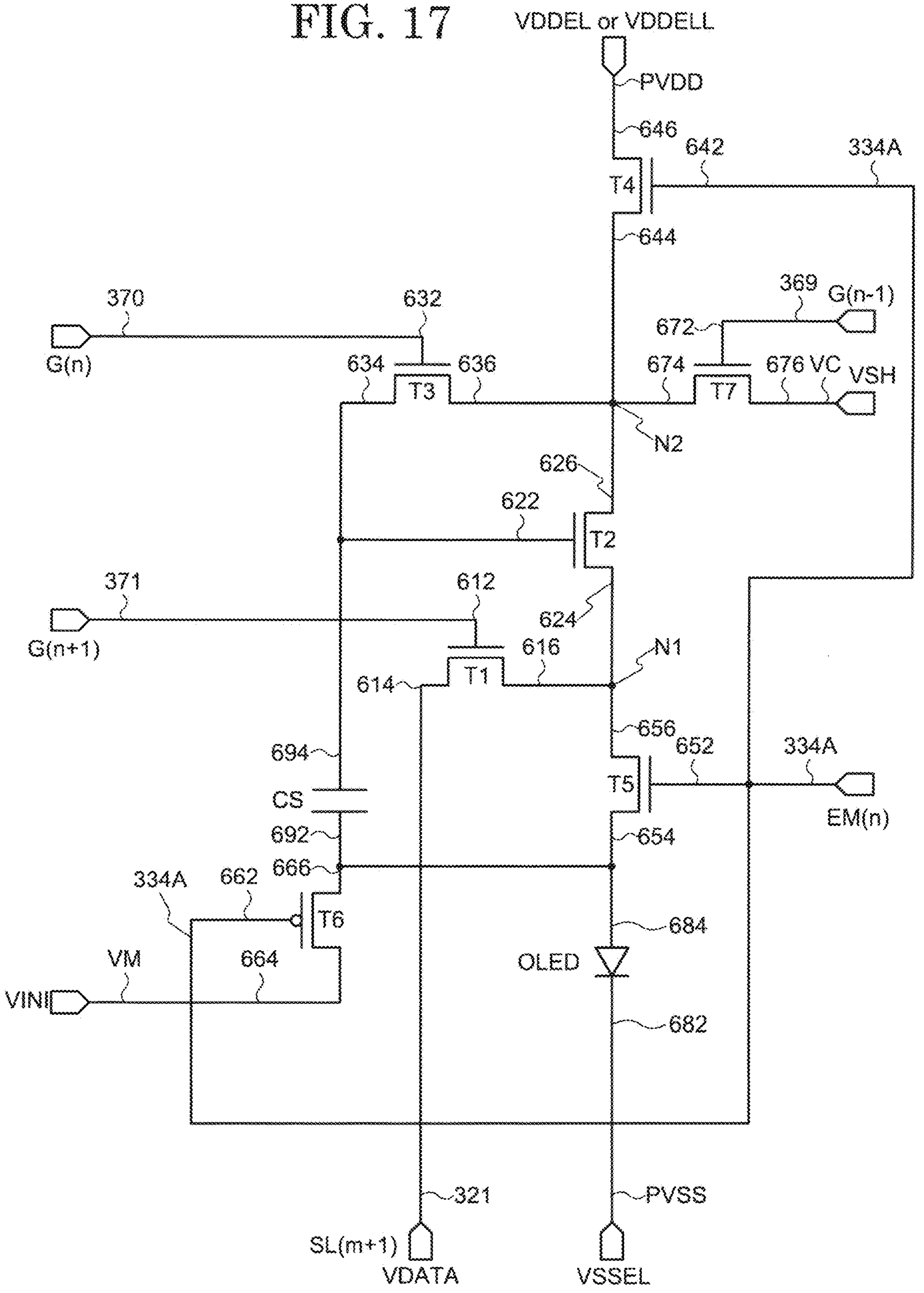
FIG. 17 is a circuit diagram showing a configuration of the pixel circuit according to the second embodiment of the present invention.

Referring to FIG. 16 and FIG. 17, an overview of the pixel 180 will be described. FIG. 16 is a schematic diagram showing an input signal to the pixel circuit 182 included in the pixel 180. FIG. 17 is a circuit diagram showing a configuration of the pixel circuit 182. FIG. 16 and FIG. 17 show an example of configurations of the pixel circuit 182 of the pixel 180 shown in FIG. 15. The configurations of the pixel 180 and the pixel circuit 182 are not limited to the configurations shown in FIG. 16 and FIG. 17. Descriptions of the same or similar configurations as those in FIG. 1 to FIG. 15 will be omitted.

The pixel circuit 182 is a circuit for driving the pixel 180 in the same manner as the pixel circuit 181, and has the same configuration and function as the pixel circuit 181. In the description of the pixel circuit 182, differences from the pixel circuit 181 will be mainly described.

As shown in FIG. 16, the light emission control signal EM is supplied to the pixel circuit 182 in place of the light emission control signal EF (n) and the light emission control signal ES (n). For example, the light emission control signal EM is supplied to the light emission control signal line 334A.

As shown in FIG. 17, the pixel circuit 182 includes the transistor T1, the transistor T2, the transistor T3, the transistor T4, the transistor T5, the transistor T6, the transistor T7, the capacitive element CS, and the light emitting element OLED in the same manner as the pixel circuit 181. As described above, the transistor T6 is the p-channel field effect transistor.

The gate electrode 642 of the transistor T4, the gate electrode 652 of the transistor T5, and the gate electrode 662 of the transistor T6 are electrically connected to the light emission control line 334A. The light emission control signal EM (n) is supplied to the light emission control signal line 334A. Conductive states and non-conductive states of the transistor T4, the transistor T5, and the transistor T6 are controlled by the light emission control signal EM (n). The transistor T4, the transistor T5, and the transistor T6 become non-conductive in the case where the signal supplied to the light emission control signal EM (n) is a low level (LO). The transistor T4, the transistor T5, and the transistor T6 become conductive in the case where the signal supplied to the light emission control signal EM (n) is a high level (HI).

Each transistor shown in FIG. 17 similar to the first embodiment may have a Group 14 element such as silicon or germanium, or an oxide exhibiting semiconductor characteristics in a channel region. For example, the channel region of each of the transistors has low-temperature polysilicon (LTPS). Each transistor is formed using a thin film transistor (TFT), and each transistor except the transistor T6 has an n-channel field effect transistor, in the self-luminous display device 10A. The self-luminous display device 10A similar to the case of the self-luminous display device 10 may appropriately adapt a configuration of the transistor, a connection of the storage capacitor, a power supply voltage, and the like according to application and specifications.

[2-5. Method for Driving Self-Luminous Display 10A]

Figure 18:
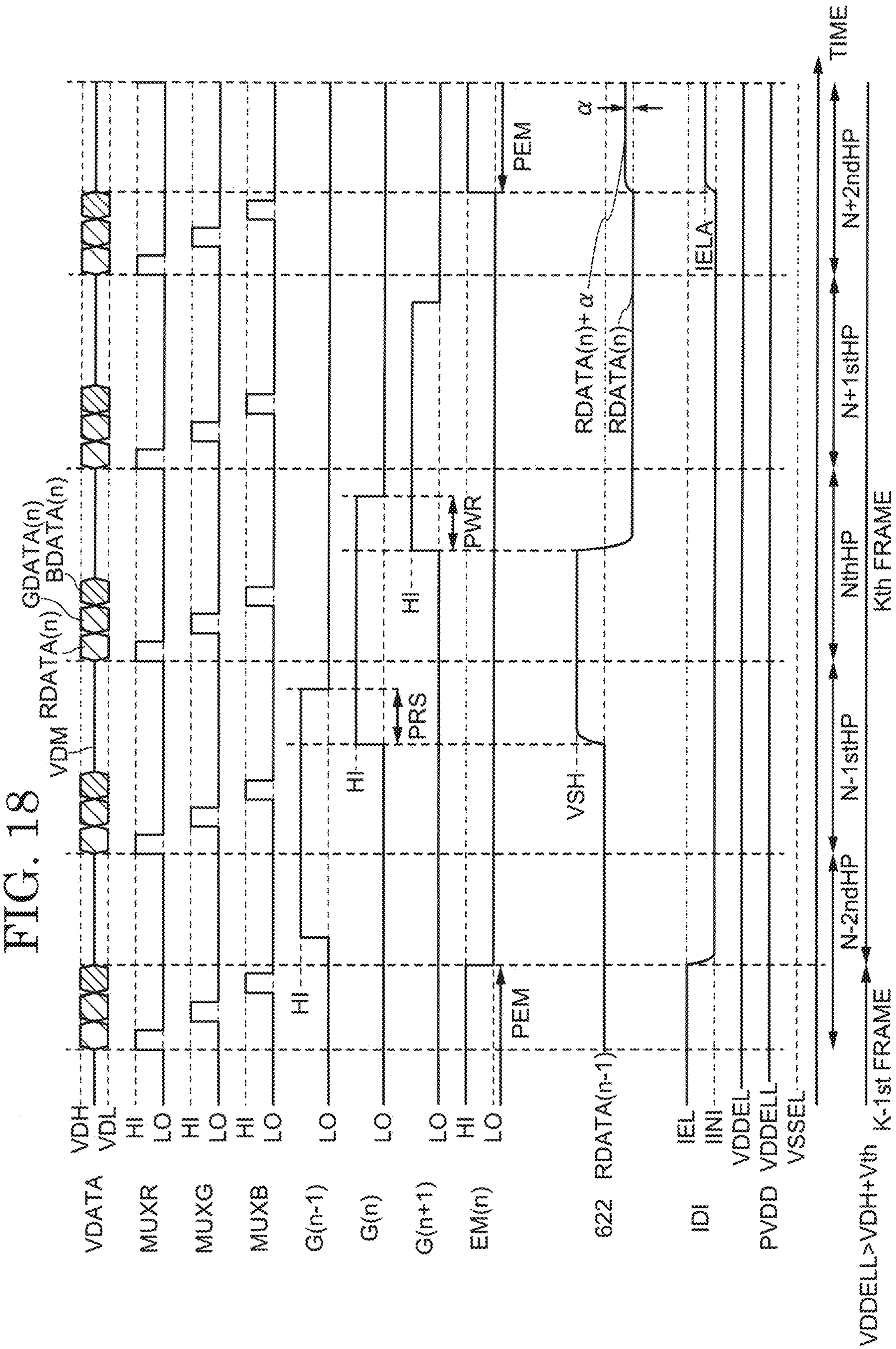
FIG. 18 is a schematic diagram showing a timing chart of the self-luminous display device according to the second embodiment of the present invention.
Figure 23:
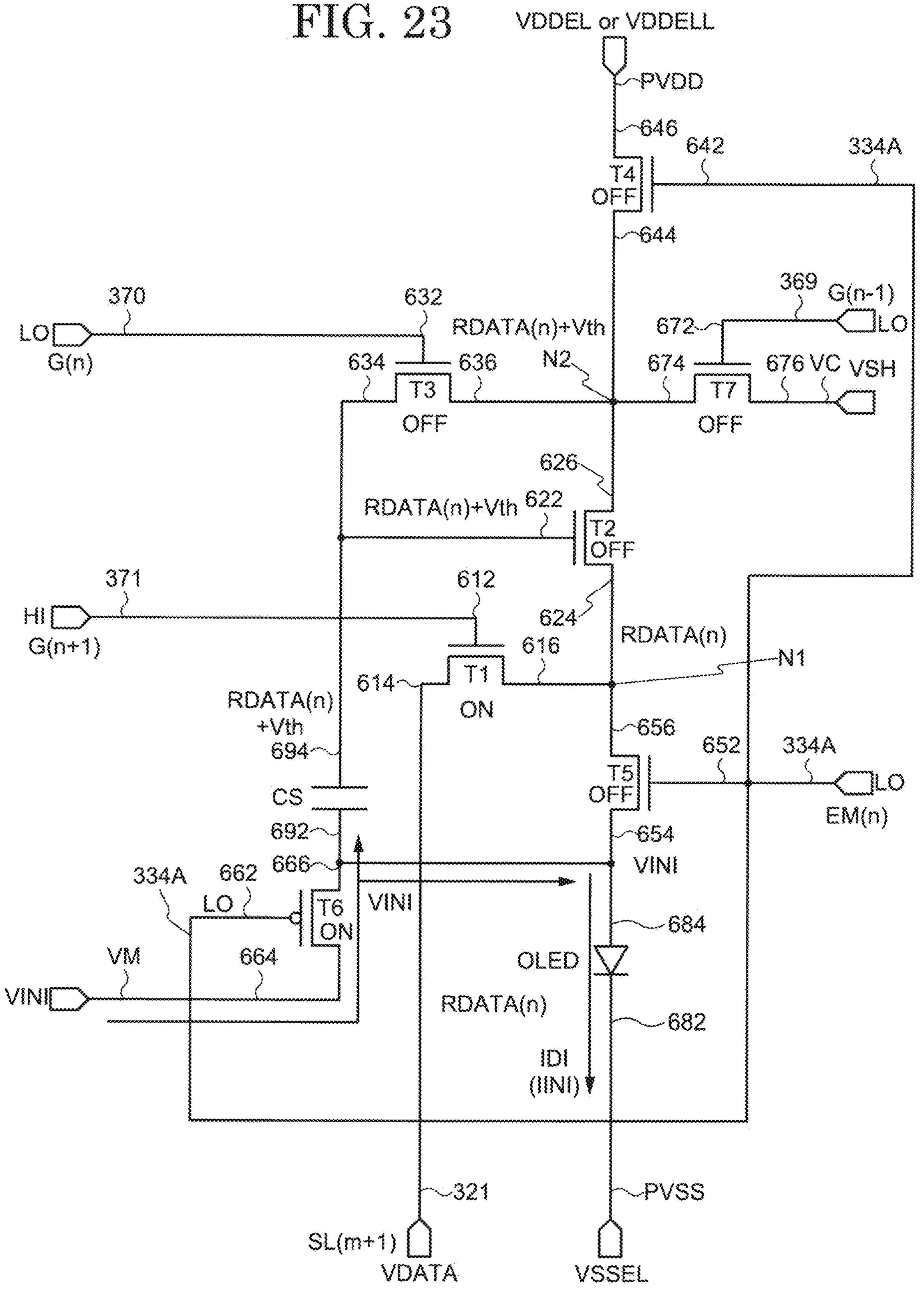
FIG. 23 is a schematic diagram showing an operation state of the pixel at the timing shown in FIG. 18.
Figure 24:
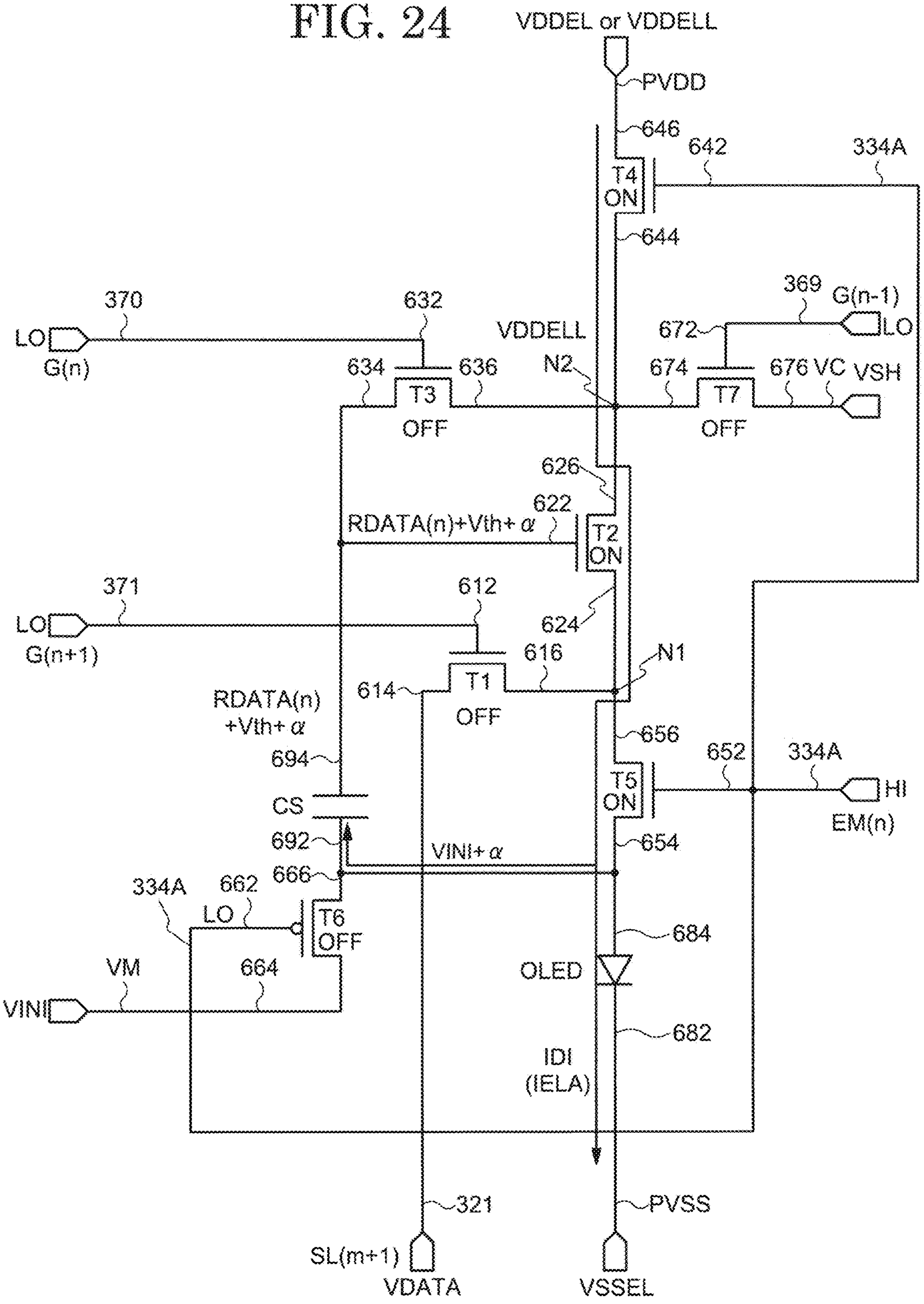
FIG. 24 is a schematic diagram showing an operation state of the pixel at the timing shown in FIG. 18.
Figure 25:
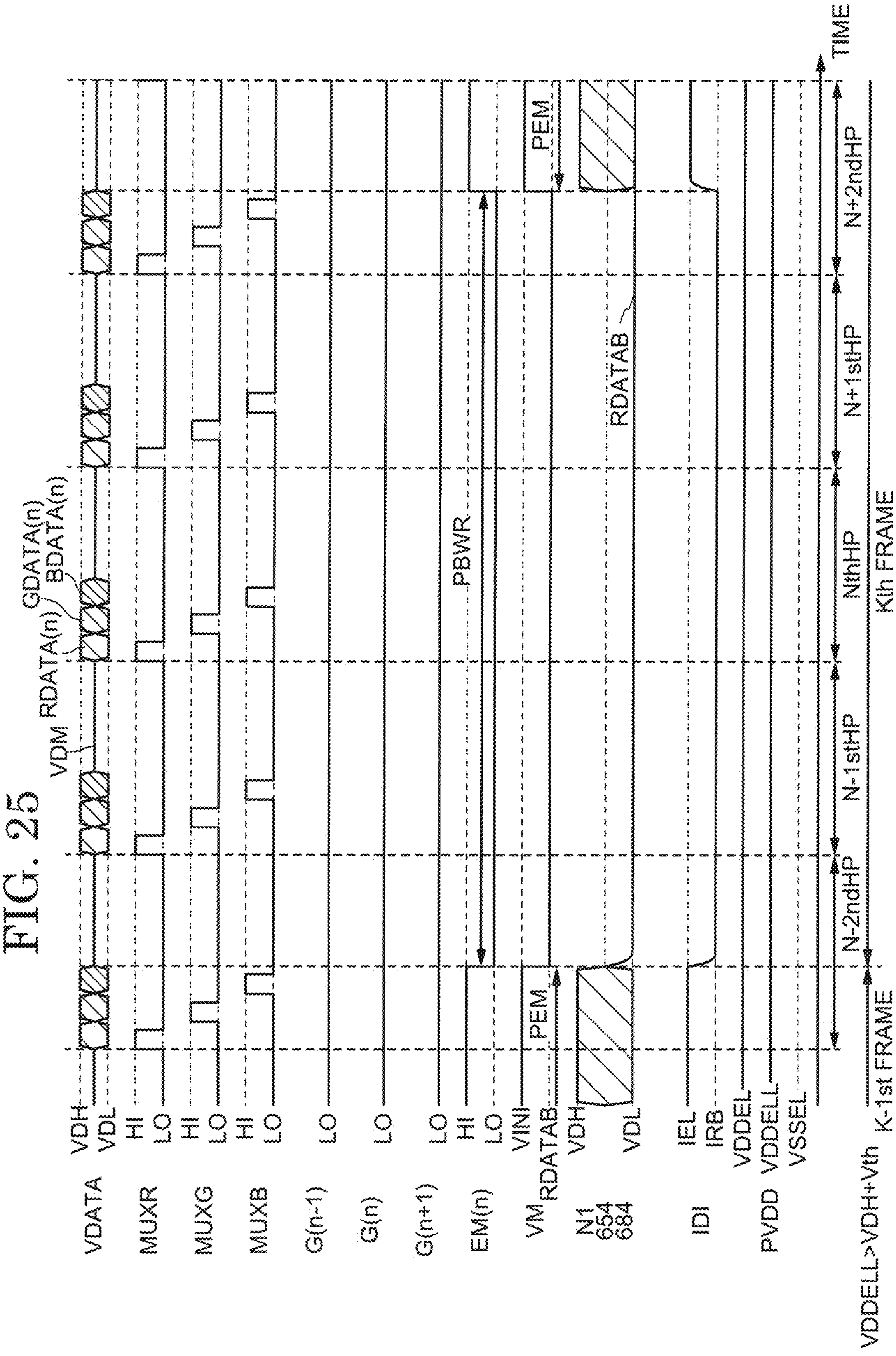
FIG. 25 is a schematic diagram showing a timing chart of the self-luminous display device according to the second embodiment of the present invention.
Figure 26:
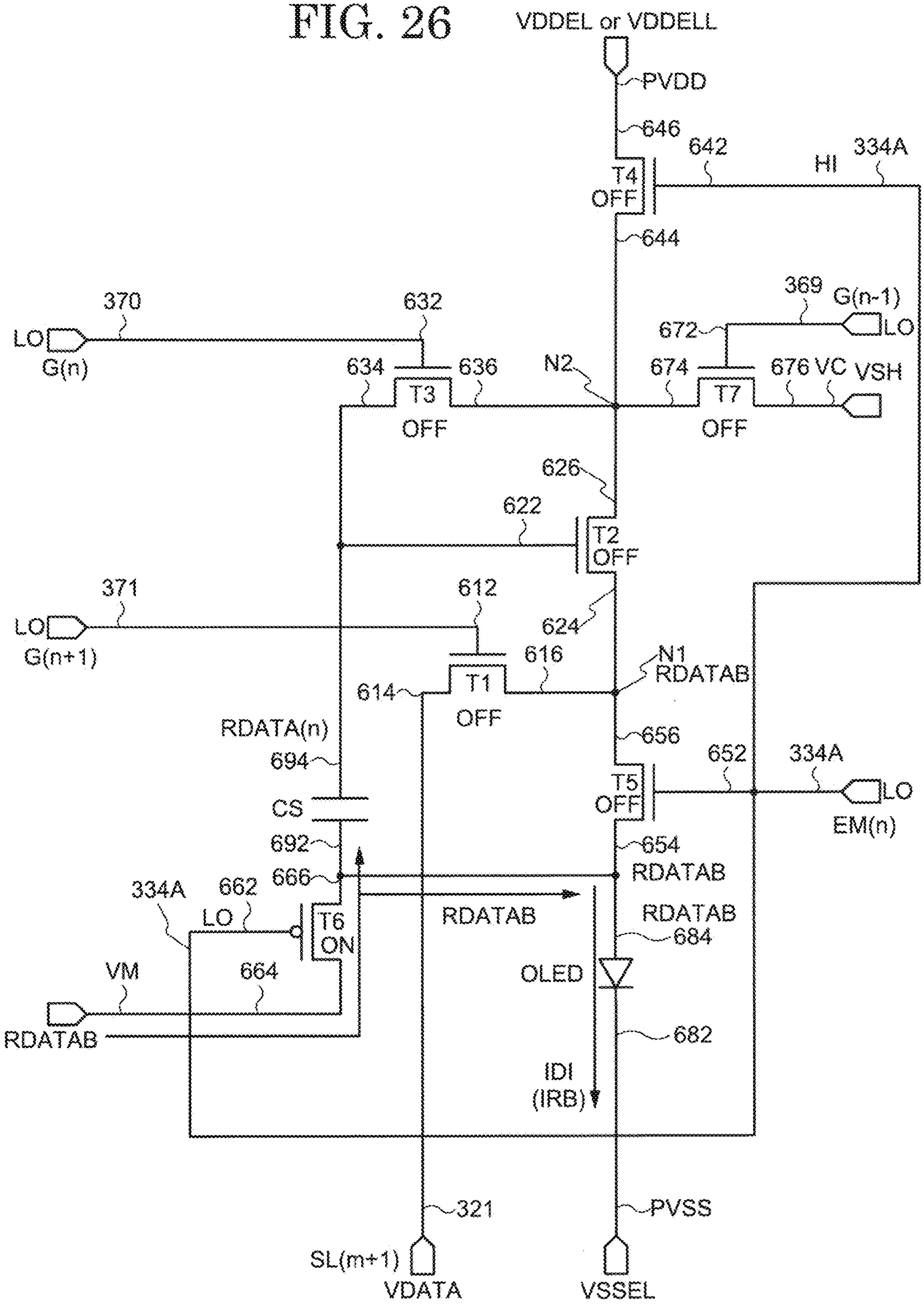
FIG. 26 is a schematic diagram showing an operation state of a pixel at the timing shown in FIG. 25.

Referring to FIG. 18 to FIG. 26, driving methods of the self-luminous display device 10A will be described. FIG. 18 and FIG. 25 are schematic diagrams showing timing charts of the self-luminous-display device 10A. FIG. 19 to FIG. 24 are schematic diagrams showing operation states of the pixel 180 (the pixel circuit 182) at the timing shown in FIG. 18. FIG. 26 is a schematic diagram showing an operation state of the pixel 180 (pixel circuit 182) at the timing shown in FIG. 25. The same or similar configurations as those in FIG. 1 to FIG. 17 will not be described here. In addition, the method for driving the self-luminous display device 10A is executed on the basis of the timing charts of FIG. 5A and FIG. 5B, similar to the method for driving the self-luminous display device 10. The horizontal axis of the timing charts indicates times (TIME).

Referring to FIG. 18 to FIG. 24, an example of a driving method for the pixel 180 (the pixel circuit 182) to display images based on RDATA (n) included in the data signal VDATA input in the one horizontal-period Nth HP is explained. In addition, similar to the first embodiment, the driving voltage VDDEL or the driving voltage VDDELL is supplied to the drive power line PVDD, and the reference voltage VSSEL is supplied to the reference voltage line PVSS as an example in the description of the driving method according to the second embodiment.

The driving methods related to the data signal VDATA, the selection signal MUXR, the selection signal MUXG, and the selection signal MUXB are the same as those in the first embodiment, and therefore, the explanation thereof will be omitted.

Figure 19:
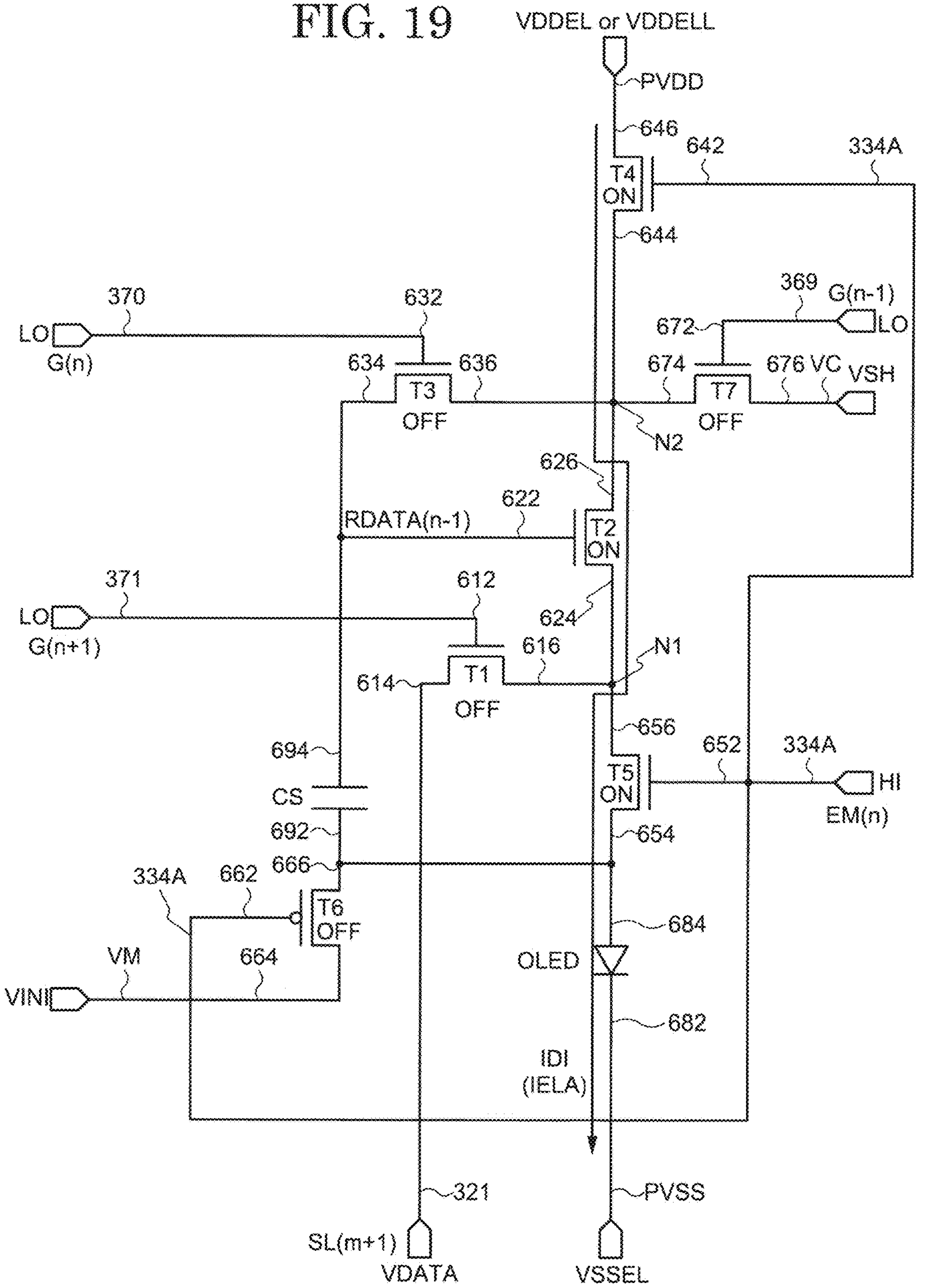
FIG. 19 is a schematic diagram showing an operation state of a pixel at the timing shown in FIG. 18.

Next, referring to FIG. 18 and FIG. 19, a method for driving the pixel 180 (the pixel circuit 182) in the light emission period PEM of the previous frame (K−1st FRAME) of the current frame will be described. The light emission period PEM of the previous frame (K−1st FRAME) of the current frame is a period in which the pixel 180 (pixel circuit 182) emits light in accordance with the voltage RDATA (n−1).

The gate electrode 622 of the transistor T2 is supplied with the voltage RDATA (n−1). The scanning signal G (n−1), the scanning signal G (n), and the scanning signal G (n+1) are supplied with a low level (LO), and the transistor T1, the transistor T3, and the transistor T7 are in an off state. Further, the light emission control signal EM (n) supplies a high level (HI) to the transistor T4 and the transistor T5, the transistor T4 and the transistor T5 are in an on state, and the transistor T6 is in an off state.

The transistor T2 is in an on state based on the voltage RDATA (n−1). Consequently, the transistor T2 can conduct the current IELA based on the gate/source voltage Vgs and the source/drain voltage Vds according to the voltage RDATA (n−1).

The transistor T4, the transistor T2, and the transistor T5 are in an on state, and the current IELA flows from the drive power supply line PVDD to the reference voltage line PVSS. Consequently, the current IELA flows to the light emitting element OLED, and the light emitting element OLED emits light.

Next, referring to FIG. 18, a method for driving the pixel 180 (pixel circuit 182) in the period between the light emission period PEM of the previous frame (K−1st FRAME) of the current frame and the reset period PRS of the current frame will be described. The light emission control signal EM (n) is supplied from a high level (HI) to a low level (LO), the transistor T5 and the transistor T4 are in an off state, and the transistor T6 is in an on state, in this period. The scanning signal G (n−1) is supplied from a low level (LO) to a high level (HI), and the transistor T7 is in an on state. The transistor T1 and the transistor T3 remain in an off state.

The first electrode 692 of the capacitive element CS, each electrode electrically connected to the first electrode 692, and the second electrode 684 of the light emitting element OLED are supplied with the initialization voltage VINI based on the transistor T6 being in an on state. Consequently, the first electrode 692 of the capacitive element CS, each electrode electrically connected to the first electrode 692, and the second electrode 684 of the light emitting element OLED are initialized. Further, the transistor T4 and the transistor T5 are in an off state, and no current flows from the drive power supply line PVDD to the reference voltage line PVSS, and a current IINI flows from the initialization voltage line VM to the reference voltage line PVSS. The current IINI flowing through the light emitting element OLED is a current (approximately 0) corresponding to a potential difference between the voltage of the second electrode 684 of the light emitting element OLED and the voltage of the first electrode 682 (the voltage RDATAB−the reference voltage VSSEL). As a result, the light emitting element OLED is non-light emitting (does not emit light).

Next, referring to FIG. 18 and FIG. 20, a method for driving the pixel 180 (pixel circuit 182) in the reset period PRS of the current frame will be described.

The scanning signal G (n) is supplied from a low level (LO) to a high level (HI), and the transistor T3 is in an on state, in the reset period PRS. Further, the transistor T6 and the transistor T7 remain in an on state, and the transistor T1, the transistor T4, and the transistor T5 remain in an off state.

The reset voltage VSH is supplied to the first node N1, the second node N2, each electrode electrically connected to the first node N1, each electrode electrically connected to the second node N2, the gate electrode 622 of the transistor T2 and the second electrode 694 of the capacitive element CS, based on the transistor T7 and the transistor T3 being in an on state. Consequently, the first node N1, the second node N2, each electrode electrically connected to the first node N1, each electrode electrically connected to the second node N2, the gate electrode 622 of the transistor T2, and the second electrode 694 of the capacitive element CS are reset. In addition, since the transistor T6 remains in an on state, the first electrode 692 of the capacitive element CS, each electrode electrically connected to the first electrode 692, and the second electrode 684 of the light emitting element OLED are kept in the initializing voltage VINI. Further, since the transistor T4 and the transistor T5 remain in an off state, no current flows from the drive power supply line PVDD to the reference voltage line PVSS, and the current IINI flows from the initialization voltage line VM to the reference voltage line PVSS. As described above, the current IINI flowing through the light emitting element OLED is approximately 0, and the light emitting element OLED is non-light emitting (does not emit light).

Figure 20:
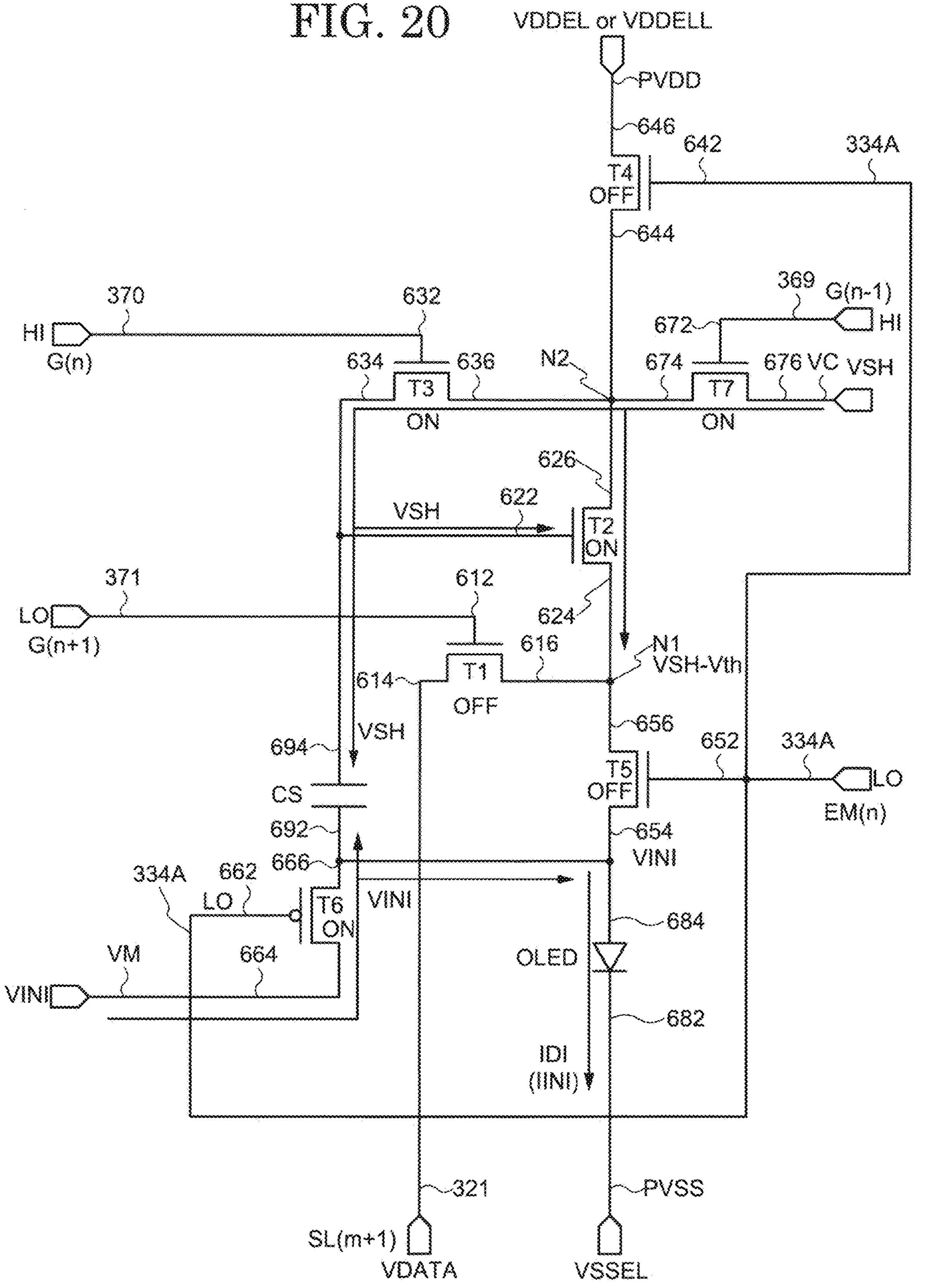
FIG. 20 is a schematic diagram showing an operation state of the pixel at the timing shown in FIG. 18.

Although a detailed illustration is omitted, the transistor T2 shown in FIG. 20 is in an on state. On the other hand, the transistor T2 will be in an off state, when a potential difference between the gate electrode 622 of the transistor T2 and the first electrode 624 (the potential difference between the gate electrode 622 and the first node N1) is the same as the threshold voltage Vth of the transistor T2.

Figure 21:
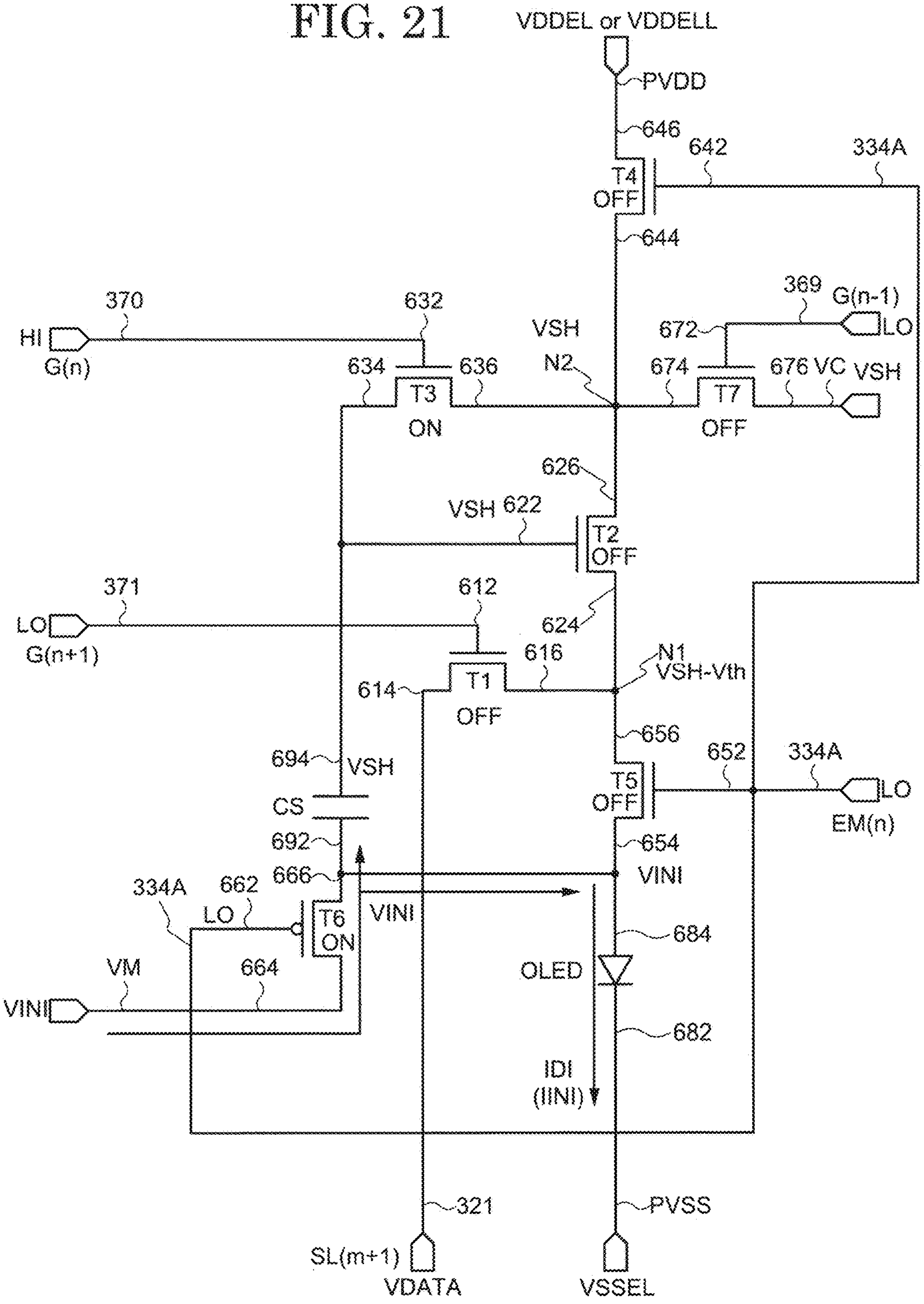
FIG. 21 is a schematic diagram showing an operation state of the pixel at the timing shown in FIG. 18.

Next, referring to FIG. 18 and FIG. 21, a method for driving the pixel 180 (pixel circuit 182) in the period between the reset period PRS and the sampling period PWR of the current frame will be described. Configurations except that the light emission control signal EM (n) is supplied and the transistor T6 is a p-channel field effect transistor, respective signals, states of respective transistors, and the like in the method for driving the pixel 180 (the pixel circuit 182) in the period between the reset period PRS and the sampling period PWR of the current frame are the same as those of the method for driving the pixel 180 (the pixel circuit 181) in the period between the reset period PRS and the sampling period PWR of the current frame in the first embodiment (see FIG. 6 and FIG. 9). Therefore, a detailed explanation of method for driving the pixel 180 (the pixel circuit 182) in the period between the reset period PRS and the sampling period PWR of the current frame will be omitted here. In addition, the current IINI flows from the initialization voltage line VM to the reference voltage line PVSS in the period between the reset period PRS and the sampling period PWR of the current frame as described above. The current IINI flowing through the light emitting element OLED is approximately 0, and the light emitting element OLED is non-light emitting (does not emit light).

Figure 22:
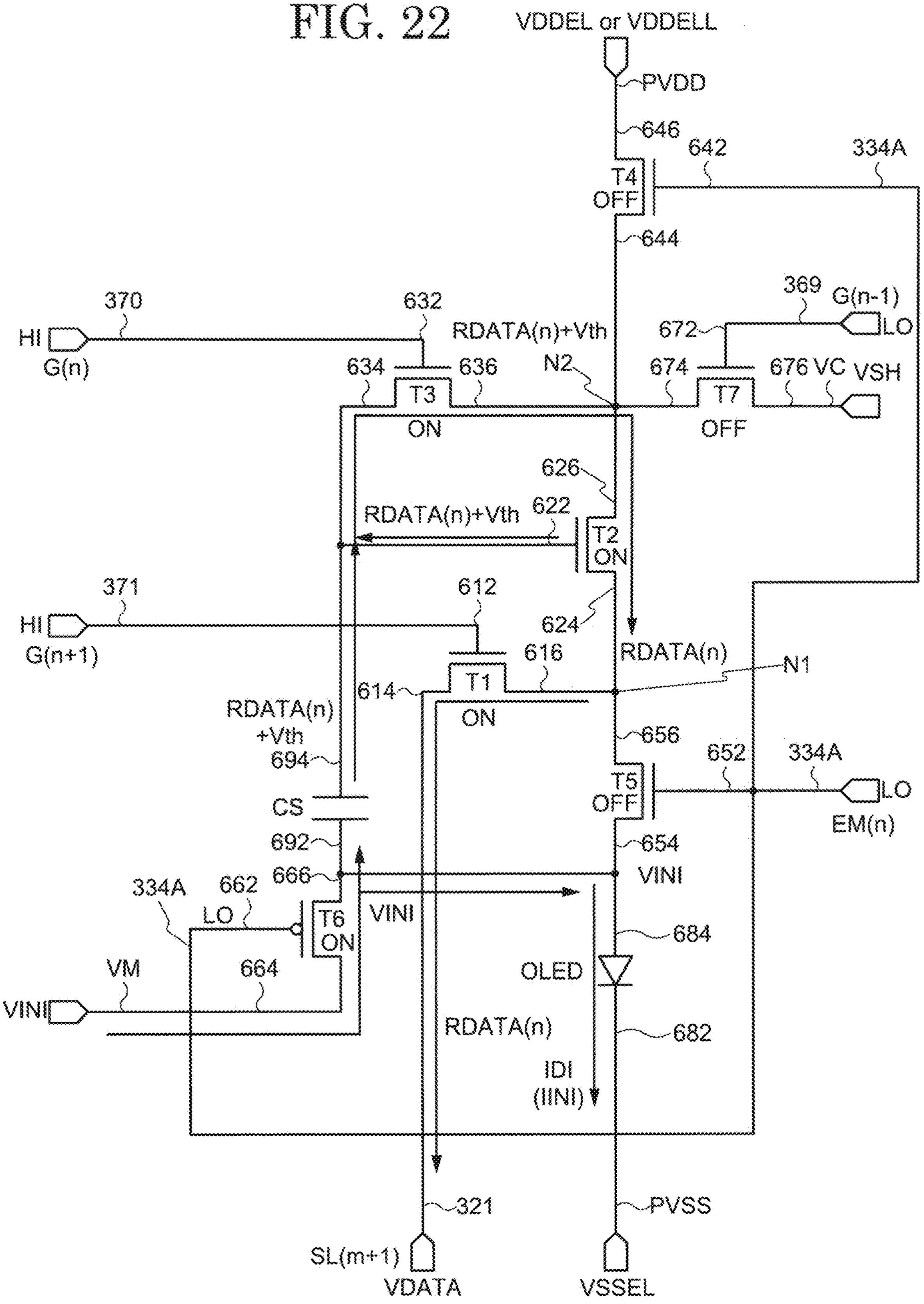
FIG. 22 is a schematic diagram showing an operation state of the pixel at the timing shown in FIG. 18.

Next, referring to FIG. 18 and FIG. 22, a method for driving the pixel 180 (pixel circuit 182) in the sampling period PWR of the current frame will be described. Configurations except that the light emission control signal EM (n) is supplied and the transistor T6 is a p-channel field effect transistor, respective signals, states of respective transistors, and the like in the method for driving the pixel 180 (the pixel circuit 182) in the sampling period PWR of the current frame are the same as those of the method for driving the pixel 180 (the pixel circuit 181) in the sampling period PWR of the current frame in the first embodiment (see FIG. 6 and FIG. 10). Therefore, a detailed explanation of the method for driving the pixel 180 (pixel circuit 182) in the sampling period PWR of the current frame will be omitted here. In addition, the current IINI flows from the initialization voltage line VM to the reference voltage line PVSS also in the period between the reset period PRS and the sampling period PWR of the current frame. The current IINI flowing through the light emitting element OLED is approximately 0, and the light emitting element OLED in non-light emitting (does not emit light).

Next, referring to FIG. 18 and FIG. 23, a method for driving the pixel 180 (the pixel circuit 182) after the sampling period PWR of the current frame will be described.

In a period after the sampling period PWR of the current frame, the scanning signal G (n) is supplied from a high level (HI) to a low level (LO), and the transistor T3 is in an off state. Furthermore, the transistor T1 and transistor T6 remain in an on state, and the transistor T2, transistor T4, transistor T5, and transistor T7 remain in an off state. A high level (HI) is supplied to the scanning signal G (n+1), and the transistor T1 is in an on state. Therefore, the voltage of the first electrode 614 and the voltage of the second electrode 616 of the transistor T1 are the voltages RDATA (n). That is, the voltage of the first electrode 614 and the voltage of the second electrode 616 of the transistor T1 are the same. Therefore, no current flows through the transistor T1.

Since the transistor T1 is in an on state and the transistor T2, the transistor T3, and the transistor T7 are in an off state, the voltage RDATA (n) is supplied to the first node N1 and each electrode electrically connected to the first node N1. When the voltage RDATA (n) is supplied to the first node N1, the voltage between the gate and the source of the transistor T2 also changes, and the transistor T2 will be in an on state. Consequently, the voltages of the second node N2, each electrode electrically connected to the second node N2, the gate electrode 622 of the transistor T2, and the second electrode 694 of the capacitive element CS drop from the voltage VSH, and become the voltage RDATA (n)+the threshold voltage Vth (RDATA (n)+Vth). In this way, the potential difference between the gate electrode 622 and the first electrode 624 of the transistor T2 becomes the same as the threshold voltage Vth of the transistor T2, the voltage drop of the second node N2 or the like is finished, and the transistor T2 is in an off state. Further, since the transistor T6 is in an on state, the initialization voltage VINI is supplied to the first electrode 692 of the capacitive element CS, each electrode electrically connected to the first electrode 692, and the second electrode 684 of the light emitting element OLED. Similar to the sampling period PWR of the current frame, the current IINI flows from the initialization voltage line VM to the reference voltage line PVSS even in the period after the sampling period PWR of the current frame. The current IINI flowing through the light emitting element OLED is approximately 0 and the light emitting element OLED in non-light emitting (does not emit light).

As shown in FIG. 18, the scanning signal G (n) is supplied from a high level (HI) to a low level (LO), the scanning signal G (n+1) is supplied from a high level (HI) to a low level (LO) after the transistor T3 is in an off state, and the transistor T1 is in an off state.

In this case, since the transistor T1 is in an off state, the voltage RDATA (n) is held in the voltages of the first node N1 and each electrode electrically connected to the first node N1. Further, since the transistor T1, the transistor T3, and the transistor T7 are in an off state, the second node N2 and each electrode electrically connected to the second node N2, the gate electrode 622 of the transistor T2, and the second electrode 694 of the capacitive element CS hold the voltage RDATA (n)+the threshold voltage Vth (RDATA (n)+Vth). Further, since the transistor T6 is in an on state, the initialization voltage VINI is supplied to the first electrode 692 of the capacitive element CS, each electrode electrically connected to the first electrode 692, and the second electrode 684 of the light emitting element OLED. Therefore, the current IINI flows from the initialization voltage line VM to the reference voltage line PVSS following the period after the sampling period PWR of the current frame. The current IINI flowing through the light emitting element OLED is approximately 0, and the light emitting element OLED is non-light emitting (does not emit light).

Next, referring to FIG. 18 and FIG. 24, a method for driving the pixel 180 (pixel circuit 182) in the light emission period PEM of the current frame will be described.

As shown in FIG. 18 and FIG. 24, the scanning signal G (n−1), the scanning signal G (n) and the scanning signal G (n+1) are supplied with a low level (LO), and the transistor T1, transistor T2, transistor T3, transistor T6 and transistor T7 are in an off state. Further, the light emission control EM(n) supplies a high level (HI) to the transistor T4 and the transistor T5, and the transistor T4, the transistor T5, the transistor T6 are in an on state, and the transistor T6 is in an off state.

As described in FIG. 11, the voltage held by the second electrode 656 of the transistor T5 is RDATA (n), and the voltage held by the first electrode 654 of the transistor T5 is the initialization voltage VINI. When the transistor T5 is in an on state from a state in which the voltage of the second electrode 656 of the transistor T5 and the voltage of the first electrode 654 are the voltages RDATA (n) and the initialization voltage VINI, the current flows from the second electrode 656 of the transistor T5 to the first electrode 654, and redistribution of charges occurs, so that the voltage of the second electrode 656 and the voltage of the first electrode 654 become the initialization voltage VINI as described in FIG. 11. Other operations are also the same as those described with reference to FIG. 11.

As shown in FIG. 18 and FIG. 24, a driving method similar to the method for driving the pixel 180 (pixel circuit 181) in the light emission period PEM of the current frame described with reference to FIG. 6, FIG. 11, and FIG. 12 of the first embodiment is executed in the method for driving in the second embodiment. Therefore, a detailed explanation of method for driving the pixel 180 (pixel circuit 182) in the light emission period PEM of the current frame according to the second embodiment will be omitted.

To explain briefly, similar to the method for driving the pixel 180 (pixel circuit 181) in the light emission period PEM of the current frame of the first embodiment, the transistor T2 is in an on state because the gate/source voltage between the gate electrode 622 and the first electrode 624 of the transistor T2 becomes higher than the threshold voltage Vth of the transistor T2 even in a light emission period PEM of the current frame of the second embodiment. The transistor T4, the transistor T2, and the transistor T5 are in an on state, and the current IELA flows from the drive power supply line PVDD to the reference voltage line PVSS. Consequently, the current IELA flows to the light emitting element OLED, and the light emitting element OLED emits light.

As described above, the transistor T4, the transistor T5, and the transistor T6 can be controlled at the same timing based on a common single emission control signal EM, based on the fact that the transistor T6 in the self-luminous display device 10A according to the second embodiment is the p-channel field effect transistor. That is, the pixel circuit 182 can be controlled by using one light emission control circuit (the light emission control circuit 130A) to control the light emission of the pixel 180. Similar to the one light emission control circuit (the light emission control circuit 130A), the transistor T4, the transistor T5, and the transistor T6 can be controlled using a shift pulse output by one common gate driver circuit. Therefore, manufacturing cost of the self-luminous display device 10A can be reduced because the circuit configuration can be simplified as compared with a self-luminous display device in which the transistor T6 is not a p-channel transistor.

Next, referring to FIG. 25 and FIG. 26, an example of driving methods for the pixel 180 (pixel circuit 182) to display black based on the voltage RDATAB supplied from the initialization voltage line VM will be described. Similar to the first embodiment, the driving other than the black period PBWR in the low-frequency driving is same as the high-frequency driving. Thus, driving of the pixel 180 (pixel circuit 182) in the black period PBWR will mainly be described here. Descriptions of the same or similar configurations as those in FIG. 1 to FIG. 24 will be omitted. The horizontal axis of the timing charts indicates times (TIME).

First, since the data signal VDATA, the selection signal MUXR, the selection signal MUXG, and the selection signal MUXB are the same as those described with reference to FIG. 6 of the first embodiment, the description thereof will be omitted.

A method for driving the pixel 180 (pixel circuit 182) in the light emission period PEM of the previous frame (K−1st FRAME) of the current frame is the same as the driving method described with respect to FIG. 1 to FIG. 5A and FIG. 18 to FIG. 24 of the first embodiment. Therefore, a description thereof will be omitted. In addition, a voltage of the first node N1, the first electrode 654 of the transistor T5 and the second electrode 684 of the light emitting element OLED in the light emission period PEM of the previous frame (K−1st FRAME) of the current frame is a voltage between the voltage VDL and the voltage VDH.

Next, a method for driving the pixel 180 (the pixel circuit 182) in the black period PBWR, which is executed following the emission period PEM of the previous frame of the current frame (K−1st FRAME), will be described. The black period PBWR of the current frame is a period overlapping a part of the one horizontal period N−2nd HP, the one horizontal period N−1st HP, the one horizontal period Nth HP, the one horizontal period N+1st HP, and a part of the one horizontal period N+2nd HP.

The scanning signal G (n−1), the scanning signal G(n), the scanning signal G (n+1), and the light emission control signal EM (n) are supplied with a low level (LO). The transistor T1, transistor T2, transistor T3, transistor T4, transistor T5, and transistor T7 are in an off state, and the transistor T6 is in an on state.

Since the transistor T6 is in an on state, the voltage RDATAB is supplied to the first electrode 692 of the capacitive element CS, each electrode electrically connected to the first electrode 692, and the second electrode 684 of the light emitting element OLED. Therefore, the current IRB flows from the initialization voltage line VM to the reference voltage line PVSS. The current IRB flowing through the light emitting element OLED is a current for displaying black based on the voltage RDATAB, and the light emitting element OLED almost does not emit light (does not emit light). Thus, the pixel 180 displays black.

The method for driving the pixel 180 (pixel circuit 182) in the light emission period PEM of the current frame (Kth FRAME) is the same as the method for driving the pixel 180 (pixel circuit 182) in the light emission period PEM of the previous frame (K−1st FRAME) of the current frame. Therefore, a description thereof will be omitted. In addition, a voltage of the first node N1, the first electrode 654 of the transistor T5 and the second electrode 684 of the light emitting element OLED in the light emission period PEM of the current frame (Kth FRAME) is a voltage between the voltage VDL and the voltage VDH.

In the black period PBWR of the self-luminous display device 10A, the self-luminous display device 10A can display black by supplying the voltage RDATAB from the initialization voltage line VM to the second electrode 684 of the light emitting element OLED. Consequently, the self-luminous display device 10A can adjust flickering.

Further, in the black period PBWR of the self-luminous display device 10A, it is not necessary to supply data for displaying black from the image data signal line 321 to the first node N1 via the transistor T1. Therefore, it is not necessary to drive the transistor T5 electrically connected to the first node N1 using the light emission control signal EM. Therefore, the driving method of the self-luminous display device 10A can be simplified and power consumption of the self-luminous display device 10A can be reduced in the black period PBWR of the self-luminous display device 10A, because the light emission control circuit 130A does not need to be driven.

3. Third Embodiment

Figure 27:
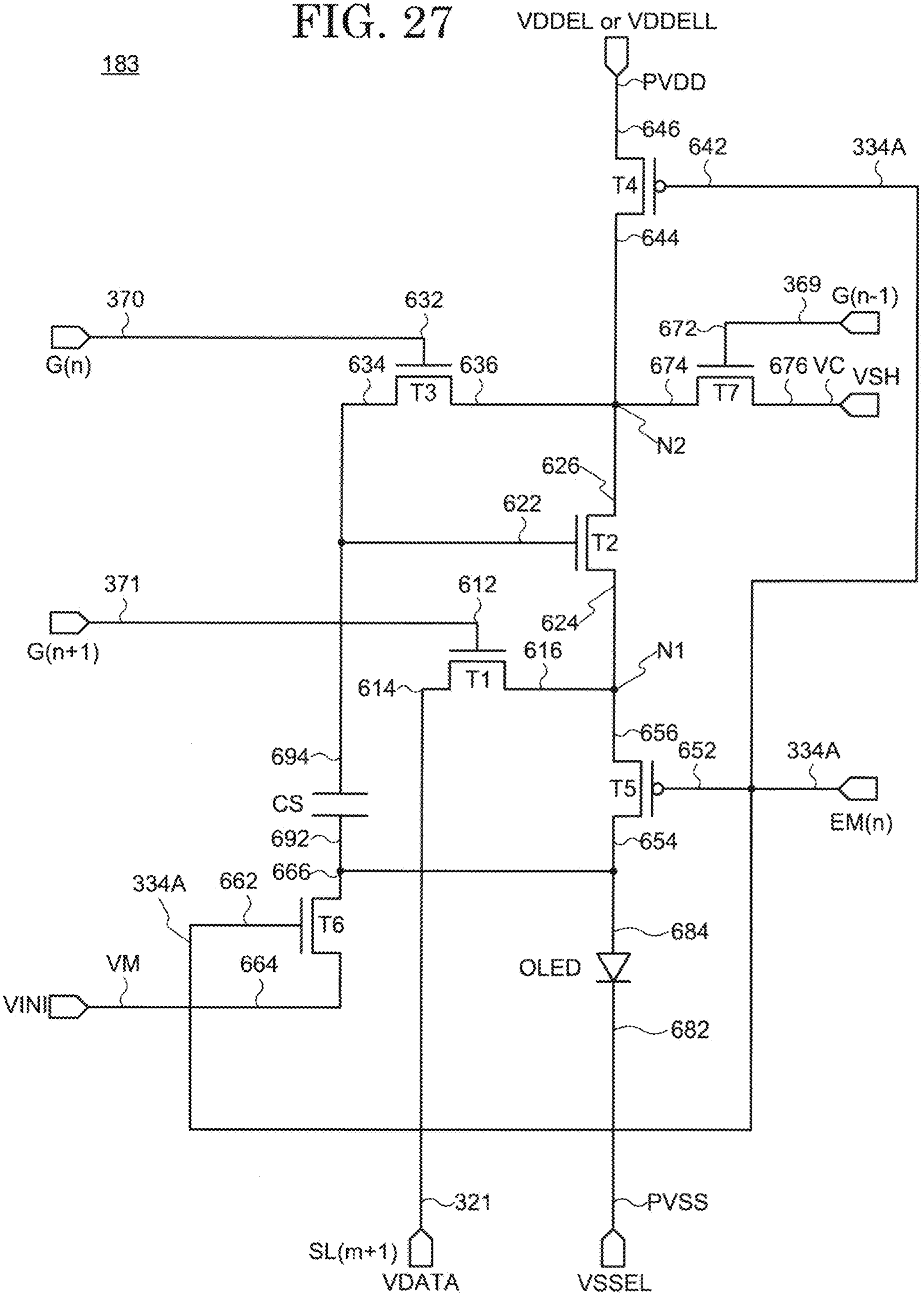
FIG. 27 is a circuit diagram showing a configuration of a pixel circuit according to a third embodiment of the present invention.
Figure 28:
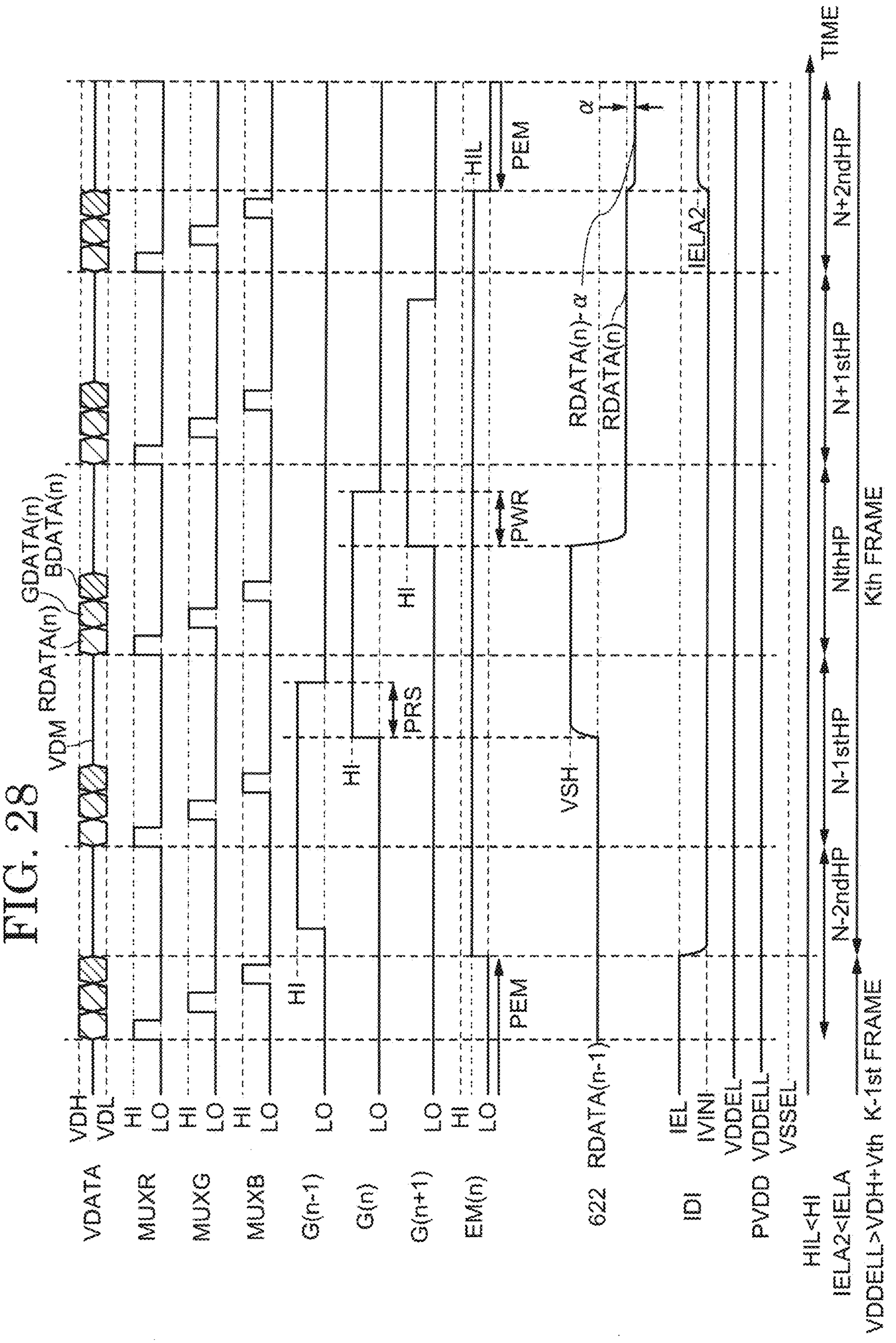
FIG. 28 is a schematic diagram showing a timing chart of a self-luminous display device according to the third embodiment of the present invention.
Figure 29:
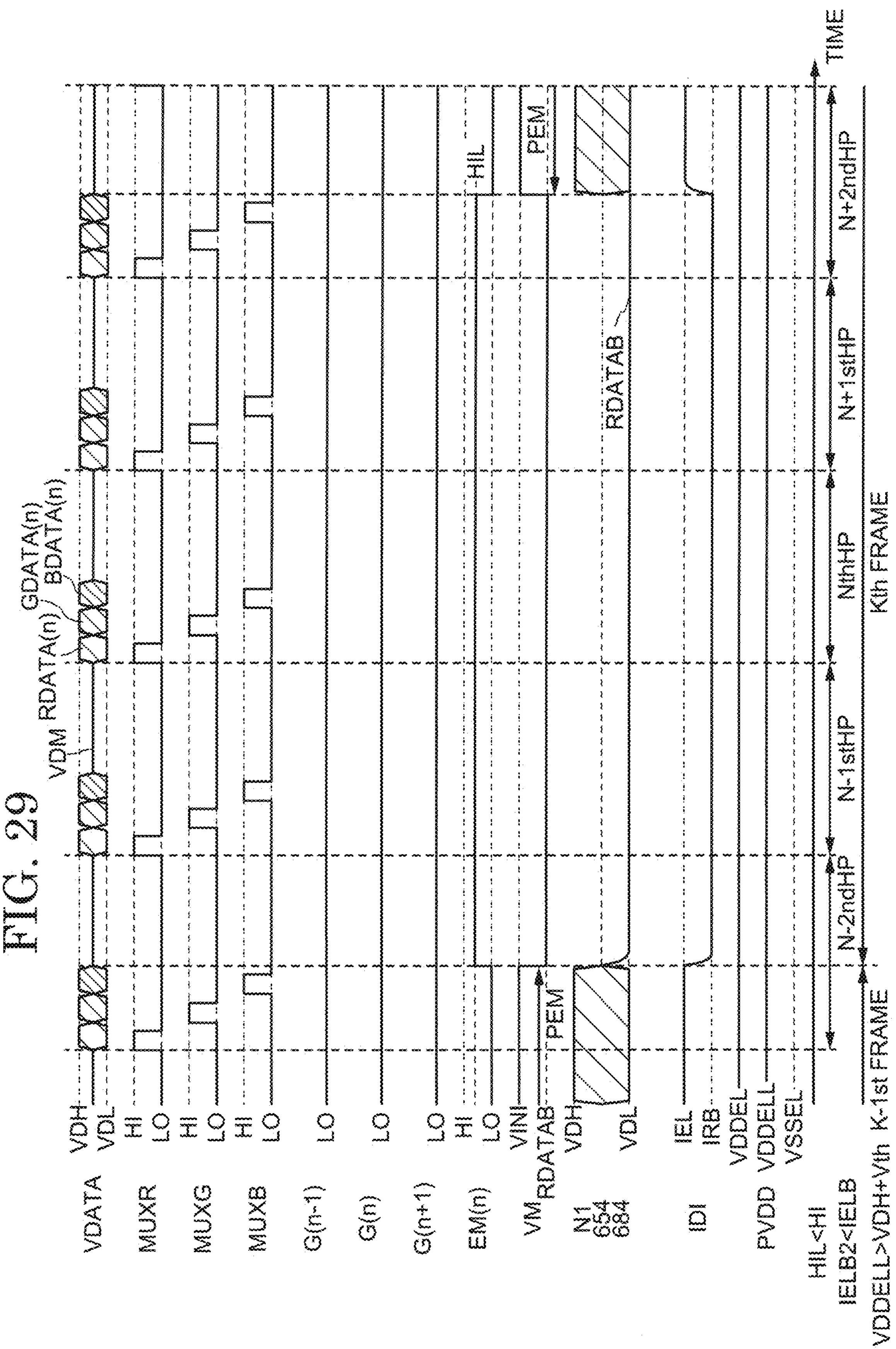

A pixel circuit 183 according to a third embodiment will be described referring to FIG. 27 to FIG. 29. In the pixel circuit 183, the transistors of the transistor T4, the transistor T5, and the transistor T6 are opposite in polarity to the pixel circuit 182. Specifically, in the pixel circuit 182, the transistor T4 and the transistor T5 are n-channel field effect transistors, and the transistor of the transistor T6 is a p-channel field effect transistor, whereas in the pixel circuit 183, the transistor T4 and the transistor T5 are p-channel field effect transistors, and the transistor T6 is an n-channel field effect transistor. The configuration other than the polarity of the transistor is the same as that of the self-luminous device 10A and the pixel circuit 182. The pixel circuit 183 shown in FIG. 27 to FIG. 29 is an example, and the pixel circuit 183 is not limited to the example shown in FIG. 27 to FIG. 29. The same or similar configuration as the self-luminous display devices 10 and 10A described in the first and second embodiments and the same or similar configuration as in FIG. 1 to FIG. 26 will not be described here.

An overview of the pixel circuit 183 will be described with reference to FIG. 27. FIG. 27 is a circuit diagram showing a configuration of the pixel circuit 183.

The pixel circuit 183 is a circuit for driving the pixel 180 in the same manner as the pixel circuit 181 and the pixel circuit 182. As described above, the pixel circuit 183 differs from the pixel circuit 182 in that the transistor T4 and the transistor T5 are p-channel field effect transistors, and the transistor of the transistor T6 is an n-channel field effect transistor.

A method for driving the pixel 180 (the pixel circuit 183) will be described referring to FIG. 27 to FIG. 29. FIG. 28 is a diagram for describing the reset period PRS, the sampling period PWR, and the emission period PEM of the methods for driving the self-luminous display device 10A (the pixel 180 (the pixel circuit 183)). FIG. 29 is a diagram for describing a black period PBWR of methods for driving the self-luminous display device 10A (pixel 180 (pixel circuit 183)).

In the third embodiment, since the transistor T4 and the transistor T5 are p-channel field effect transistors and the transistor T6 is an n-channel field effect transistor in the pixel circuit 183, the light emission control signal EM (n) of the pixel circuit 183 according to the third embodiment is inverted with respect to the light emission control signal EM (n) of the pixel circuit 182 according to the second embodiment.

As shown in FIG. 28 and FIG. 29, the light emission control signal EM (n) is supplied with a low level (LO), in the methods for driving the pixel 180 (pixel circuit 183) in the light emission period PEM of the previous frame (K−1st FRAME) of the current frame and the light emission period PEM of the current frame (Kth FRAME). Therefore, the transistor T4 and the transistor T5 shown in FIG. 27 are in an on state, and the transistor T6 shown in FIG. 27 is in an off state.

As shown in FIG. 28 and FIG. 29, the light emission control signal EM (n) is supplied with a high level (HI or HIL), in the methods for driving the pixel 180 (pixel circuit 183) in a period between the light emission period PEM of the previous frame (K−1st FRAME) of the current frame and the light emission period PEM of the current frame (Kth FRAME). Therefore, the transistor T4 and the transistor T5 shown in FIG. 27 are in an off state, and the transistor T6 shown in FIG. 27 is in an on state.

In the method for driving the self-luminous display device 10A (pixel 180 (pixel circuit 183)) according to the third embodiment, configurations other than the light emission control signal EM (n), respective signals, states of respective transistors, and the like are the same as the configuration and the function of the method for driving the self-luminous display device 10A described with reference to FIG. 15 to FIG. 26 of the second embodiment. Therefore, a description thereof will be omitted.

For example, since the transistor T5 in the light emission period PEM of the current frame (Kth FRAME) is a p-channel field effect transistor, a high level (HI) to a low level (LO) is supplied to the light emitting control signal EM (n). The light emission control signal EM (n) in the pixel circuit 183 is supplied with a high level (HI) to a low level (LO). Therefore, an increase in a voltage of an anode electrode due to a coupling between the light emission control signal line 334A and the second electrode 684 (anode electrode) of the light emitting element OLED is suppressed more than the increase in the voltage of the anode electrode of the light emission control signal EM(n). At this time, the light emission control signal EM (n) is supplied with a low level (LO) to a high level (HI). When the voltage of the anode electrode increases, a larger current flows through the light emitting element OLED than the case where the pixel 180 displays black, and thus the pixel 180 is less likely to display black. On the other hand, it is possible to suppress an increase in the voltage of the anode electrode in the self-luminous display device 10A (the pixel 180 (the pixel circuit 183)) according to the third embodiment. As a result, the self-luminous display device 10A (pixel 180 (pixel circuit 183)) according to the third embodiment can increase the margin when displaying black.

Since the transistor T4 in the self-luminous display device 10A (pixel 180 (pixel circuit 183)) according to the third embodiment is a p-channel field effect transistor, a high voltage of the light emission control signal EM (n) can be reduced from a high level (HI) to a high (HIL) lower than a high level (HI). As a result, since the voltage supplied to the gate electrode 642 of the transistor T4 can be reduced, the power consumption of the self-luminous display device 10A can be reduced.

4. Fourth Embodiment

Figure 30:
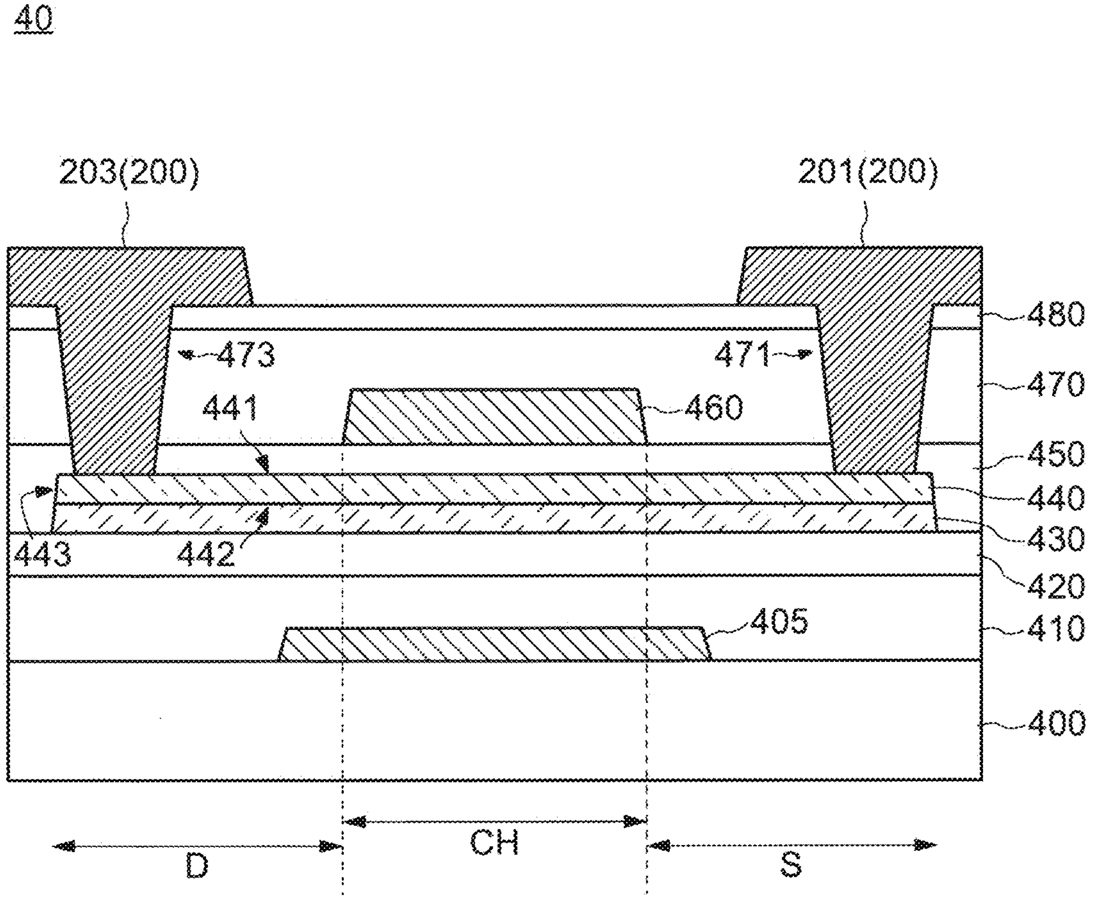
FIG. 30 is a cross-sectional view showing an overview of a semiconductor device according to a fourth embodiment of the present invention.
Figure 31:
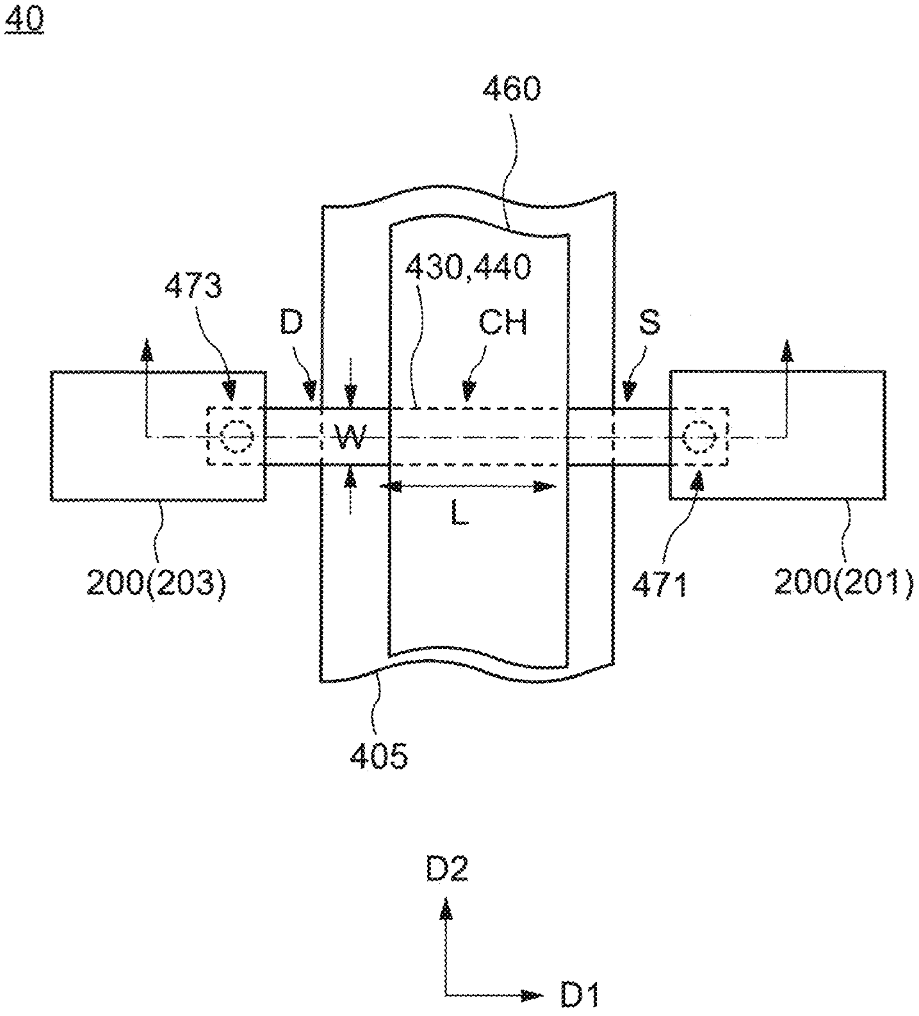
FIG. 31 is a plan view showing an overview of the semiconductor device according to the fourth embodiment of the present invention.
Figure 32:
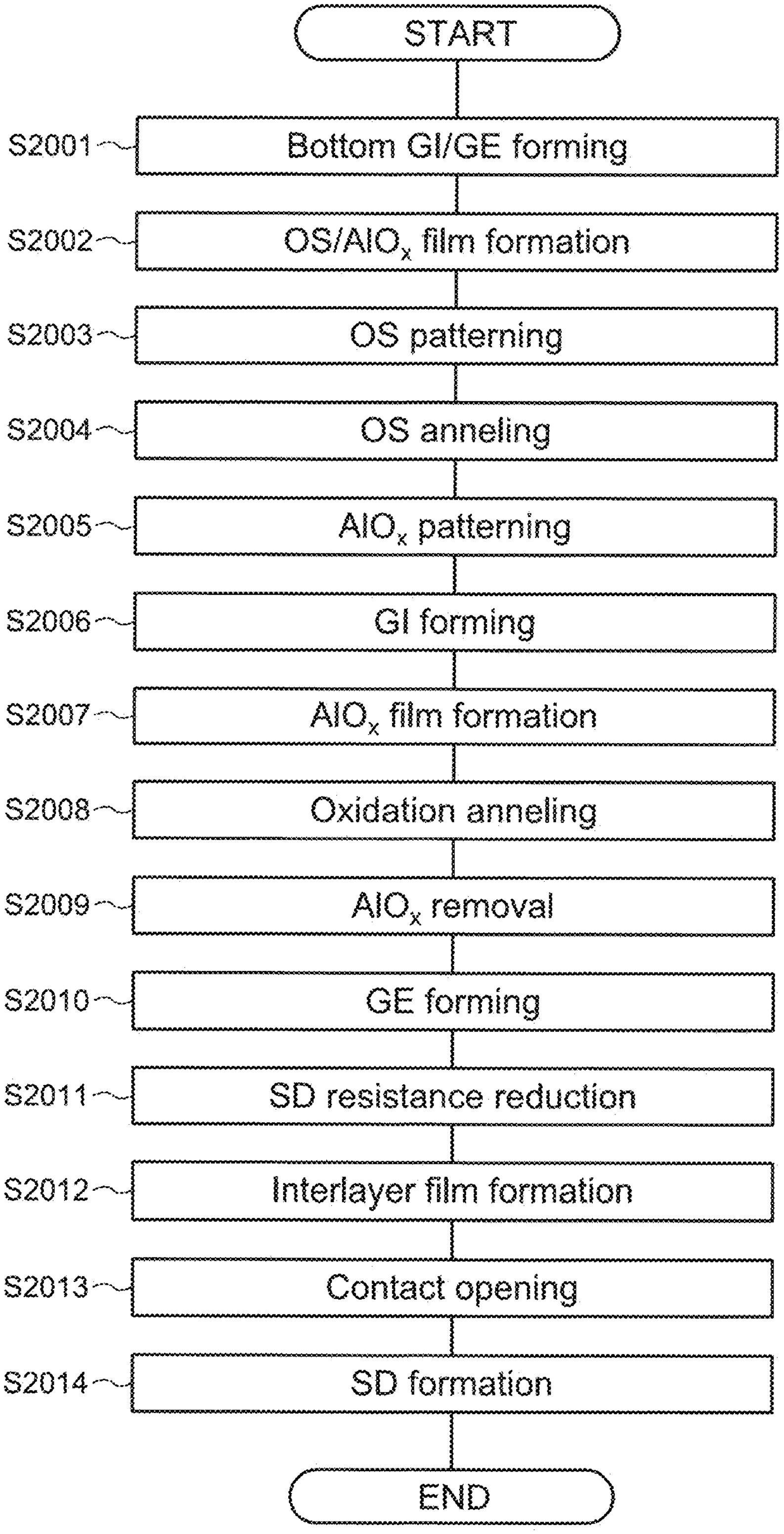
FIG. 32 is a sequence diagram showing a method for manufacturing the semiconductor device according to the fourth embodiment of the present invention.
Figure 42:
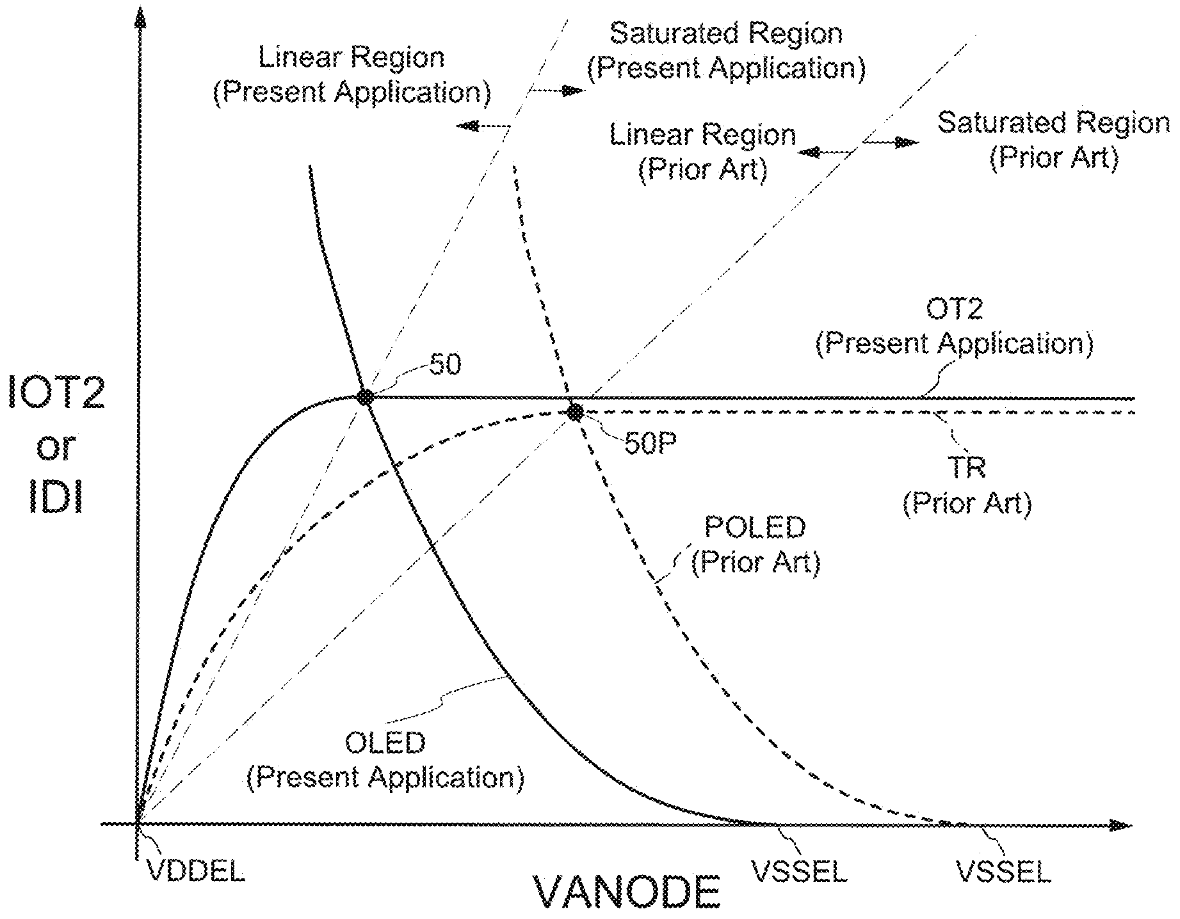
FIG. 42 is a graph showing an example of the electrical characteristics of the semiconductor device according to the fourth embodiment of the present invention and shows an example of the electrical characteristics of a semiconductor device according to a comparative example.
Figure 43:
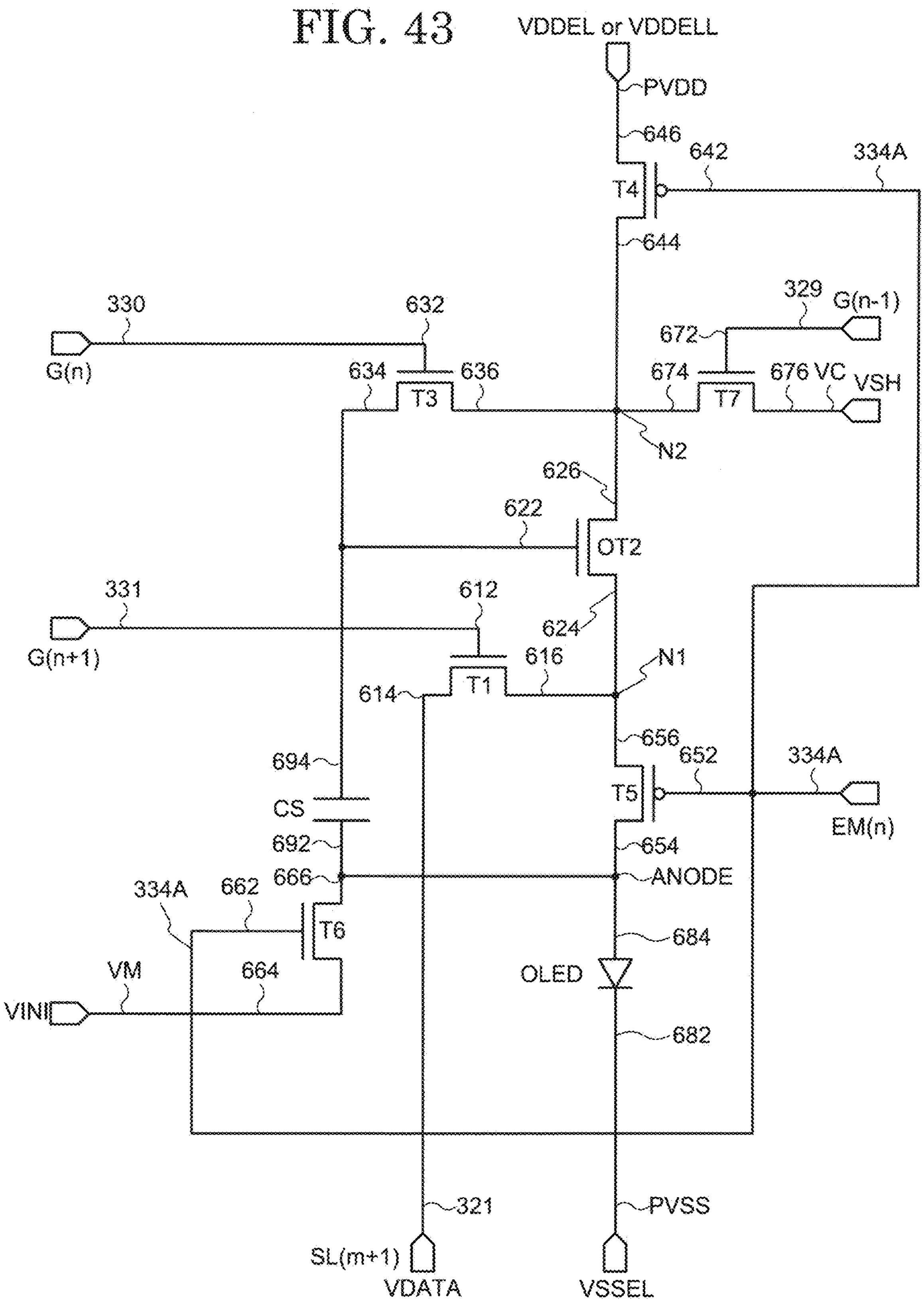
FIG. 43 is a schematic diagram showing a configuration of a pixel circuit according to the fourth embodiment of the present invention.

An example of a manufacturing method of a semiconductor device 40, electrical characteristics and a pixel circuit used in a self-luminous display device according to a fourth embodiment will be described referring to FIG. 30 to FIG. 43. FIG. 30 and FIG. 31 are cross-sectional views and plan views showing an overview of the semiconductor device 40 used in a self-luminous display device according to an embodiment of the present invention. FIG. 32 is a sequence diagram showing a method for manufacturing the semiconductor device 40. FIG. 33 to FIG. 41 are cross-sectional views showing a method for manufacturing the semiconductor device 40. FIG. 42 is a graph showing an example of electrical characteristics of the semiconductor device 40 and an example of electrical characteristics of the semiconductor device of a comparative example. FIG. 43 is a schematic diagram showing a configuration of a pixel circuit using the semiconductor device 40. Descriptions of the same or similar configurations as those in FIG. 1 to FIG. 29 will be omitted.

In the description of the fourth embodiment, a direction from a substrate toward an oxide semiconductor layer is referred to as "upper" or "above", and a direction from the oxide semiconductor layer toward the substrate is referred to as "lower" or "below". In the description of the fourth embodiment, for example, the substrate and the oxide semiconductor layer may be arranged upside down. An expression "oxide semiconductor layer on the substrate" merely describes a vertical relationship between an arrangement of the substrate and the oxide semiconductor layer, and other members may be arranged between the substrate and the oxide semiconductor layer. An expression "upper" or "lower" means a stacking order in a structure in which a plurality of layers are stacked. For example, in the case of expressing "a pixel electrode above a transistor", the positional relationship between the transistor and the pixel electrode may be such that the positional relationship between the transistor and the pixel electrode does not overlap in a plan view. On the other hand, an expression "pixel electrode vertically above the transistor" means a positional relationship in which positional relationships of the transistor and the pixel electrode overlap in a plan view.

[4-1. Configuration of Semiconductor Device 40]

As shown in FIG. 30, the semiconductor device 40 is arranged above a substrate 400. The semiconductor device 40 includes a gate electrode 405, gate insulating layers 410 and 420, a metal oxide layer 430, an oxide semiconductor layer 440, a gate insulating layer 450, a gate electrode 460, insulating layers 470 and 480, a source electrode 201, and a drain electrode 203. When the source electrode 201 and the drain electrode 203 are not particularly distinguished from each other, they may be collectively referred to as a source/drain electrode 200.

The gate electrode 405 is arranged on the substrate 400. The gate insulating layer 410 and the gate insulating layer 420 are arranged on the substrate 400 and the gate electrode 405. The metal oxide layer 430 is arranged on the gate insulating layer 420. The metal oxide layer 430 is in contact with the gate insulating layer 420. The oxide semiconductor layer 440 is arranged on the metal oxide layer 430. The oxide semiconductor layer 440 is in contact with the metal oxide layer 430. A surface of a main surface of the oxide semiconductor layer 440 in contact with the metal oxide layer 430 is referred to as a lower surface 442. An end portion of the metal oxide layer 430 and an end portion of the oxide semiconductor layer 440 substantially coincide with each other.

In the fourth embodiment, a semiconductor layer or an oxide semiconductor layer is not arranged between the metal oxide layer 430 and the substrate 400.

In the fourth embodiment, a configuration in which the metal oxide layer 430 is in contact with the gate insulating layer 420 and the oxide semiconductor layer 440 is in contact with the metal oxide layer 430 is shown. However, the configuration according to the fourth embodiment is not limited to the configuration exemplified here. For example, other layers may be arranged between the gate insulating layer 420 and the metal oxide layer 430, and other layers may be arranged between the metal oxide layer 430 and the oxide semiconductor layer 440.

In FIG. 30, a sidewall of the metal oxide layer 430 and a sidewall of the oxide semiconductor layer 440 are arranged in a straight line. However, the configuration according to the fourth embodiment is not limited to the configuration shown in FIG. 30. For example, an angle of the sidewall of the metal oxide layer 430 with respect to a main surface of the substrate 400 may be different from an angle of the sidewall of the oxide semiconductor layer 440, and a cross-sectional shape of the sidewall of at least one of the metal oxide layer 430 and the oxide semiconductor layer 440 may be curved.

The gate electrode 460 faces the oxide semiconductor layer 440. The gate insulating layer 450 is arranged between the oxide semiconductor layer 440 and the gate electrode 460. The gate insulating layer 450 is in contact with the oxide semiconductor layer 440. A surface of the main surface of the oxide semiconductor layer 440 in contact with the gate insulating layer 450 is referred to as an upper surface 441. A surface between the upper surface 441 and the lower surface 442 is referred to as a side surface 443. The insulating layers 470 and 480 are arranged on the gate insulating layer 450 and the gate electrode 460. Openings 471 and 473 that reach the oxide semiconductor layer 440 are arranged in the insulating layers 470 and 480. The source electrode 201 is arranged inside the opening 471. The source electrode 201 is in contact with the oxide semiconductor layer 440 at a bottom portion of the opening 471. The drain electrode 203 is arranged inside the opening 473. The drain electrode 203 is in contact with the oxide semiconductor layer 440 at a bottom portion of the opening 473.

The gate electrode 405 has a function as a bottom gate of the semiconductor device 40 and a function as a light shielding film for the oxide semiconductor layer 440. The gate insulating layer 410 functions as a barrier film that shields impurities that diffuse from the substrate 400 toward the oxide semiconductor layer 440. The gate insulating layers 410 and 420 each has a function as a gate insulating layer with respect to a bottom gate. The metal oxide layer 430 is a layer containing a metal oxide containing aluminum as a main component, and has a function as a gas barrier film for shielding a gas such as oxygen or hydrogen.

The oxide semiconductor layer 440 includes a source region S, a drain region D, and a channel region CH. The channel region CH is a region of the oxide semiconductor layer 440 vertically below the gate electrode 460. The source region S is a region of the oxide semiconductor layer 440 that does not overlap the gate electrode 460 and is closer to the source electrode 201 than the channel region CH. The drain region D is a region of the oxide semiconductor layer 440 that does not overlap the gate electrode 460 and is closer to the drain electrode 203 than the channel region CH. The oxide semiconductor layer 440 in the channel region CH has physical properties as a semiconductor. The oxide semiconductor layers 440 in the source region S and the drain region D have physical properties as conductors.

The gate electrode 460 functions as a light shielding film for a top gate and the oxide semiconductor layer 440 of the semiconductor device 40. The gate insulating layer 450 has a function as a gate insulating layer with respect to the top gate, and has a function of releasing oxygen by heat treatment in a manufacturing process. The insulating layers 470 and 480 have a function of insulating the gate electrode 460 and the source/drain electrode 200 and reducing parasitic capacitance therebetween. An operation of the semiconductor device 40 is mainly controlled by a voltage supplied to the gate electrode 460. An auxiliary voltage is supplied to the gate electrode 405. However, in the case where the gate electrode 405 is simply used as a light shielding film, a specific voltage may not be supplied to the gate electrode 405, and the gate electrode 405 may be in a floating state. The gate electrode 405 may be simply referred to as a "light shielding film".

Although a configuration in which a dual-gate transistor in which a gate electrode is arranged both above and below an oxide semiconductor layer is used as the semiconductor device 40 in the fourth embodiment is exemplified, the configuration of the transistor is not limited to this configuration. For example, a bottom-gate transistor in which the gate electrode is arranged only below the oxide semiconductor layer, or a top-gate transistor in which the gate electrode is arranged only above the oxide semiconductor layer may be used as the semiconductor device 40. The above configuration is merely an embodiment, and the present invention is not limited to the above configuration.

As shown in FIG. 31, in a plan view, a planar pattern of the metal oxide layer 430 is substantially the same as a planar pattern of the oxide semiconductor layer 440. The lower surface 442 of the oxide semiconductor layer 440 is covered with the metal oxide layer 430 referring to FIG. 30 and FIG. 31. In particular, all of the lower surface 442 of the oxide semiconductor layer 440 is covered with the metal oxide layer 430 in the fourth embodiment. A width of the gate electrode 405 is larger than a width of the gate electrode 460 in the direction D1. The direction D1 is a direction connecting the source electrode 201 and the drain electrode 203, and is a direction indicating a channel length L of the semiconductor device 40. Specifically, a length of the region (channel region CH) where the oxide semiconductor layer 440 and the gate electrode 460 overlap in the direction D1 is the channel length L, and a width of the channel region CH in the direction D2 is a channel width W.

The configuration in which all of the lower surface 442 of the oxide semiconductor layer 440 is covered with the metal oxide layer 430 is exemplified, in the fourth embodiment. However, the configuration according to the fourth embodiment is not limited to the configuration shown here. For example, a part of the lower surface 442 of the oxide semiconductor layer 440 may not be in contact with the metal oxide layer 430. For example, all of the lower surface 442 of the oxide semiconductor layer 440 in the channel region CH may be covered with the metal oxide layer 430, and all or a part of the lower surface 442 of the oxide semiconductor layer 440 in the source region S and the drain region D may not be covered with the metal oxide layer 430. That is, all or a part of the lower surface 442 of the oxide semiconductor layer 440 in the source region S and the drain region D may not be in contact with the metal oxide layer 430. However, a part of the lower surface 442 of the oxide semiconductor layer 440 in the channel region CH may not be covered with the metal oxide layer 430 in the above configuration, and another part of the lower surface 442 may be in contact with the metal oxide layer 430 in the above configuration.

Although the fourth embodiment exemplifies a configuration in which the gate insulating layer 450 is formed over the entire surface and the openings 471 and 473 are arranged in the gate insulating layer 450, the present invention is not limited to this configuration. The gate insulating layer 450 may be patterned in a shape different from a shape in which the openings 471 and 473 are arranged. For example, the gate insulating layer 450 may be patterned so as to expose all or a part of the oxide semiconductor layer 440 in the source region S and the drain region D. That is, the gate insulating layer 450 in the source region S and the drain region D may be removed, and the oxide semiconductor layer 440 and the insulating layer 470 may be in contact with each other in these regions.

In FIG. 31, although a configuration in which the source/drain electrode 200 does not overlap the gate electrode 405 and the gate electrode 460 in a plan view is shown, the configuration is not limited to this configuration. For example, in a plan view, the source/drain electrode 200 may overlap at least one of the gate electrode 405 and the gate electrode 460. The above configuration is merely an embodiment, and the present invention is not limited to the above configuration.

[4-2. Material of Each Member of Semiconductor Device 40]

As the substrate 400, a rigid substrate having translucency, such as a glass substrate, a quartz substrate, and a sapphire substrate, is used. In the case where the substrate 400 needs to have flexibility, a substrate containing a resin such as a polyimide substrate, an acrylic substrate, a siloxane substrate, or a fluororesin substrate is used as the substrate 400. In the case where a substrate containing a resin is used as the substrate 400, impurities may be introduced into the resin in order to improve the heat resistance of the substrate 400. In particular, in the case where the semiconductor device 40 is used in a top emission type self-luminous display device, since the substrate 400 does not need to be transparent, impurities that deteriorate the transparency of the substrate 400 may be used.

A general metal material is used as the gate electrode 405, the gate electrode 460, and the source/drain electrode 200. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and alloys or compounds thereof are used as the members. The above materials may be used as the gate electrode 405, the gate electrode 460, and the source/drain electrode 200 in a single layer or in a stacked layer.

A general insulating material is used as the gate insulating layers 410 and 420 and the insulating layers 470 and 480. For example, inorganic insulating layers such as silicon oxide ($SiO_x$), silicon oxynitride ($SiO_xN_y$), silicon nitride ($SiN_x$), silicon nitride oxide ($SiN_xO_y$), aluminum oxide ($AlO_x$), aluminum oxynitride ($AlO_xN_y$), aluminum nitride oxide ($AlN_xO_y$), and aluminum nitride ($AlN_x$) are used as the insulating layers.

As the gate insulating layer 450, an insulating layer containing oxygen among the insulating layers described above is used. For example, an inorganic insulating layer such as silicon oxide ($SiO_x$), silicon oxynitride ($SiO_xN_y$), aluminum oxide ($AlO_x$), or aluminum oxynitride ($AlO_xN_y$) is used as the gate insulating layer 450.

As the gate insulating layer 420, an insulating layer having a function of releasing oxygen by heat treatment is used. A temperature of the heat treatment in which the gate insulating layer 420 releases oxygen is, for example, 600° C. or less, 500° C. or less, 450° C. or less, or 400° C. or less. That is, the gate insulating layer 420 emits oxygen at the heat treatment temperature performed in a manufacturing process of the semiconductor device 40 in the case where a glass substrate is used as the substrate 400, for example.

As the gate insulating layer 450, an insulating layer with few defects is used. For example, in the case where a composition ratio of oxygen in the gate insulating layer 450 is compared with a composition ratio of oxygen in an insulating layer having the same composition as that of the gate insulating layer 450 (hereinafter referred to as "other insulating layer"), the composition ratio of oxygen in the gate insulating layer 450 is closer to a stoichiometric ratio with respect to the insulating layer than the composition ratio of oxygen in the other insulating layer. Specifically, in the case where silicon oxide ($SiO_x$) is used for each of the gate insulating layer 450 and the insulating layer 480, the composition ratio of oxygen in the silicon oxide used as the gate insulating layer 450 is closer to the stoichiometric ratio of silicon oxide than the composition ratio of oxygen in the silicon oxide used as the insulating layer 480. For example, a layer in which no defects are observed when evaluated by electron-spin resonance (ESR) may be used as the gate insulating layer 450.

$SiO_xN_y$ and $AlO_xN_y$ are silicon-containing and aluminum-containing compounds that contain a lower proportion ($x>y$) of nitrogen (N) than oxygen (O). $SiN_xO_y$ and $AlN_xO_y$ are silicon-containing and aluminum-containing compounds that contain a lower proportion of oxygen than nitrogen ($x>y$).

As the metal oxide layer 430 and a metal oxide layer 490 used in the manufacturing process as described later, a metal oxide containing aluminum as a main component is used. For example, as the metal oxide layer 430 (or the metal oxide layer 490), an inorganic insulating layer such as aluminum oxide ($AlO_x$), aluminum oxynitride ($AlO_xN_y$), aluminum nitride oxide ($AlN_xO_y$), or aluminum nitride ($AlN_x$) is used. The "metal oxide layer containing aluminum as a main component" means that a ratio of aluminum contained in the metal oxide layer 430 (or the metal oxide layer 490) is 1% or more of a total amount of the metal oxide layer 430 (or the metal oxide layer 490). The ratio of aluminum contained in the metal oxide layer 430 (or the metal oxide layer 490) may be 5% or more and 70% or less, 10% or more and 60% or less, or 30% or more and 50% or less of the entire metal oxide layer 430. The ratio may be a mass ratio or a weight ratio.

As the oxide semiconductor layer 440, a metal oxide having characteristics of a semiconductor can be used.

The oxide semiconductor layer 440 may be amorphous or crystalline. The oxide semiconductor layer 440 may be a mixed phase of amorphous and crystal. A crystalline oxide semiconductor is less likely to form oxygen vacancies than an amorphous oxide semiconductor.

[4-3. Problems Newly Recognized in Process Leading to Present Invention]

Hydrogen is released from a layer arranged closer to the substrate 400 than the oxide semiconductor layer 440 (for example, the gate insulating layers 410 and 420), and the hydrogen reaches the oxide semiconductor layer 440. As a result, oxygen vacancies are generated in the oxide semiconductor layer 440 in a heat treatment process of the manufacturing process in the semiconductor device 40. This occurrence of the oxygen vacancy is more pronounced as a pattern size of the oxide semiconductor layer 440 is larger. In order to suppress the occurrence of such oxygen vacancies, it is necessary to suppress hydrogen from reaching the lower surface 442 of the oxide semiconductor layer 440. The above is the first problem.

Apart from the problem described above, the following is a second problem. The upper surface 441 of the oxide semiconductor layer 440 is affected by a process after the oxide semiconductor layer 440 is formed (for example, a patterning process or an etching process). On the other hand, the lower surface 442 of the oxide semiconductor layer 440 (the surface of the oxide semiconductor layer 440 on the substrate 400 side) is not affected as described above.

Therefore, the oxygen vacancies formed on the upper surface 441 of the oxide semiconductor layer 440 are larger than the oxygen vacancies formed on the lower surface 442 of the oxide semiconductor layer 440. That is, the oxygen vacancies in the oxide semiconductor layer 440 are not uniformly present in a thickness direction of the oxide semiconductor layer 440, but are present in a non-uniform distribution in the thickness direction of the oxide semiconductor layer 440. Specifically, the oxygen vacancies in the oxide semiconductor layer 440 are smaller toward the lower surface 442 of the oxide semiconductor layer 440 and larger toward the upper surface 441 of the oxide semiconductor layer 440.

In the case where an oxygen supply process is uniformly performed on the oxide semiconductor layer 440 having the oxygen vacancy distribution as described above, when oxygen is supplied in an amount necessary for repairing the oxygen vacancy formed on the upper surface 441 side of the oxide semiconductor layer 440, oxygen is excessively supplied to the lower surface 442 side of the oxide semiconductor layer 440. As a result, on the lower surface 442 side, a defect level different from the oxygen vacancy is formed due to the excess oxygen, and a phenomenon such as a characteristic variation in a reliability test or a decrease in a field effect mobility occurs. Therefore, in order to suppress such a phenomenon, it is necessary to supply oxygen to the upper surface 441 side of the oxide semiconductor layer 440 while suppressing the supply of oxygen to the lower surface 442 side of the oxide semiconductor layer 440.

The problem described above is a newly recognized problem in the process leading to the present invention, and is not a problem that has been conventionally recognized. There is a trade-off between initial characteristics and the reliability test in the conventional configuration and manufacturing method, in which the characteristic variation due to the reliability test occurs even if the initial characteristics of the semiconductor device are improved by the oxygen supply process to the oxide semiconductor layer. However, the problem described above is solved with the configuration according to the fourth embodiment, and good initial characteristics and reliability test results of the semiconductor device 40 can be obtained.

[4-4. Method for Manufacturing Semiconductor Device 40]

A method for manufacturing the semiconductor device 40 will be described with reference to FIG. 32 to FIG. 41. Here, an example of a method for manufacturing the semiconductor device 40 in which aluminum oxide is used as the metal oxide layers 430 and 490 will be described.

Figure 33:
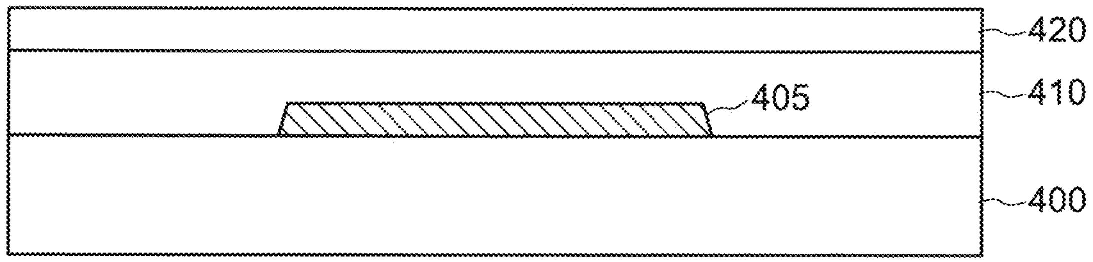
FIG. 33 is a cross-sectional view showing the method for manufacturing the semiconductor device according to the fourth embodiment of the present invention.

As shown in FIG. 32 and FIG. 33, a gate electrode 405 is formed as a bottom gate on the substrate 400, and gate insulating layers 410 and 420 are formed on the gate electrode 405 ("Bottom GI/GE forming" in the step S2001 of FIG. 32). For example, silicon nitride is formed as the gate insulating layer 410. For example, silicon oxide is formed as the gate insulating layer 420. The gate insulating layers 410 and 420 are formed by a CVD (Chemical Vapor Deposition) method. One or both of the gate insulating layers 410 and 420 may be referred to as a "first insulating layer".

By using silicon nitride as the gate insulating layer 410, the gate insulating layer 410 can block impurities that diffuse, for example, from the substrate 400 side toward the oxide semiconductor layer 440. The silicon oxide used as the gate insulating layer 420 is a physical silicon oxide that releases oxygen by a heat treatment.

Figure 34:
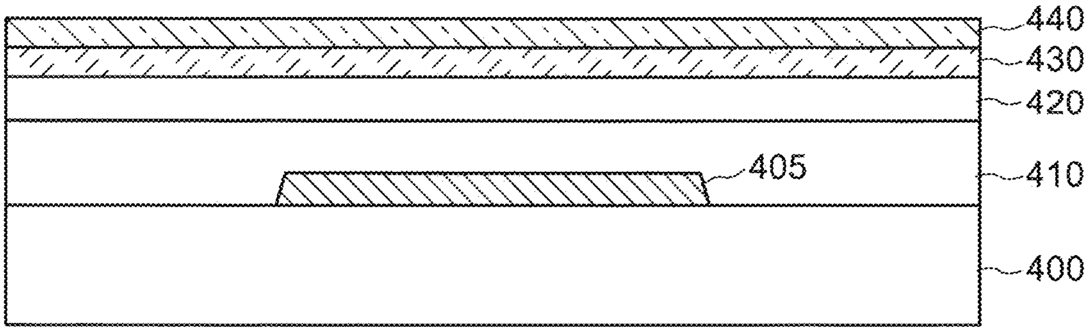
FIG. 34 is a cross-sectional view showing the method for manufacturing the semiconductor device according to the fourth embodiment of the present invention.

As shown in FIG. 32 and FIG. 34, the metal oxide layer 430 and the oxide semiconductor layer 440 are formed on the gate insulating layer 420 ("OS/$AlO_x$ film formation" in the step S2002 of FIG. 32). This process may be referred to as a process in which the gate insulating layers 410 and 420 are formed on the substrate 400 and the metal oxide layer 430 is formed on the gate insulating layers 410 and 420. Alternatively, this process may be referred to as a process in which the metal oxide layer 430 is formed on the substrate 400 and the oxide semiconductor layer 440 is formed on the metal oxide layer 430. Specifically, the oxide semiconductor layer 440 is formed in contact with the metal oxide layer 430. The metal oxide layer 430 and the oxide semiconductor layer 440 are formed by a sputtering method or an atomic layer deposition method (ALD: Atomic Layer Deposition).

A thickness of the metal oxide layer 430 is, for example, 1 nm or more and 100 nm or less, 1 nm or more and 50 nm or less, 1 nm or more and 30 nm or less, or 1 nm or more and 10 nm or less. In the fourth embodiment, aluminum oxide is used as the metal oxide layer 430. Aluminum oxide has a high barrier property against gas. In the fourth embodiment, aluminum oxide used as the metal oxide layer 430 blocks hydrogen and oxygen released from the gate insulating layer 420, and suppresses released hydrogen and oxygen from reaching the oxide semiconductor layer 440.

A thickness of the oxide semiconductor layer 440 is, for example, 10 nm or more and 100 nm or less, 15 nm or more and 70 nm or less, 20 nm or more and 40 nm or less.

In the case where the oxide semiconductor layer 440 is formed by the sputtering method, the oxide semiconductor layer 440 is formed while controlling a temperature of an object to be film-formed (the substrate 400 and a structure formed thereon).

When film formation is performed on the object to be film-formed by the sputtering method, the ions generated in the plasma and the atoms recoiled by the sputtering target collide with the object to be film-formed, so that a temperature of the object to be film-formed increases with the film forming process. In order to control the temperature of the object to be film-formed as described above, for example, film formation can be performed while cooling the object to be film-formed. For example, the object to be film-formed can be cooled from the surface opposite to the surface to be film-formed so that a temperature of a deposited surface of the object to be film-formed (hereinafter referred to as "deposition temperature") becomes 100° ° C. or less, 70° ° C. or less, 50° C. or less, or 30° ° C. or less.

Figure 35:
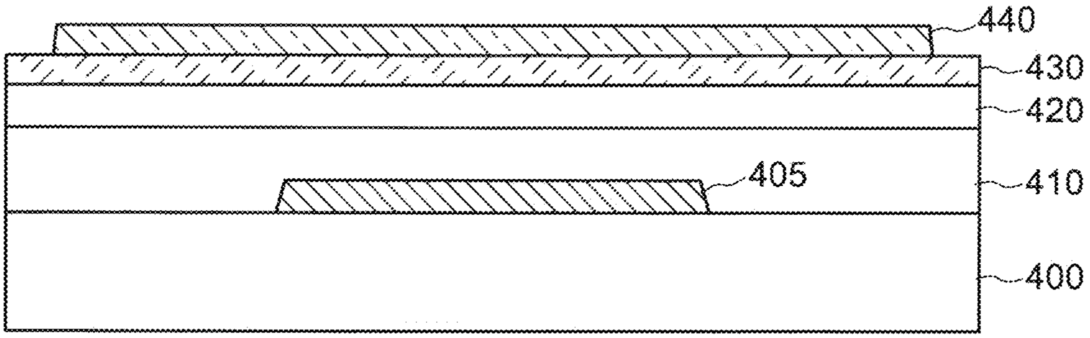
FIG. 35 is a cross-sectional view showing the method for manufacturing the semiconductor device according to the fourth embodiment of the present invention.

As shown in FIG. 32 and FIG. 35, a pattern of the oxide semiconductor layers 440 is formed ("OS patterning" in the step S2003 of FIG. 32). Although not shown, a resist mask is formed on the oxide semiconductor layer 440, and the oxide semiconductor layer 440 is etched using the resist mask. The oxide semiconductor layer 440 may be etched using wet etching, or may be etched using dry etching. Etching can be performed using an acidic etchant as the wet etching. For example, oxalic acid or hydrofluoric acid can be used as the etchant.

After the oxide semiconductor layer 440 is patterned, the oxide semiconductor layer 440 is subjected to a heat treatment (OS annealing) ("OS annealing" in the step S2004 in FIG. 32).

Figure 36:
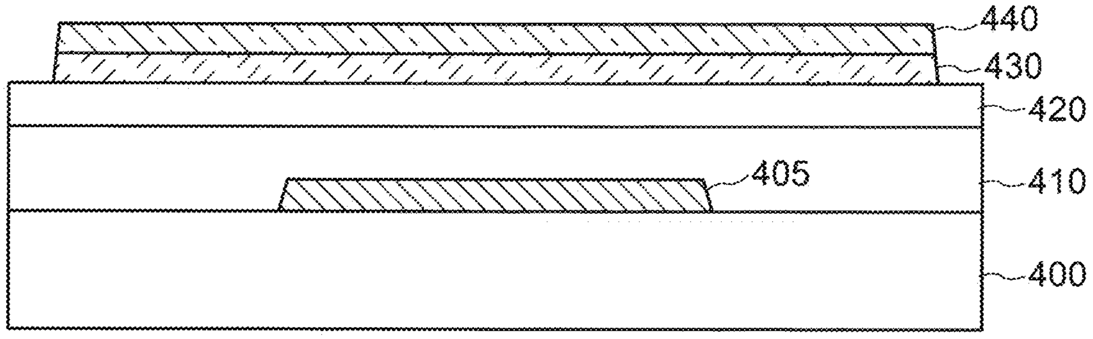
FIG. 36 is a cross-sectional view showing the method for manufacturing the semiconductor device according to the fourth embodiment of the present invention.

As shown in FIG. 32 and FIG. 36, a pattern of metal oxide layer 430 is formed ("$AlO_x$ patterning" in the step S2005 of FIG. 32). As the etching of the metal oxide layer 430, wet etching may be used, or dry etching may be used.

Figure 37:
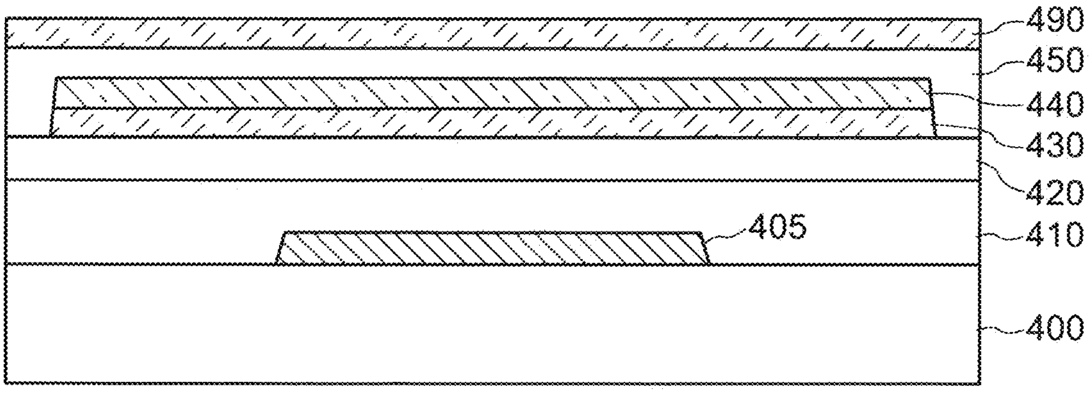
FIG. 37 is a cross-sectional view showing the method for manufacturing the semiconductor device according to the fourth embodiment of the present invention.

As shown in FIG. 32 and FIG. 37, the gate insulating layer 450 is deposited over the oxide semiconductor layer 440 ("GI forming" in the step S2006 of FIG. 32). For example, silicon oxide is formed as the gate insulating layer 450. The gate insulating layer 450 is formed by the CVD method. For example, the gate insulating layer 450 may be formed at a film forming temperature of 350° C. or more in order to form the insulating layer having less defects as the gate insulating layer 450. A thickness of the gate insulating layer 450 is, for example, 50 nm or more and 300 nm or less, 60 nm or more and 200 nm or less, or 70 nm or more and 150 nm or less. After the gate insulating layer 450 is formed, a process in which oxygen is implanted into a portion of the gate insulating layer 450 may be executed. The gate insulating layer 450 may be referred to as a "second insulating layer". The metal oxide layer 490 is formed on the gate insulating layer 450 ("$AlO_x$ film formation" in the step S2007 in FIG. 32). The metal oxide layer 490 is formed by the sputtering method. Oxygen is implanted into the gate insulating layer 450 by film formation of the metal oxide layer 490.

A thickness of the metal oxide layer 490 is, for example, 5 nm or more and 100 nm or less, 5 nm or more and 50 nm or less, 5 nm or more and 30 nm or less, or 7 nm or more and 15 nm or less. Aluminum oxide is used as the metal oxide layer 490 in the fourth embodiment. Aluminum oxide has a high barrier property against gas. In the fourth embodiment, aluminum oxide used as the metal oxide layer 490 suppresses oxygen implanted into the gate insulating layer 450 from being diffused outward when the metal oxide layer 490 is formed.

For example, in the case where the metal oxide layer 490 is formed by the sputtering method, a process gas used in sputtering remains in the film of the metal oxide layer 490. For example, in the case where Ar is used as the process gas for sputtering, Ar may remain in the film of the metal oxide layer 490. The remaining Ar can be detected by a SIMS (Secondary Ion Mass Spectrometry) analyses on the metal oxide layers 490.

With the gate insulating layer 450 formed on the oxide semiconductor layer 440 and the metal oxide layer 490 formed on the gate insulating layer 450, a heat treatment (oxidation annealing) for supplying oxygen to the oxide semiconductor layer 440 is performed ("oxidation annealing" in the step S2008 of FIG. 32). In other words, the metal oxide layer 430 and the oxide semiconductor layer 440 patterned as described above are subjected to the heat treatment (oxidation annealing). In a process from when the oxide semiconductor layer 440 is formed until when the gate insulating layer 450 is formed on the oxide semiconductor layer 440, a large amount of oxygen vacancies are generated on the upper surface 441 and the side surface 443 of the oxide semiconductor layer 440. Oxygen released from the gate insulating layers 420 and 450 is supplied to the oxide semiconductor layer 440 by the oxidation annealing described above, and the oxygen vacancies are repaired.

Oxygen emitted from the gate insulating layer 420 by the oxidation annealing is blocked by the metal oxide layer 430, and thus oxygen is hardly supplied to the lower surface 442 of the oxide semiconductor layer 440. Oxygen emitted from the gate insulating layer 420 diffuses from a region where the metal oxide layer 430 is not formed to the gate insulating layer 450 arranged on the gate insulating layer 420, and reaches the oxide semiconductor layer 440 via the gate insulating layer 450. As a result, the oxygen emitted from the gate insulating layer 420 is hardly supplied to the lower surface 442 of the oxide semiconductor layer 440, and is mainly supplied to the side surface 443 and the upper surface 441 of the oxide semiconductor layer 440. Further, oxygen emitted from the gate insulating layer 450 is supplied to the upper surface 441 and the side surface 443 of the oxide semiconductor layer 440 by the oxidation annealing. Although hydrogen may be released from the gate insulating layers 410 and 420 by the oxidation annealing, hydrogen is blocked by the metal oxide layer 430.

As described above, by the step of the oxidation annealing, it is possible to supply oxygen to the upper surface 441 and the side surface 443 of the oxide semiconductor layer 440 having a large amount of oxygen vacancies while suppressing the supply of oxygen to the lower surface 442 of the oxide semiconductor layer 440 having a small amount of oxygen vacancies.

Similarly, oxygen implanted in the gate insulating layer 450 is blocked by the metal oxide layer 490 in the oxidation annealing described above, and thus oxygen is suppressed from being released into the atmosphere. Therefore, oxygen is efficiently supplied to the oxide semiconductor layer 440 by the oxidation annealing, and the oxygen vacancy is repaired.

Figure 38:
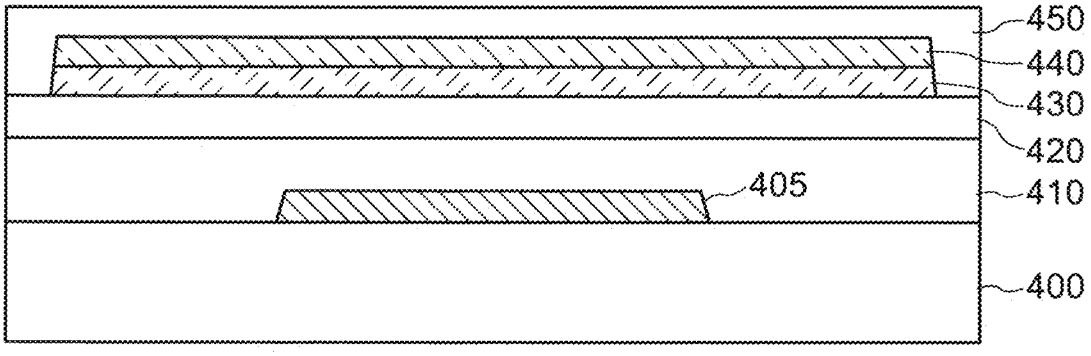
FIG. 38 is a cross-sectional view showing the method for manufacturing the semiconductor device according to the fourth embodiment of the present invention.

As shown in FIG. 32 and FIG. 38, the metal oxide layer 490 is etched (removed) ("$AlO_x$ removal" in the step S2009 of FIG. 32) after the oxidation annealing. As the etching of the metal oxide layer 490, wet etching may be used, or dry etching may be used. For example, dilute hydrofluoric acid (DHF) is used as the wet etching. The metal oxide layer 490 formed on the entire surface is removed by the etching. In other words, the metal oxide layer 490 is removed without using a mask. In other words, all the metal oxide layers 490 in the regions overlapping the oxide semiconductor layer 440 formed in one pattern are removed by the etching at least in a plan view.

Figure 39:
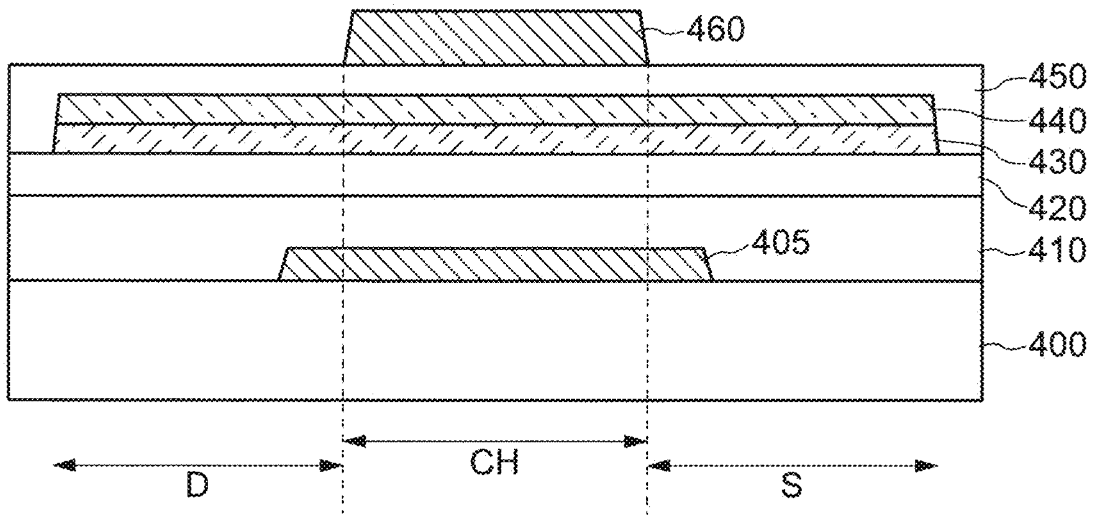
FIG. 39 is a cross-sectional view showing the method for manufacturing the semiconductor device according to the fourth embodiment of the present invention.

As shown in FIG. 32 and FIG. 39, the gate electrode 460 is formed on the gate insulating layer 450 ("GE forming" in the step S2010 of FIG. 32). The gate electrode 460 is formed by a sputtering method or an atomic layer deposition method, and is patterned through a photolithography process. As described above, the gate electrode 460 is formed so as to be in contact with the gate insulating layer 450 exposed by removing the metal oxide layer 490.

With the gate electrode 460 patterned, the resistance of the source region S and the drain region D of the oxide semiconductor layer 440 is reduced ("SD resistance reduction" in the step S2011 of FIG. 32). Specifically, impurities are implanted from the gate electrode 460 side to the oxide semiconductor layer 440 via the gate insulating layer 450 by ion implantation. For example, argon (Ar), phosphorus (P), and boron (B) are implanted into the oxide semiconductor layers 440 by ion implantation. Oxygen vacancies are formed in the oxide semiconductor layer 440 by ion implantation, thereby reducing the resistance of the oxide semiconductor layer 440. Since the gate electrode 460 is arranged above the oxide semiconductor layer 440 functioning as the channel region CH of the semiconductor device 40, no impurities are implanted into the oxide semiconductor layer 440 in the channel region CH.

Figure 40:
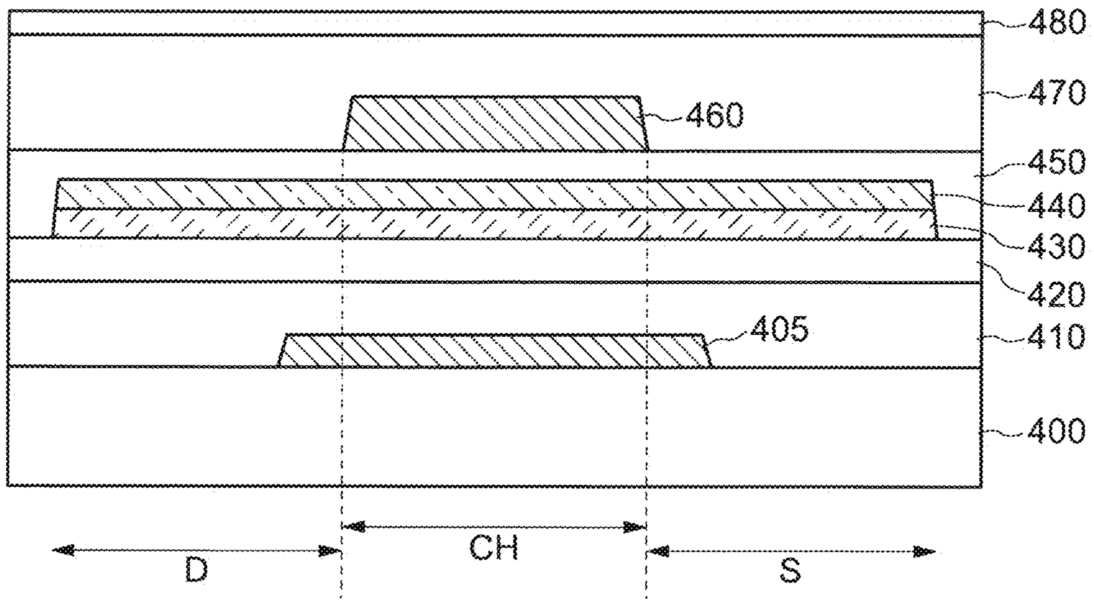
FIG. 40 is a cross-sectional view showing the method for manufacturing the semiconductor device according to the fourth embodiment of the present invention.

As shown in FIG. 32 and FIG. 40, insulating layers 470 and 480 as interlayer films are formed on the gate insulating layer 450 and the gate electrode 460 ("interlayer film formation" in the step S2012 of FIG. 32). The insulating layers 470 and 480 are formed by the CVD method. For example, silicon nitride is formed as the insulating layer 470, and silicon oxide is formed as the insulating layer 480. The material used for the insulating layers 470 and 480 is not limited to the above materials. A thickness of the insulating layers 470 is 50 nm or more and 500 nm or less. A thickness of the insulating layers 480 is 50 nm or more and 500 nm or less.

Figure 41:
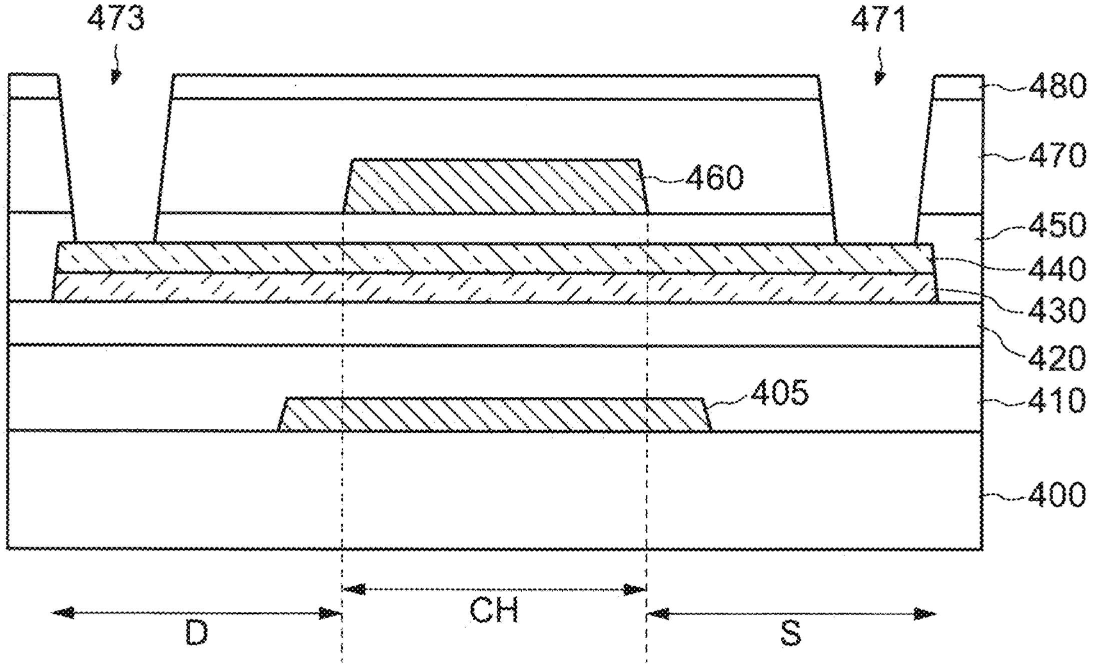
FIG. 41 is a cross-sectional view showing the method for manufacturing the semiconductor device according to the fourth embodiment of the present invention.

As shown in FIG. 32 and FIG. 41, the openings 471 and 473 are formed in the gate insulating layer 450 and the insulating layers 470 and 480 ("contact opening" in the step S2013 of FIG. 32). The opening 471 exposes the oxide semiconductor layer 440 in the source region S. The opening 473 exposes the oxide semiconductor layer 440 in the drain region D. The semiconductor device 40 shown in FIG. 32 is completed by forming the source/drain electrode 200 on the oxide semiconductor layer 440 and the insulating layer 480 exposed by the openings 471 and 473 ("SD formation" in the step S2014 in FIG. 32).

[4-5. Example of Electrical Characteristics of Semiconductor Device 40]

An example of electrical characteristics of the semiconductor device 40 will be mainly described with reference to FIG. 42 and FIG. 43. The semiconductor device 40 is used for a channel region CH of a transistor OT2 in the pixel circuit shown in FIG. 43. For example, the transistor OT2 is a transistor called a driving transistor. In FIG. 42, the present invention is described as Present Application, and a comparative example is described as Prior Art. The configuration of the pixel circuit of the present invention is the same as that of a pixel circuit of the comparative example, and the transistor OT2 and the light emitting element OLED of the present invention correspond to a transistor TR and a light emitting element POLED of the comparative example. On the other hand, the channel region CH of the transistor OT2 of the present invention is formed using the oxide semiconductor layer 440, whereas a channel region of the transistor TR of the comparative example is formed using, for example, a low-temperature polysilicon layer (LTPS layer) or an oxide semiconductor layer having properties differing from those of the oxide semiconductor layer 440.

In addition, the pixel circuit according to the fourth embodiment shown in FIG. 43 is a circuit in which the transistor T2 of the pixel circuit 183 according to the third embodiment described with reference to FIG. 27 is replaced with the transistor OT2 formed using the semiconductor device 40. The configuration and function of the pixel circuit according to the fourth embodiment other than the transistor OT2 are the same as the configuration and function of the pixel circuit 183 according to the third embodiment described with reference to FIG. 27. Therefore, the transistor OT2 will be mainly described, and a description of configurations and functions other than the transistor OT2 will be omitted in the fourth embodiment. In addition, the channel regions of the transistors (the transistor T1, the transistor T3 to the transistor T7) other than the transistor OT2 are formed using, for example, the low-temperature polysilicon layer (LTPS layer).

FIG. 42 is a diagram showing dependency of a drain current IOT2 on the drain voltage (voltage VANODE) of the transistor OT2, and shows dependency of a voltage VANODE of the light emitting element OLED and the current IDI flowing through the light emitting element OLED. FIG. 42 also shows dependency of the drain current IOT2 on a drain voltage (voltage VANODE) of the transistor TR and dependency of a voltage VANODE of the light emitting element POLED and the current IDI flowing through the light emitting element OLED. Further, in FIG. 42, at the border between the linear region and the saturated region, a source/drain voltage (for example, the potential difference (Vds) between the source electrode and the drain electrode) is the same as a potential difference (Vgs) between the gate electrode and the source electrode minus the threshold voltage (Vth) of the semiconductor device 40 (Vgs-Vth).

As shown in FIG. 42, at an operation point (a point at which a curve of the transistor OT2 and a curve of the light emitting element OLED intersect) 50 of the present invention using the semiconductor device 40, the drain voltage is smaller and the drain current is larger than an operation point (a point at which a curve of the transistor TR and a curve of the light emitting element POLED intersect) 50P of the comparative example.

That is, the transistor OT2 can flow the same current as the transistor TR at a gate/source voltage Vgs smaller than the transistor TR. Therefore, the transistor OT2 can be driven in a saturated region using a source/drain voltage Vds smaller than the transistor TR. As a result, by using the semiconductor device 40, the pixel circuit of the present invention can be driven at a lower voltage than the pixel circuit of the comparative example.

By using the semiconductor device 40, a potential difference between the voltages supplied to the first driving power line PVDD and the reference potential line PVSS (a potential difference between the driving voltage VDDEL and the reference voltage VSSEL) of the pixel circuit can be set to be small. The self-luminous display device using the semiconductor device 40 can reduce power consumption because a power supply voltage can be reduced.

Each of the embodiments described above or a part of each of the embodiments described above as the embodiment of the present invention can be appropriately combined as long as they do not conflict with each other.

It is to be understood that the present invention provides other functional effects that are different from the operational effects arranged by the aspects of the embodiments described above, and those that are obvious from the description of the present specification or those that can be easily predicted by a person skilled in the art.

What is claimed is:

1. A display device comprising;

a first transistor controlled using a second control signal to which a first control signal has been shifted, and electrically connected between an image data signal line and a first node;

a second transistor electrically connected between the first node and a second node;

a third transistor controlled using the first control signal to which a third control signal has been shifted, and electrically connected between the second node and a gate electrode of the second transistor;

a fourth transistor electrically connected to the second node controlled to supply a reset voltage to the second node and the gate electrode of the second transistor using the third control signal;

a light emitting element electrically connected to a reference voltage line to which a reference voltage is supplied;

a fifth transistor controlled using a fourth control signal and electrically connected between the second node and a drive power line to which a drive voltage is supplied;

a sixth transistor controlled using a fifth control signal and electrically connected to the light emitting element and the first node;

a seventh transistor electrically connected to the light emitting element and controlled to supply an initialization voltage to the light emitting element and a terminal of the sixth transistor connected to the light emitting element;

a first light emission control circuit that controls a timing of supplying the fifth control signal to the sixth transistor; and a second light emission control circuit that controls a timing of supplying the fourth control signal to the fifth transistor.

2. The display device according to claim 1, further comprising:

a control circuit shifting and outputting the third control signal, the first control signal, and the second control signal, sequentially.

3. The display device according to claim 1, wherein the drive voltage is a first drive voltage or a second drive voltage lower than the first drive voltage.

4. The display device according to claim 1, wherein the first to the seventh transistors are n-channel field effect transistors, and the seventh transistor is controlled using the second control signal.

5. The display device according to claim 4, wherein the second light emission control circuit supplies an off signal to the fourth control signal, the first light emission control circuit supplies an off signal to the fifth control signal, and the control circuit supplies an on signal to the third control signal, supplies an on signal to the first control signal, supplies an off signal to the second control signal, and supplies the reset voltage to the second node and the gate electrode.

6. The display device according to claim 4, wherein the second light emission control circuit supplies an off signal to the fourth control signal, the first light emission control circuit supplies an off signal to the fifth control signal, and the control circuit supplies an off signal to the third control signal, supplies an on signal to the first control signal, supplies an on signal to the second control signal, and supplies an image data signal from the image data signal line to the first node, the second node and the gate electrode.

7. The display device according to claim 4, wherein the second light emission control circuit supplies an off signal to the fourth control signal, the first light emission control circuit supplies an on signal to the fifth control signal, and the control circuit supplies an off signal to the third control signal, supplies an off signal to the first control signal, supplies an off signal to the second control signal, and supplies an image data signal including a voltage for displaying black from the image data signal line to the first node and the light emitting element.

8. The display device according to claim 1, wherein the first to the sixth transistors are n-channel field effect transistors, and the seventh transistor is a p-channel field effect transistor, the first light emission control circuit and the second light emission control circuit are the same light emission control circuit, the fourth control signal and the fifth control signal are the same light emission control signal, and the fifth to the seventh transistors are controlled using the same light emission control signal.

9. The display device according to claim 8, wherein the same light emission control circuit supplies an off signal to the same light emission control signal, and the control circuit supplies an on signal to the third control signal, supplies an on signal to the first control signal, supplies an off signal to the second control signal, and supplies the reset voltage to the second node and the gate electrode.

10. The display device according to claim 8, wherein the same light emission control circuit supplies an off signal to the same light emission control signal, and the control circuit supplies an off signal to the third control signal, supplies an on signal to the first control signal, supplies an on signal to the second control signal, and supplies an image data signal from the image data signal line to the second node and the gate electrode.

11. The display device according to claim 8, wherein the same light emission control circuit supplies an off signal to the same light emission control signal, and the control circuit supplies an off signal to the third control signal, supplies an off signal to the first control signal, supplies an off signal to the second control signal, and supplies an image data signal including a voltage for displaying black from the image data signal line to the first node and the light emitting element.

12. The display device according to claim 1, wherein the first to the fourth transistors and the seventh transistor are n-channel field effect transistors, and the fifth and the sixth transistors are p-channel field effect transistors, the first light emission control circuit and the second light emission control circuit are the same light emission control circuit, the fourth control signal and the fifth control signal are the same light emission control signal, the fifth and the sixth transistors are controlled using the same light emission control signal, and the seventh transistor is controlled using the second control signal.

13. The display device according to claim 12, wherein the same light emission control circuit supplies an on signal to the same light emission control signal, and the control circuit supplies an on signal to the third control signal, supplies an on signal to the first control signal, supplies an off signal to the second control signal, and supplies the reset voltage to the second node and the gate electrode.

14. The display device according to claim 12, wherein the same light emission control circuit supplies an on signal to the same light emission control signal, and the control circuit supplies an off signal to the third control signal, supplies an on signal to the first control signal, supplies an on signal to the second control signal, and supplies an image data signal from the image data signal line to the first node, the second node and the gate electrode.

15. The display device according to claim 12, wherein the same light emission control circuit supplies an on signal to the same light emission control signal, and the control circuit supplies an off signal to the third control signal, supplies an off signal to the first control signal, supplies an off signal to the second control signal, and supplies an image data signal including a voltage for displaying black from the image data signal line to the first node and the light emitting element.

16. A display device according to claim 12, wherein a channel region of each of the fifth to the seventh transistors includes a low temperature polysilicon, and a channel region of the second transistor includes an oxide semiconductor.

17. A method for driving a display device, the display device comprising:

a first transistor controlled using a second control signal to which a first control signal has been shifted, and electrically connected a first node;

a second transistor electrically connected between the first node and a second node;

a third transistor controlled using the first control signal to which a third control signal has been shifted, and electrically connected between the second node and a gate electrode of the second transistor; and, a fourth transistor controlled using the third control signal and electrically connected to the second node;

the method comprising the steps of:

turning on the fourth transistor using the third control signal and turning on the third transistor using the first control signal;

supplying a reset voltage to the second node and the gate electrode of the second transistor;

after supplying the reset voltage, turning off the fourth transistor using the third control signal, turning on the first transistor using the second control signal; and supplying a data voltage to the second node and the first node;

a light emitting element electrically connected to a reference voltage line to which a reference voltage is supplied;

a fifth transistor controlled using a fourth control signal and electrically connected between the second node and a drive power line to which a drive voltage is supplied;

a sixth transistor controlled using a fifth control signal and electrically connected to the light emitting element and the first node;

a seventh transistor electrically connected to the light emitting element and controlled to supply an initialization voltage to the light emitting element and a terminal of the fifth transistor connected to the light emitting element;

a first light emission control circuit that controls a timing of supplying the fifth control signal to the sixth transistor; and a second light emission control circuit that controls a timing of supplying the fourth control signal to the fifth transistor, and the method further comprises steps of shifting and outputting the third control signal, the first control signal and the second control signal, sequentially.

* * * * *